(12) United States Patent
Takemoto et al.

(10) Patent No.: US 10,756,607 B2
(45) Date of Patent: Aug. 25, 2020

(54) MOTOR AND ROTOR

(71) Applicant: DENSO CORPORATION, Kariya (JP)

(72) Inventors: Yoshiaki Takemoto, Toyohashi (JP);
Masashi Matsuda, Kakegawa (JP);
Yusuke Morimoto, Kosai (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 16/186,472

(22) Filed: Nov. 9, 2018

(65) Prior Publication Data

US 2019/0097510 A1    Mar. 28, 2019

Related U.S. Application Data

(62) Division of application No. 14/490,016, filed on Sep. 18, 2014, now Pat. No. 10,141,821.

(30) Foreign Application Priority Data

Sep. 24, 2013  (JP) ................. 2013-196583
Nov. 5, 2013  (JP) ................. 2013-229456
(Continued)

(51) Int. Cl.
*H02K 1/22* (2006.01)
*H02K 21/14* (2006.01)
(Continued)

(52) U.S. Cl.
CPC ........... *H02K 21/145* (2013.01); *H02K 1/145* (2013.01); *H02K 1/226* (2013.01); *H02K 1/2706* (2013.01);
(Continued)

(58) Field of Classification Search
CPC ...... H02K 21/145; H02K 1/145; H02K 1/243; H02K 1/226; H02K 1/2706; H02K 1/2713; H02K 1/2733; H02K 37/12; H02K 1/27
(Continued)

(56) References Cited

U.S. PATENT DOCUMENTS 3,450,913 A     6/1969  Baker
3,513,341 A *  5/1970  Gratzmuller ......... H02K 1/2713
                                                                                  310/156.69
(Continued)

FOREIGN PATENT DOCUMENTS

CN        101018003 A      8/2007
CN        101154836 A      4/2008
(Continued)

OTHER PUBLICATIONS

CN Office Action for CN Patent Application No. 201410487125.1, dated Nov. 3, 2017, 15 pages (CN Office Action pp. 1-8, English translation p. 9-15).
(Continued)

*Primary Examiner* — Burton S Mullins
(74) *Attorney, Agent, or Firm* — Patterson Thuente Pedersen, P.A.

(57) ABSTRACT

A motor includes a rotor and a stator. The rotor includes a first rotor core including a plurality of first claw-like magnetic poles, a second rotor core including a plurality of second claw-like magnetic poles, and a magnetic field magnet arranged between the first and second rotor cores. The first and second claw-like magnetic poles are alternately arranged in a circumferential direction. The magnetic field magnet causes the first and second claw-like magnetic poles to function as magnetic poles different from each other. The stator includes a first stator core including a plurality of first
(Continued)

claw-like magnetic poles, a second stator core including a plurality of second claw-like magnetic poles, and a coil section arranged between the first and second stator cores. The stator is configured to cause the first and second claw-like magnetic poles of the stator to function as magnetic poles different from each other and switch polarities of the magnetic poles on the basis of energization to the coil section. At least ones of the claw-like magnetic poles of the rotor and the claw-like magnetic poles of the stator are formed in a shape in which circumferential centers of distal end portions are shifted in the circumferential direction with respect to circumferential centers of proximal end portions.

6 Claims, 44 Drawing Sheets

(30) Foreign Application Priority Data

| Nov. 11, 2013 | (JP) | ................................. 2013-233363 |
| Nov. 26, 2013 | (JP) | ................................. 2013-244076 |
| Feb. 14, 2014 | (JP) | ................................. 2014-026843 |

(51) Int. Cl.
  *H02K 1/14* (2006.01)
  *H02K 1/27* (2006.01)

(52) U.S. Cl.
  CPC ......... *H02K 1/2713* (2013.01); *H02K 1/2733* (2013.01)

(58) Field of Classification Search
  USPC .... 310/156.66, 156.68, 156.69, 156.71, 263, 310/49 R
  See application file for complete search history.

(56) References Cited

U.S. PATENT DOCUMENTS

| 3,696,260 | A | * | 10/1972 | Lace | ..................... | H02K 1/2713 |
| | | | | | | 310/156.71 |
| 3,714,484 | A | | 1/1973 | Habert | | |
| 4,127,802 | A | * | 11/1978 | Johnson | ................. | H02K 37/18 |
| | | | | | | 310/114 |
| 4,201,930 | A | | 5/1980 | Inagaki | | |
| RE31,950 | E | * | 7/1985 | Binns | ................... | H02K 1/2713 |
| | | | | | | 310/156.69 |
| 5,306,977 | A | | 4/1994 | Hayashi | | |
| 5,962,947 | A | | 10/1999 | Suzuki et al. | | |
| 6,512,319 | B1 | | 1/2003 | Horng | | |
| 7,638,919 | B2 | * | 12/2009 | Pulnikov | ................ | H02K 1/145 |
| | | | | | | 310/156.02 |
| 7,692,344 | B2 | * | 4/2010 | Masaki | .................. | H02K 3/525 |
| | | | | | | 310/257 |
| 7,759,837 | B2 | | 7/2010 | Ishikawa | | |
| 8,890,386 | B2 | * | 11/2014 | Morita | ..................... | H02K 1/27 |
| | | | | | | 310/156.66 |
| 9,143,013 | B2 | * | 9/2015 | Yamada | ............... | H02K 1/2706 |
| 2006/0208602 | A1 | | 9/2006 | Enomoto et al. | | |
| 2007/0145834 | A1 | | 6/2007 | Usui | | |
| 2008/0079322 | A1 | | 4/2008 | Kanazawa et al. | | |
| 2008/0136272 | A1 | | 6/2008 | Ishikawa et al. | | |
| 2009/0102314 | A1 | | 4/2009 | Miyata | | |
| 2009/0134734 | A1 | * | 5/2009 | Nashiki | ..................... | B60L 7/00 |
| | | | | | | 310/162 |
| 2013/0106208 | A1 | | 5/2013 | Yamada et al. | | |
| 2013/0300242 | A1 | | 11/2013 | Yamada et al. | | |
| 2014/0139079 | A1 | * | 5/2014 | Kato | ..................... | H02K 21/16 |
| | | | | | | 310/68 B |
| 2015/0084465 | A1 | * | 3/2015 | Takahashi | ............... | H02K 1/145 |
| | | | | | | 310/156.01 |

FOREIGN PATENT DOCUMENTS

| CN | 101197508 A | | 6/2008 | | |
| DE | 3722153 | * | 1/1989 | ............... | H02K 5/24 |
| EP | 0837544 A | | 4/1998 | | |
| JP | S 55-125066 A | | 9/1980 | | |
| JP | S 61-85045 A | | 4/1986 | | |
| JP | H 01-116582 U | | 8/1989 | | |
| JP | H 03-40850 U | | 4/1991 | | |
| JP | H 03-235654 A | | 10/1991 | | |
| JP | 5-43749 | | 6/1993 | | |
| JP | H 05-207716 A | | 8/1993 | | |
| JP | H 08205510 A | | 8/1996 | | |
| JP | H 10-127024 A | | 5/1998 | | |
| JP | 2000-116086 A | | 4/2000 | | |
| JP | 3083885 U | | 11/2001 | | |
| JP | 2006-296188 A | | 10/2006 | | |
| JP | 2007-135318 A | | 5/2007 | | |
| JP | 2008-148397 A | | 6/2008 | | |
| JP | 2008-206292 A | | 9/2008 | | |
| JP | 2009-106044 A | | 5/2009 | | |
| JP | 2012-115085 | | 6/2012 | | |
| JP | 2013-106404 A | | 5/2013 | | |
| JP | 2013-226026 | | 10/2013 | | |
| WO | WO 2007/043161 A1 | | 4/2007 | | |

OTHER PUBLICATIONS

English Machine Translation, Shimaya, JP 2000-116086, Apr. 21, 2000.
Japanese Office Action for JP Patent Application No. 2013-229456, dated Apr. 4, 2017 (4 pgs. and 4 pg. translation) 8 pgs.
Japanese Office Action for Application No. 2013-233363, dated Mar. 1, 2017 (4 pgs) and English Translation (4 pgs).
Japanese Office Action for Application No. 2014-026843; dated Nov. 21, 2017; original office action (3 pages); machine translation of office action (3 pages) (6 pages total).

* cited by examiner

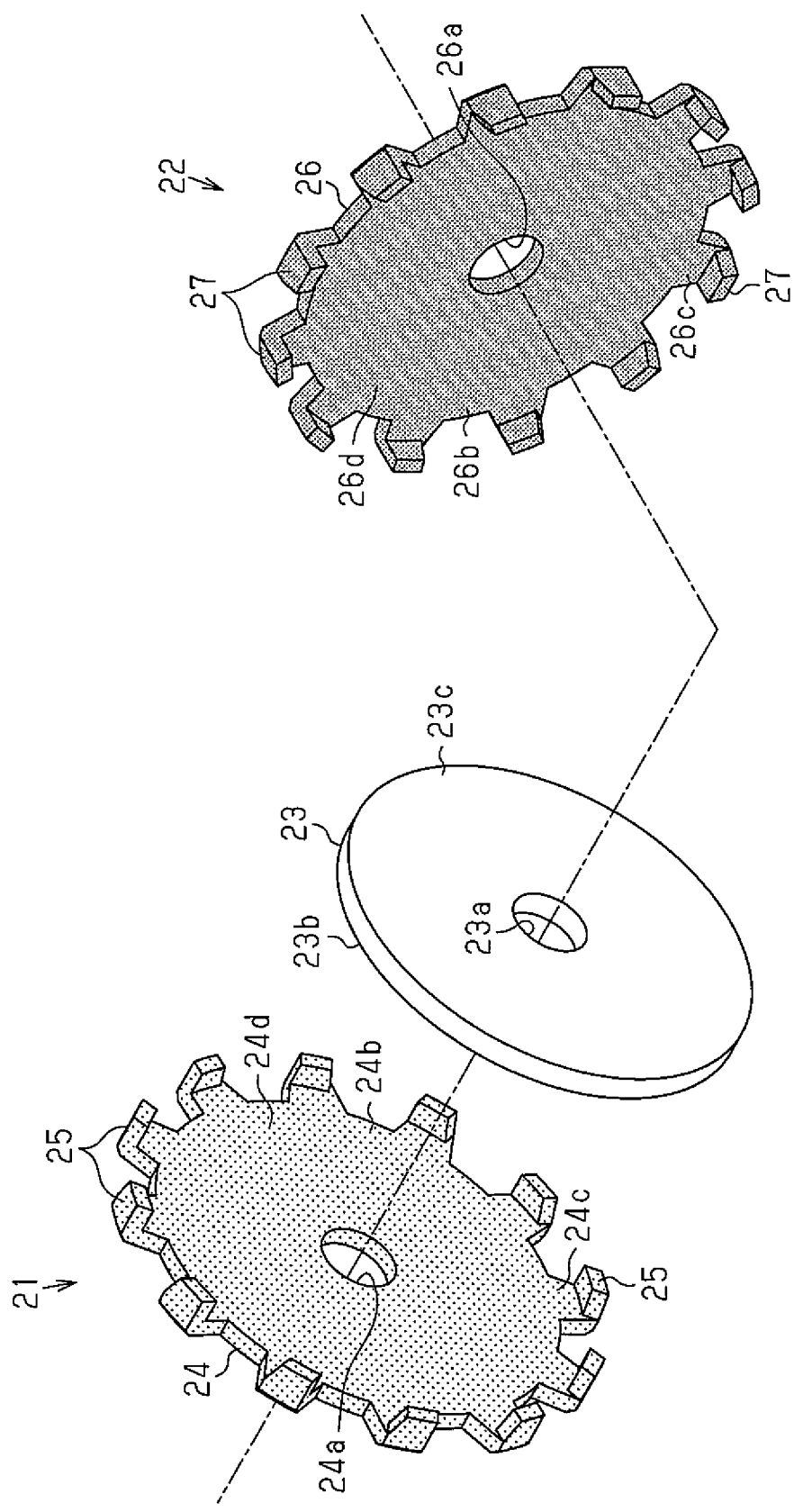

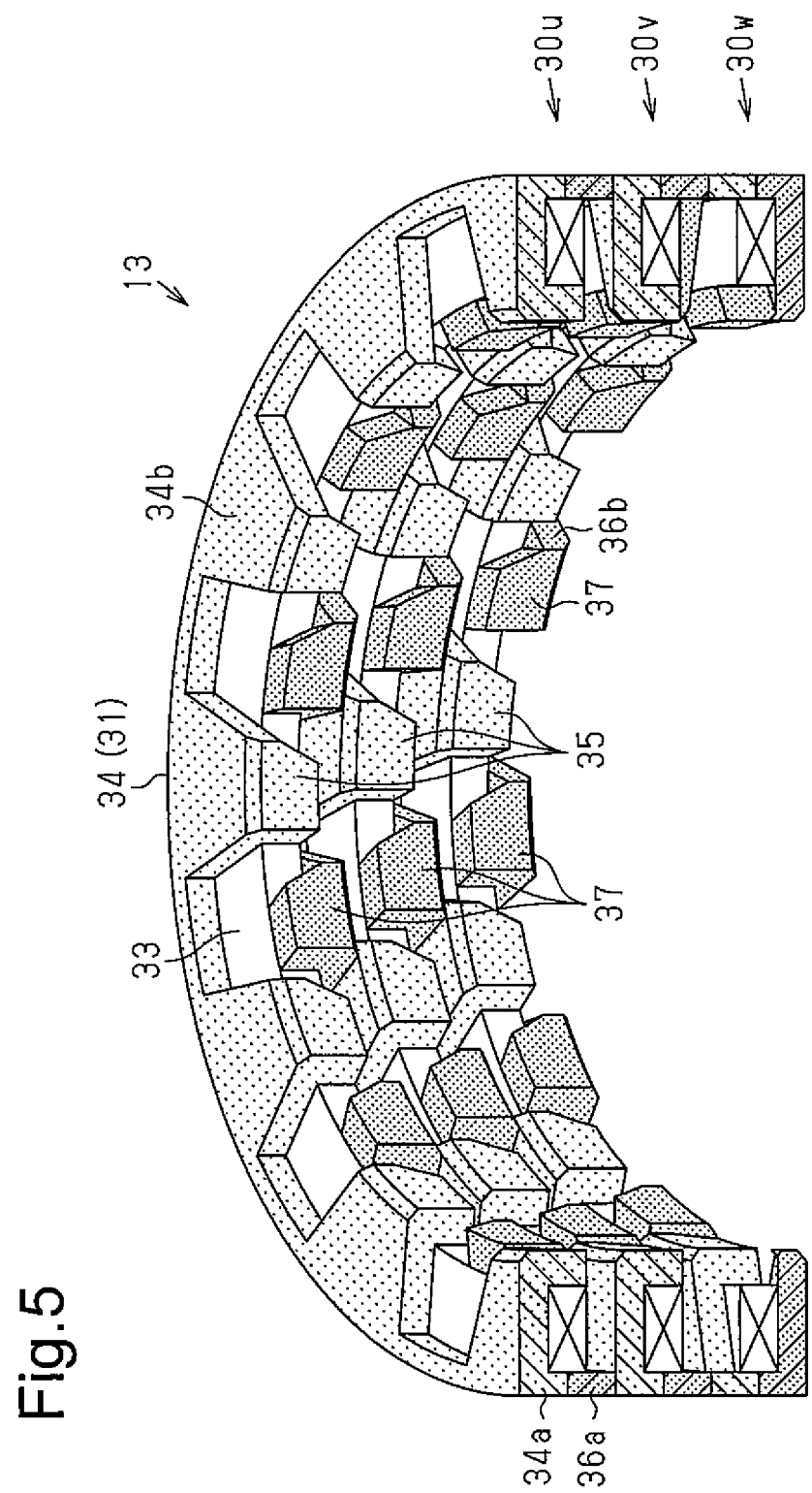

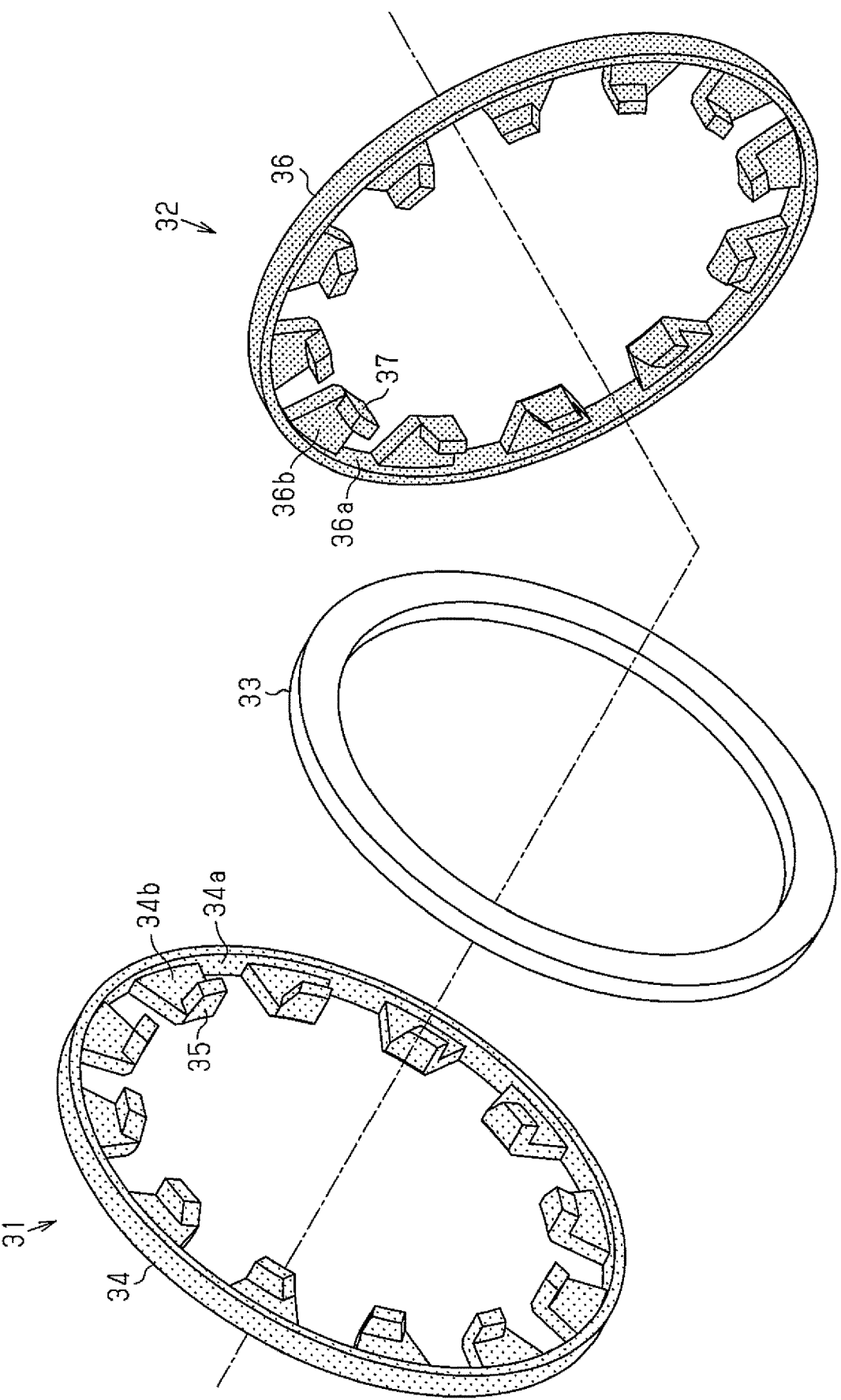

CIRCUMFERENTIAL DIRECTION

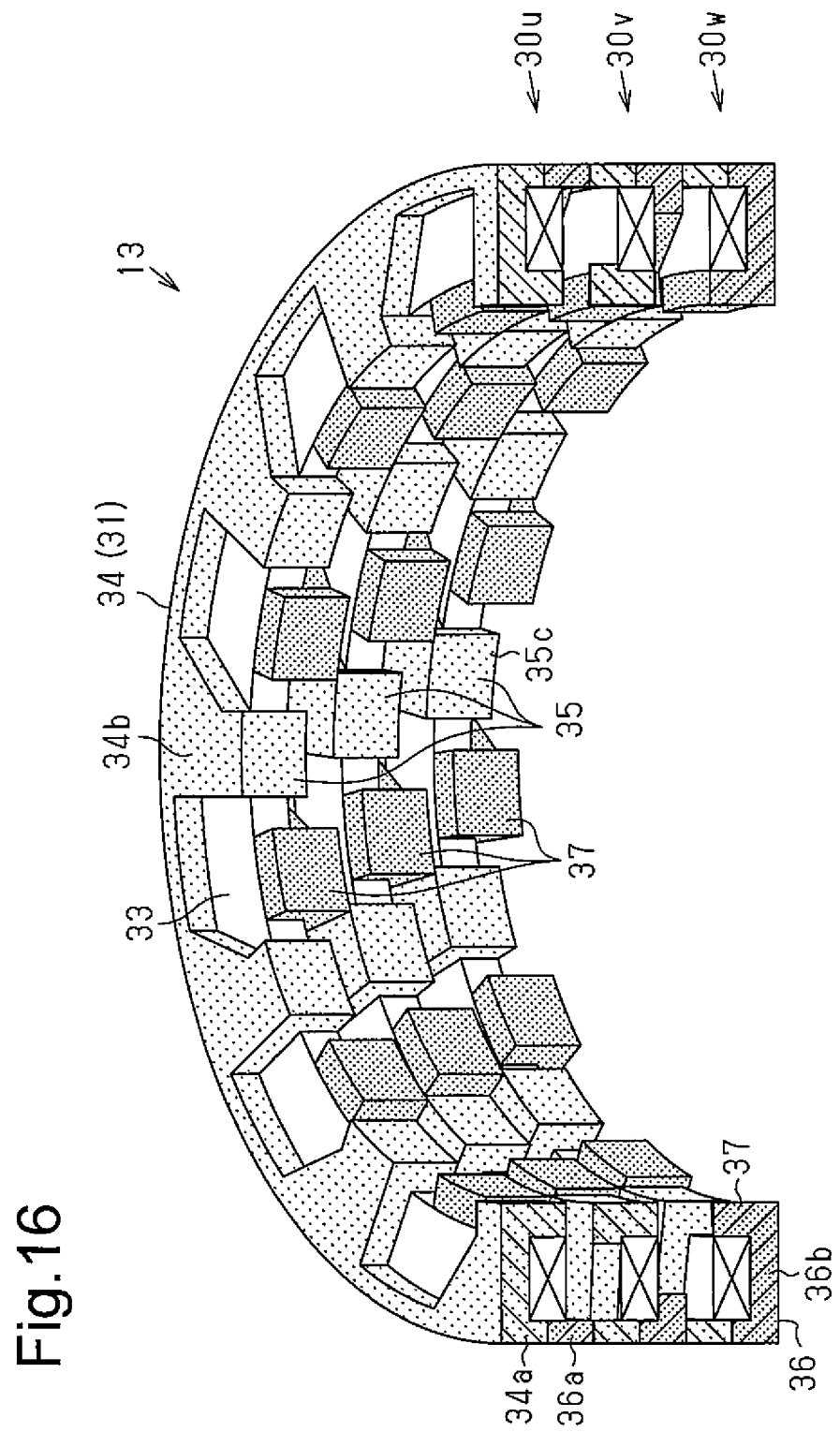

CONVENTIONAL CONFIGURATION

THIS CONFIGURATION

MOTOR AND ROTOR

RELATED APPLICATION

This application is a division of application Ser. No. 14/490,016 filed Sep. 18, 2014, which claims the benefit of Japanese Application No. 2013196583 filed Sep. 24, 2013, Japanese Application No. 2013229456 filed Nov. 5, 2013, Japanese Application No. 2013233363 filed Nov. 11, 2013, Japanese Application No. 2013244076 filed Nov. 26, 2013, and Japanese Application No. 2014026843 filed Feb. 14, 2014, each of which is hereby fully incorporated herein by reference.

BACKGROUND OF THE INVENTION

The present invention relates to a motor and a rotor.

DESCRIPTION OF THE RELATED ART

Japanese Utility Model Publication No. H5-43749 describes, as a rotor used in a motor, a rotor of a Lundell type structure of a so-called permanent magnetic field. The rotor includes rotor cores and a magnetic field magnet. The rotor cores respectively includes a plurality of claw-like magnetic poles arranged in the circumferential direction and are combined to each other. The magnetic field magnet is arranged between the rotor cores. The rotor causes the respective claw-like magnetic poles to alternately function as different magnetic poles. In such a rotor of the Lundell type structure, it is possible to easily change the number of poles of the rotor by changing the number of the claw-like magnetic poles while forming the magnetic field magnet in the same structure.

Incidentally, in the motor adopting the rotor, when it is attempted to change the number of poles (the number of slots) of a stator according to a change in the number of poles of the rotor, for example, it is necessary to change not only the shape of stator cores (the number of teeth, etc.) but also a winding form and the like of a coil. Therefore, it is conceivable to form the stator in the Lundell type structure to correspond to the rotor of the Lundell type structure.

However, when both of the rotor and the stator are formed in the Lundell type structure, it is not clarified how the shape of the rotor cores or the stator cores (in particular, the shape of the claw-like magnetic poles) affects motor performance (torque and output). It is desired to vary the motor performance even under a condition in which power supply to the stator is the same.

SUMMARY OF THE INVENTION

It is an objective of the present invention to provide a motor and a rotor that is possible to vary the motor performance even if the power supply to the stator is the same.

To achieve forgoing objective, a first aspect of the present invention is a motor including a rotor and a stator. The rotor including: a first rotor core including a plurality of first claw-like magnetic poles projecting in an axial direction; a second rotor core including a plurality of second claw-like magnetic poles projecting in the axial direction; and a magnetic field magnet arranged between the first and second rotor cores in the axial direction. The first and second claw-like magnetic poles are alternately arranged in a circumferential direction. The magnetic field magnet causes the first and second claw-like magnetic poles to function as magnetic poles different from each other. The stator including: a first stator core including a plurality of first claw-like magnetic poles projecting in the axial direction; a second stator core including a plurality of second claw-like magnetic poles projecting in the axial direction; and a coil section arranged between the first and second stator cores and wound around in the circumferential direction. The first and second claw-like magnetic poles of the stator are alternately arranged in the circumferential direction and are opposed to the first and second claw-like magnetic poles of the rotor. The stator is configured to cause the first and second claw-like magnetic poles of the stator to function as magnetic poles different from each other and switch polarities of the magnetic poles on the basis of energization to the coil section. At least ones of the claw-like magnetic poles of the rotor and the claw-like magnetic poles of the stator are formed in a shape in which circumferential centers of distal end portions are shifted in the circumferential direction with respect to circumferential centers of proximal end portions.

A second aspect of the present invention is a motor including a rotor and a stator. The rotor includes: a first rotor core including a plurality of first rotor side claw-like magnetic poles projecting in an axial direction; a second rotor core including a plurality of second rotor side claw-like magnetic poles projecting in the axial direction; and a magnetic field magnet arranged between the first and second rotor cores in the axial direction. The first and second rotor side claw-like magnetic poles are alternately arranged in a circumferential direction. The magnetic field magnet causes the first and second rotor side claw-like magnetic poles to function as magnetic poles different from each other. The stator includes: a first stator core including a plurality of first stator side claw-like magnetic poles projecting in the axial direction; a second stator core including a plurality of second stator side claw-like magnetic poles projecting in the axial direction; and a coil section arranged between the first and second stator cores and wound around in the circumferential direction. The first and second stator side claw-like magnetic poles are alternately arranged in the circumferential direction and are opposed to the first and second rotor side claw-like magnetic poles. The stator is configured to cause the first and second stator side claw-like magnetic poles to function as magnetic poles different from each other and switch polarities of the magnetic poles on the basis of energization to the coil section. The first and second rotor cores include a plurality of extending sections extending in a radial direction from base sections that sandwich the magnetic field magnet in the axial direction. The first rotor side claw-like magnetic poles are provided at radially distal end portions of the extending sections of the first rotor core. The second rotor side claw-like magnetic poles are provided at radially distal end portions of the extending sections of the second rotor core. The first and second stator cores include a plurality of extending sections extending in the radial direction from base sections. The first stator side claw-like magnetic poles are provided at radially distal end portions of the extending sections of the first stator core. The second stator side claw-like magnetic poles are provided at radially distal end portions of the extending sections of the second stator cores. At least one of the extending sections of the rotor and the extending sections of the stator are formed in a shape in which circumferential centers of the radially distal end portions are shifted in the circumferential direction with respect to circumferential centers of radially proximal end portions.

A third aspect of the present invention is a motor including single motor sections in three stages arranged in order of a first stage, a second stage, and a third stage in an axial direction. Each of the single motor sections includes a rotor section and a stator section. The rotor section includes: a first rotor core including a plurality of claw-like magnetic poles in a circumferential direction; a second rotor core including a plurality of claw-like magnetic poles in the circumferential direction; and a permanent magnet arranged between the first and second rotor cores and magnetized in the axial direction. The stator section includes: a first stator core including a plurality of claw-like magnetic poles in the circumferential direction; a second stator core including a plurality of claw-like magnetic poles in the circumferential direction; and a winding wire arranged between the first and second stator cores and wound around in the circumferential direction. In at least one of the rotor section and the stator section in the single motor section of the second stage, the plurality of claw-like magnetic poles are provided at unequal intervals in the circumferential direction.

A fourth aspect of the present invention is a motor including single motor sections in a plurality of stages arranged in an axial direction. Each of the single motor sections includes a rotor section and a stator section. The rotor section includes: a first rotor core including a plurality of first rotor side claw-like magnetic poles in a circumferential direction; a second rotor core including a plurality of second rotor side claw-like magnetic poles in the circumferential direction; and a magnetic field magnet arranged between the first and second rotor cores assembled to each other. The rotor section causes the first and second rotor side claw-like magnetic poles to alternately function as different magnetic poles. The stator section includes: a first stator core including a plurality of first stator side claw-like magnetic poles in the circumferential direction; a second stator core including a plurality of second stator side claw-like magnetic poles in the circumferential direction; and a coil section arranged between the first and second stator cores assembled to each other. The stator section is capable of switching polarities of the first and second stator side claw-like magnetic poles on the basis of energization to the coil section. The single motor sections in the plurality of stages include (n+1) single motor sections for a U phase, n single motor sections for a V phase, and n single motor sections for a W phase. The single motor sections for the U phase are arranged in stages located at axial two ends.

A fifth aspect of the present invention is a rotor including: a magnetic field magnet magnetized in an axial direction; a first rotor core; and a second rotor core. The first rotor core includes: a first rotor core base arranged on one side in the axial direction of the magnetic field magnet; and a plurality of first claw-like magnetic poles located at equal intervals in an outer circumferential section of the first rotor core base and respectively bent to extend to the magnetic field magnet side in the axial direction. The second rotor core includes: a second rotor core base arranged on the other side in the axial direction of the magnetic field magnet; and a plurality of second claw-like magnetic poles located at equal intervals in an outer circumferential section of the second rotor core base and respectively bent to extend to the magnetic field magnet side in the axial direction. The second claw-like magnetic poles are respectively arranged between corresponding ones of the first claw-like magnetic poles of the first rotor core. The magnetic field magnet causes the first claw-like magnetic poles to function as first magnetic poles and causes the second claw-like magnetic poles to function as second magnetic poles. The first claw-like magnetic poles of the first rotor core are coupled to each other by a ring-like first annular auxiliary magnet including a plurality of first magnet sections that control leakage fluxes from the first claw-like magnetic poles to the second claw-like magnetic poles adjacent thereto in the circumferential direction. The second claw-like magnetic poles of the second rotor core are coupled to each other by a ring-like second annular auxiliary magnet including a plurality of second magnet sections that control leakage fluxes from the second claw-like magnetic poles to the first claw-like magnetic poles adjacent thereto in the circumferential direction.

BRIEF DESCRIPTION OF THE DRAWINGS

The invention, together with objects and advantages thereof, may best be understood by reference to the following description of the presently preferred embodiments together with the accompanying drawings in which:

FIG. 4 is an exploded perspective view of a rotor section;

FIG. 5 is a sectional perspective view of a stator;

FIG. 6 is an exploded perspective view of a stator section;

FIG. 16 is a perspective view of a stator in still another example of the first embodiment;

DETAILED DESCRIPTION OF THE PREFERRED EMBODIMENTS

A motor according to a first embodiment is explained below.

Figure 1:
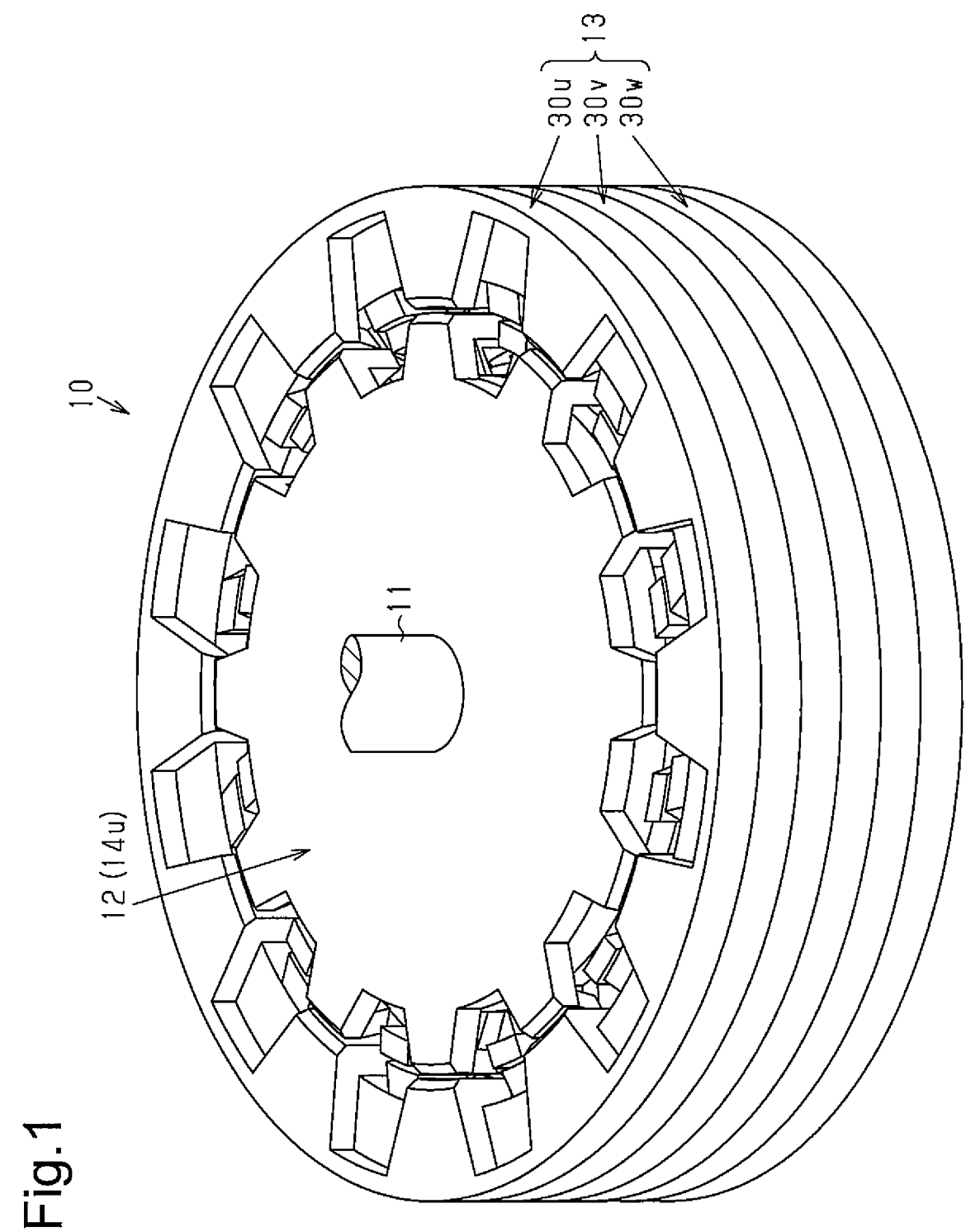
FIG. 1 is a perspective view of a brushless motor according to a first embodiment of the present invention.

As shown in FIG. 1, a brushless motor 10 according to this embodiment includes a rotor 12 including a rotating shaft 11 and an annular stator 13 arranged on the outer side of the rotor 12 and firmly fixed to a motor housing (not shown in the figure).

Configuration of the Rotor

Figure 2:
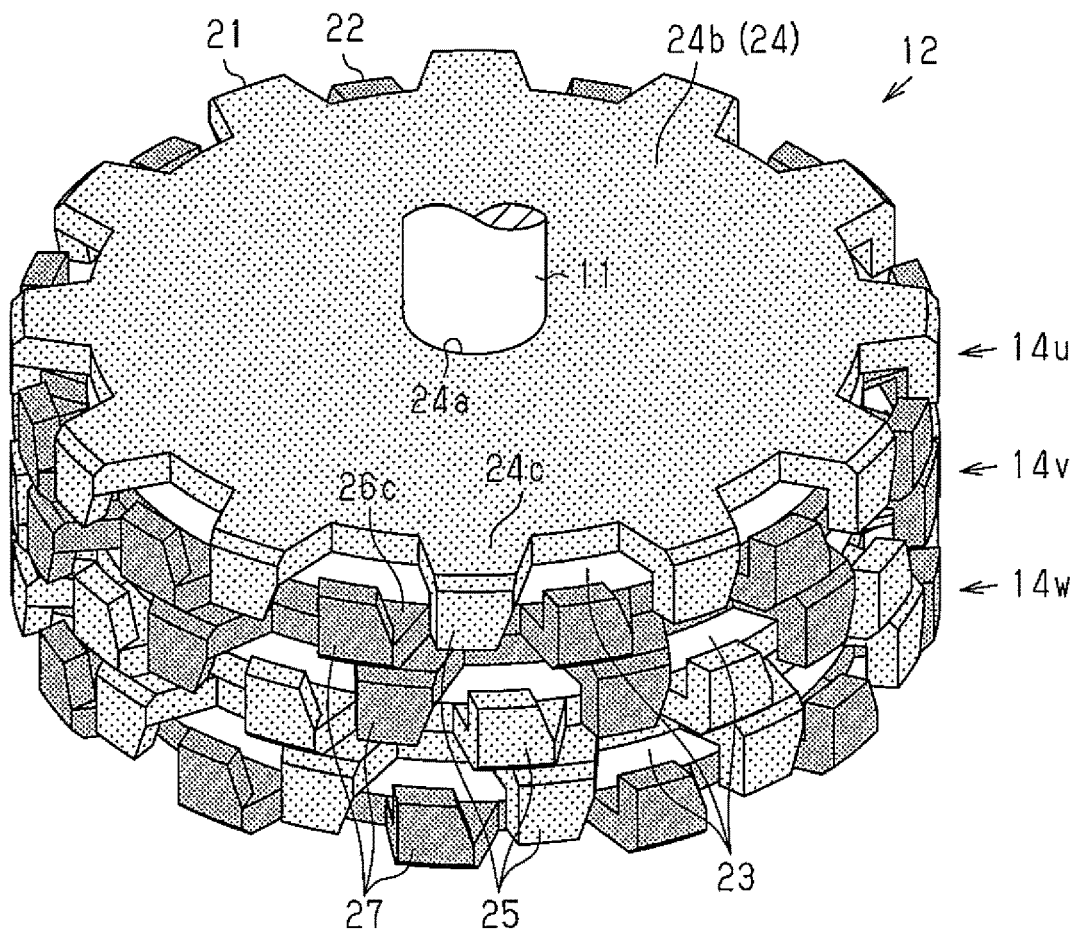
FIG. 2 is a perspective view of a rotor shown in FIG. 1.

As shown in FIG. 2, the rotor 12 includes rotor sections 14u, 14v, and 14w of three phases (a U phase, a V phase, and a W phase) stacked in the axial direction. The rotor sections 14u, 14v, and 14w have substantially the same configurations one another and are configured by first and second rotor cores 21 and 22 and magnetic field magnets 23 sandwiched by the first and second rotor cores 21 and 22.

As shown in FIGS. 2 and 4, the first rotor core 21 includes a first rotor core base 24 formed in a substantially disk shape. The first rotor core base 24 includes a disk section 24b having a through-hole 24a, through which the rotating shaft 11 is inserted and fixed, in a radial center section and a plurality of extending sections 24c extending from the outer circumferential edge of the disk section 24b to the radial outer side. In this embodiment, twelve extending sections 24c are provided at equal intervals (30 degree intervals) in the circumferential direction.

Figure 3A:
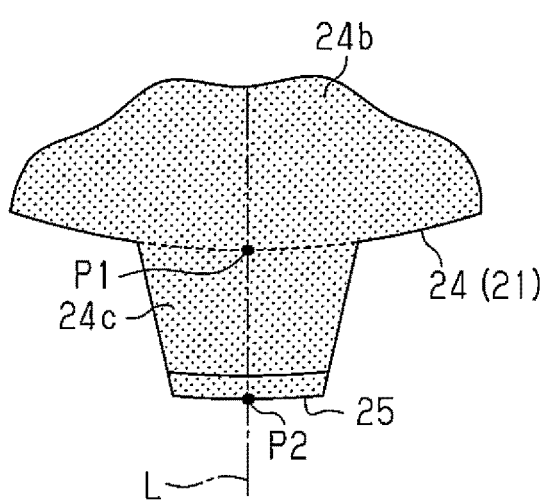
FIG. 3A is a plan view partially showing a first rotor core.

As shown in FIG. 3A, the extending section 24c is formed in a trapezoidal shape smaller in width toward the radial outer side when viewed from the axial direction. Concerning the shape of the extending section 24c, more specifically, a circumferential center line L (a straight line passing a circumferential center P1 at the radially proximal end portion and a circumferential center P2 at the radially distal end portion) of the extending section 24c is orthogonal to the axis of the rotating shaft 11. The extending section 24c is formed in a shape line-symmetrical to the circumferential center line L when viewed from the axial direction of the extending section 24c.

The first rotor core 21 integrally includes first rotor side claw-like magnetic poles 25 that project to one side in the axial direction from the radially distal end portions (the outer circumferential side end portions) of the extending sections 24c. Note that the first rotor side claw-like magnetic pole 25 may be formed by bending the extending sections 24c at a right angle or may be molded integrally with the extending sections 24c by casting.

Figure 3B:
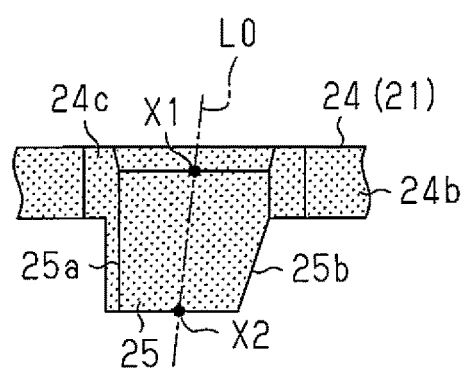
FIG. 3B is a side view showing a first rotor side claw-like magnetic pole.

As shown in FIG. 3B, the first rotor side claw-like magnetic pole 25 is formed in a symmetrical trapezoidal shape when viewed from the radial direction (the front). More specifically, the first rotor side claw-like magnetic pole 25 is formed in a trapezoidal shape, the circumferential width of the axially proximal end portion of which is formed equal to the circumferential width of the radially distal end portion (the outer circumferential side end portion) of the extending section 24c and is smaller toward the axially distal end side. The first rotor side claw-like magnetic pole 25 has circumferential two faces that are formed in flat surfaces nonparallel to each other. Further, in the first rotor side claw-like magnetic pole 25, a straight line L0 passing a circumferential center X1 of the axially proximal end portion and a circumferential center X2 of the axially distal end portion inclines with respect to the axial direction.

As shown in FIG. 4, a second rotor core 22 includes a configuration substantially the same as the configuration of the first rotor core 21 and includes a second rotor core base 26 and second rotor side claw-like magnetic poles 27. A disk section 26b (a through-hole 26a) and extending sections 26c of the second rotor core base 26 respectively have shapes same as the shapes of the disk section 24b (the through-hole 24a) and the extending sections 24c of the first rotor core base 24.

As shown in FIG. 2, in an assembled state, the second rotor core base 26 is arranged in parallel to the first rotor core base 24. The magnetic field magnet 23 is arranged between the core bases 24 and 26. The extending sections 24c and 26c of the core bases 24 and 26 are alternately lined in the circumferential direction when viewed from the axial direction and are arranged at equal intervals (in this embodiment, 15 degree intervals) in the circumferential direction. The first and second rotor side claw-like magnetic poles 25 and 27 are arranged to be alternately lined in the circumferential direction and are configured to project in opposite directions each other. In other words, the second rotor side claw-like magnetic poles 27 are arranged between corresponding ones of the first rotor side claw-like magnetic poles 25.

Note that the axial length of the first rotor side claw-like magnetic pole 25 is set such that the distal end face of the first rotor side claw-like magnetic pole 25 is flush with an opposed surface 26d (an axially inner side surface) of the second rotor core base 26. Similarly, the axial length of the second rotor side claw-like magnetic pole 27 is set such that the distal end face of the second rotor side claw-like magnetic pole 27 is flush with an opposed surface 24d (an axially inner side surface) of the first rotor core base 24.

The second rotor side claw-like magnetic pole 27 is formed in a symmetrical trapezoidal shape when viewed from the radial direction (the front). More specifically, the second rotor side claw-like magnetic pole 27 is formed in a trapezoidal shape, the circumferential width of the axially proximal end portion of which is equal to the circumferential width of the radially distal end portion (the outer circumferential side end portion) of the extending section 26c and is smaller toward the axially distal end side. The circumferential two end faces of the second rotor side claw-like magnetic pole 27 are formed in flat surfaces nonparallel to each other.

As shown in FIG. 4, the magnetic field magnet 23 is, for example, a disk-like permanent magnet formed by a ferrite magnet. A through-hole 23a, through which the rotating shaft 11 is inserted, is formed in the center position of the magnetic field magnet 23. One end face 23b of the magnetic field magnet 23 is in contact with the opposed surface 24d of the first rotor core base 24. The other end face 23c of the magnetic field magnet 23 is in contact with the opposed surface 26d of the second rotor core base 26. The magnetic field magnet 23 is sandwiched and fixed in the axial direction between the first rotor core base 24 and the second rotor core base 26. Note that the outer diameter of the magnetic field magnet 23 is set the same as the outer diameter of the disk sections 24b and 26b of the core bases 24 and 26.

The magnetic field magnet 23 is magnetized in the axial direction to set the first rotor core base 24 side as an N pole and set the second rotor core base 26 side as an S pole. Therefore, the first rotor side claw-like magnetic poles 25 of the first rotor core 21 are caused to function as N poles (first magnetic poles) by the magnetic field magnet 23. The second rotor side claw-like magnetic poles 27 of the second rotor core 22 are caused to function as S poles (second magnetic poles) by the magnetic field magnet 23.

In the rotor sections 14u, 14v, and 14w formed in a so-called Lundell type structure including the magnetic field magnets 23 as explained above, the first rotor side claw-like magnetic poles 25 functioning as the N poles and the second rotor side claw-like magnetic poles 27 functioning as the S poles are alternately arranged in the circumferential direction. Each of the rotor sections 14u, 14v, and 14w is configured by twenty-four poles (twelve pole pairs).

As shown in FIG. 2, the rotor sections 14u, 14v, and 14w are stacked in the axial direction to configure the rotor 12. Note that the rotor sections 14u, 14v, and 14w in the respective phases are referred to as U-phase rotor section 14u, V-phase rotor section 14v, and W-phase rotor section 14w in order from the top in FIG. 2.

The rotor sections 14u, 14v, and 14w in the respective phases are stacked with the phases shifted 60 degrees in an electrical angle (5 degrees in a mechanical angle) from one another. More specifically, the V-phase rotor section 14v is arranged to be shifted 60 degrees in the phase in the electrical angle in the counterclockwise direction with respect to the U-phase rotor section 14u. The W-phase rotor section 14w is arranged to be shifted 60 degrees in the phase in the electrical angle in the counterclockwise direction with respect to the V-phase rotor section 14v.

The U-phase and W-phase rotor sections 14u and 14w are stacked with the first rotor core 21 facing up. The V-phase rotor section 14v is stacked with the second rotor core 22 facing up. That is, magnetization directions of the magnetic field magnets 23 of the U-phase and W-phase rotor sections 14u and 14w are set in the same direction (in FIG. 2, upward). A magnetization direction of the magnetic field magnet 23 of the V-phase rotor section 14v is set in a direction (in FIG. 2, downward) opposite to the magnetization direction of the magnetic field magnets 23 of the U-phase and W-phase rotor sections 14u and 14w.

The second rotor core bases 26 of the U-phase and V-phase rotor sections 14u and 14v are adjacent to each other in the axial direction. The S pole sides of the magnetic field magnets 23 of the U-phase and V-phase rotor sections 14u and 14v are configured to face each other via the adjacent second rotor core bases 26. The first rotor core bases 24 of the V-phase and W-phase rotor sections 14v and 14w are adjacent to each other in the axial direction. The N pole sides of the magnetic field magnets 23 of the V-phase and W-phase rotor sections 14v and 14w are configured to face each other via the adjacent first rotor core bases 24.

Projecting directions in the axial direction of the first rotor side claw-like magnetic poles 25 of the U-phase and W-phase rotor sections 14u and 14w are the same direction (in FIG. 2, downward). A projecting direction of the first rotor side claw-like magnetic poles 25 of the V-phase rotor section 14v is a direction (in FIG. 2, upward) opposite to the direction.

Similarly, projecting directions in the axial direction of the second rotor side claw-like magnetic poles 27 of the U-phase and W-phase rotor sections 14u and 14w are the same direction (in FIG. 2, upward). A projecting direction of the second rotor side claw-like magnetic poles 27 of the V-phase rotor section 14v is a direction (in FIG. 2, downward) opposite to the direction.

Figure 7:
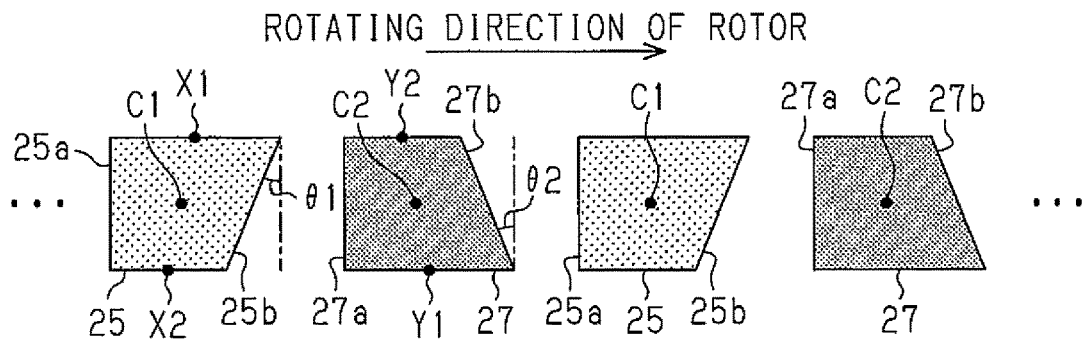
FIG. 7 is a schematic diagram showing first and second rotor side claw-like magnetic poles in development.

As shown in FIG. 7, in the rotor sections 14u, 14v, and 14w, the radial outer side surface (a surface opposed to the stator 13) of the first rotor side claw-like magnetic pole 25 is formed as an inclined section 25b, circumferential one end 25a (a front side end in the clockwise direction) of which is formed in a linear shape extending along the axial direction viewed from the radial direction and circumferential other end (a rear side end in the clockwise direction) of which is inclined to be closer to the circumferential one end 25a toward the distal end side. That is, the first rotor side claw-like magnetic pole 25 is formed in a shape in which the circumferential center X2 of the distal end portion is shifted to one side in the circumferential direction (in this embodiment, the clockwise direction) with respect to the circumferential center X1 of the proximal end portion (coinciding with the circumferential center P2 at the radially distal end portion of the extending section 24c).

In the rotor sections 14u, 14v, and 14w, the radial outer side surface (a surface opposed to the stator 13) of the second rotor side claw-like magnetic pole 27 is formed as an inclined section 27b, circumferential one end 27a (a front side end in the clockwise direction) of which is formed in a linear shape extending along the axial direction viewed from the radial direction and circumferential other end (a rear side end in the clockwise direction) of which is inclined to be closer to the circumferential one end 27a toward the distal end side. Consequently, the second rotor side claw-like magnetic pole 27 is formed in a shape in which a circumferential center Y2 of the distal end portion is shifted to one side in the circumferential direction (in this embodiment, the clockwise direction) with respect to a circumferential center Y1 of the proximal end portion.

That is, the first and second rotor side claw-like magnetic poles 25 and 27 are formed in shapes in which the circumferential centers X2 and Y2 of the distal end portions thereof are shifted in the same direction (the clockwise direction). The first and second rotor side claw-like magnetic poles 25 and 27 are configured to arrange center positions C1 and C2 thereof (circumferential center positions in the axial centers of the claw-like magnetic poles 25 and 27) at equal intervals (in this embodiment, 15 degree intervals) in the circumferential direction. An inclination angle θ1 (an inclination angle with respect to the axial direction) of the inclined section 25b of the first rotor side claw-like magnetic pole 25 and an inclination angle θ2 (an inclination angle with respect to the axial direction) of the inclined section 27b of the second rotor side claw-like magnetic pole 27 are set equal to each other.

Stator

As shown in FIG. 5, the stator 13 arranged on the radial outer side of the rotor 12 includes stator sections 30u, 30v, and 30w of the three phases (the U phase, the V phase, and the W phase) stacked in the axial direction to correspond to the rotor sections 14u, 14v, and 14w. The stator sections 30u, 30v, and 30w have the same configuration and are configured from first and second stator cores 31 and 32 and a coil section 33 arranged in the axial direction between the first and second stator cores 31 and 32.

As shown in FIGS. 5 and 6, a first stator core 31 includes a ring plate-like first stator core base 34. The first stator core base 34 includes a ring section 34a formed in a ring shape in the circumferential direction of the rotating shaft 11 and a plurality of extending sections 34b extending in the radial inner side from the ring section 34a. In this embodiment, twelve extending sections 34b are provided at equal intervals (30 degree intervals) in the circumferential direction. The extending sections 34b are formed in a trapezoidal shape smaller in width toward the radial inner side and line-symmetrical with respect to the circumferential center line when viewed from the axial direction.

The first stator core 31 integrally includes first stator side claw-like magnetic poles 35 projecting to one side in the axial direction (in FIG. 5, downward) from the radially distal end portions (the outer circumferential side end portions) of the extending sections 34b. Note that the first stator side claw-like magnetic poles 35 may be formed by bending the extending sections 34b at a right angle or may be molded integrally with the extending sections 34b by casting.

The first stator side claw-like magnetic pole 35 is formed in a symmetrical trapezoidal shape when viewed from the radial direction (the front). More specifically, the first stator side claw-like magnetic pole 35 is formed in a trapezoidal shape, the circumferential width of the axially proximal end portion of which is formed equal to the circumferential width of the radially distal end portion (the inner circumferential side end portion) of the extending section 34b and is smaller toward the axially distal end side. The circumferential two end faces of the first stator side claw-like magnetic pole 35 are formed in flat surfaces nonparallel to each other.

Figure 8:
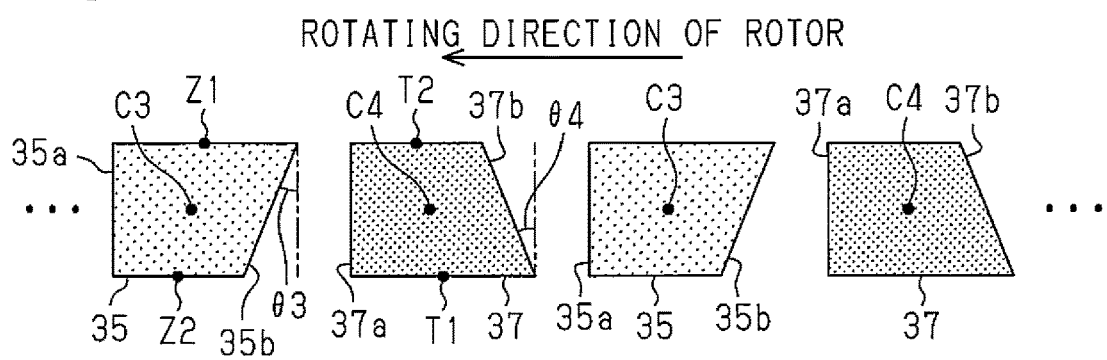
FIG. 8 is a schematic diagram showing first and second stator side claw-like magnetic poles in development.

As shown in FIG. 8, the radial inner side surface (a surface opposed to the rotor 12) of the first stator side claw-like magnetic pole 35 is formed as an inclined section 35b, circumferential one end 35a (a rear side end in the clockwise direction) of which is formed in a linear shape extending along the axial direction viewed from the radial direction and circumferential other end (a front side end in the clockwise direction) of which is inclined to be closer to the circumferential one end 35a toward the distal end side. That is, the first stator side claw-like magnetic pole 35 is formed in a shape in which a circumferential center Z2 of the distal end portion is shifted to one side in the circumferential direction (in this embodiment, the counterclockwise direction) with respect to a circumferential center Z1 of the proximal end portion.

As shown in FIG. 6, a second stator core 32 includes a configuration substantially the same as the configuration of the first stator core 31 and includes a second stator core base 36 and second stator side claw-like magnetic poles 37. A ring section 36a and extending sections 36b of the second stator core base 36 are formed in shapes respectively the same as the shapes of the ring section 34a and the extending sections 34b of the first stator core base 34.

As shown in FIG. 5, the ring sections 34a and 36a of the stator core bases 34 and 36 are set in contact with each other in the axial direction to configure an outer circumferential wall section of the first stator core 31. In a space on the inner circumferential side of the outer circumferential wall section, which is a space in the axial direction between the extending sections 34b and 36b, a coil section 33 formed in a ring shape in the circumferential direction of the rotating shaft 11 is arranged.

The extending sections 34b and 36b of the stator core bases 34 and 36 are alternately lined in the circumferential direction when viewed from the axial direction and are arranged at equal intervals (in this embodiment, 15 degree intervals) in the circumferential direction. The extending sections 34b and 36b are formed parallel to each other. In the stator sections 30u, 30v, and 30w, the first and second stator side claw-like magnetic poles 35 and 37 are arranged to be alternately lined in the circumferential direction and are configured to project in opposite directions each other. In other words, the second stator side claw-like magnetic poles 37 are arranged between the corresponding ones of the first stator side claw-like magnetic poles 35.

The second stator side claw-like magnetic poles 37 are formed in a symmetrical trapezoidal shape when viewed from the radial direction (the front). More specifically, the second stator side claw-like magnetic pole 37 is formed in a trapezoidal shape, the circumferential width of the axially proximal end portion of which is formed equal to the circumferential width of the radially distal end portion (the outer circumferential side end portion) of the extending section 36b and is smaller toward the axially distal end side. The circumferential two end faces of the second stator side claw-like magnetic pole 37 are formed in flat surfaces nonparallel to each other.

As shown in FIG. 8, the radial inner side surface (a surface opposed to the rotor 12) of the second stator side claw-like magnetic pole 37 is formed as an inclined section 37b, circumferential one end 37a (a rear side end in the clockwise direction) of which is formed in a linear shape extending along the axial direction viewed from the radial direction and circumferential other end (a front side end in the clockwise direction) of which is inclined to be closer to the circumferential one end 37a toward the distal end side. Consequently, the second stator side claw-like magnetic pole 37 is formed in a shape in which a circumferential center T2 of the distal end portion is shifted to one side in the circumferential direction (in this embodiment, the counterclockwise direction) with respect to a circumferential center T1 of the proximal end portion.

That is, the first and second stator side claw-like magnetic poles 35 and 37 are formed in shapes in which the circumferential centers Z2 and T2 of the distal end portions thereof are shifted in the same direction (the counterclockwise direction). The first and second stator side claw-like magnetic poles 35 and 37 are configured such that center positions C3 and C4 thereof (circumferential center positions in the axial centers of the claw-like magnetic poles 35 and 37) are arranged at equal intervals (in this embodiment, 15 degree intervals) in the circumferential direction. An inclination angle θ3 (an inclination angle with respect to the axial direction) of the inclined section 35b of the first stator side claw-like magnetic pole 35 and an inclination angle θ4 (an inclination angle with respect to the axial direction) of the inclined section 37b of the second stator side claw-like magnetic pole 37 are set equal to each other.

The stator sections 30u, 30v, and 30w configured as explained above are formed in a so-called Lundell type (a claw pole type) structure including twenty-four poles that energize, with the coil section 33, the first and second stator side claw-like magnetic poles 35 and 37 to be different magnetic poles each other at every moment.

As shown in FIG. 5, the stator sections 30u, 30v, and 30w are stacked in the axial direction such that the first stator core base 34 and the second stator core base 36 are alternately arranged in the axial direction. Consequently, the stator 13 is configured. Note that the stator sections 30u, 30v, and 30w in the respective phases are referred to as U-phase stator section 30u, V-phase stator section 30v, and W-phase stator section 30w in order from the top in FIG. 5.

The stator sections 30u, 30v, and 30w in the respective phases are stacked with the phases shifted 60 degrees in the electrical angle (5 degrees in the mechanical angle) from one another. More specifically, the V-phase stator section 30v is arranged to be shifted 60 degrees in the phase in the electrical angle in the clockwise direction with respect to the U-phase stator section 30u. The W-phase stator section 30w is arranged to be shifted 60 degrees in the phase in the electrical angle in the clockwise direction with respect to the V-phase stator section 30v.

Consequently, a direction of inclination with respect to the axial direction formed by the shift in the circumferential direction of the rotor sections 14u, 14v, and 14w in the respective phases when viewed from the radial direction (see FIG. 2) and a direction of inclination with respect to the axial direction formed by the shift in the circumferential direction of the stator sections 30u, 30v, and 30w in the respective phases when viewed from the radial direction (see FIG. 5) are opposite directions each other on opposed surfaces of the rotor 12 and the stator 13. Consequently, it is possible to cause the first and second rotor side claw-like magnetic poles 25 and 27 in the respective phases to suitably follow switching of the magnetic poles of the first and second stator side claw-like magnetic poles 35 and 37. As a result, it is possible to realize suitable rotation of the rotor 12.

Action of the brushless motor 10 configured as explained above is explained.

When a three-phase alternating-current power supply voltage is applied to the stator 13, a U-phase power supply voltage is applied to the coil section 33 of the U-phase stator section 30u, a V-phase power supply voltage is applied to the coil section 33 of the V-phase stator section 30v, and a W-phase power supply voltage is applied to the coil section 33 of the W-phase stator section 30w. Consequently, a rotating magnetic field is generated in the stator 13 and the rotor 12 is driven to rotate.

It is assumed that the rotor 12 shown in FIG. 2 rotates counterclockwise. In this case, as shown in FIGS. 7 and 8, the inclined sections 25*b* and 27*b* are located on the rotor rotating direction front side of the rotor side claw-like magnetic poles 25 and 27. The inclined sections 35*b* and 37*b* are located on the rotor rotating direction rear side of the stator side claw-like magnetic poles 35 and 37. That is, the rotor side claw-like magnetic poles 25 and 27 are formed in an asymmetrical shape in which the circumferential centers X2 and Y2 of the distal end portions are shifted in a counter rotating direction of the rotor 12 with respect to the circumferential centers X1 and Y1 of the proximal end portions. The stator side claw-like magnetic poles 35 and 37 are formed in an asymmetrical shape in which the circumferential centers Z2 and T2 of the distal end portions are shifted in the rotating direction of the rotor 12 with respect to the circumferential centers Z1 and T1 of the proximal end portions.

Figure 9A:
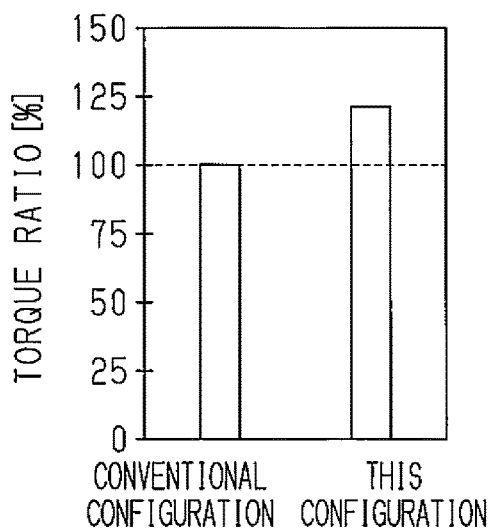
FIG. 9A is a graph showing comparison of torque in a configuration in the first embodiment and torque in a conventional configuration.
Figure 9B:
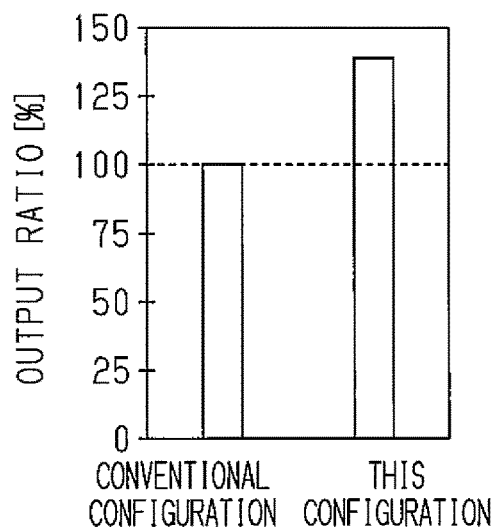
FIG. 9B is a graph showing comparison of an output in the configuration in the first embodiment and the output in the conventional configuration.

When this configuration is compared with the conventional configuration in which the claw-like magnetic poles of the rotor and the stator have the symmetrical shape when viewed from the radial direction, as shown in FIGS. 9A and 9B, in this embodiment, torque is improved to 120% or more and an output is improved to 130% or more with respect to the conventional configuration.

During the rotor rotation, magnet torque by the magnetic field magnets 23 acts as positive torque (rotation torque) in both attraction and repulsion. However, reluctance torque acts as positive torque in attraction and acts as negative torque in repulsion. In the conventional configuration, an attraction component and a repulsion component of the reluctance torque are offset. The reluctance torque substantially does not contribute to the rotation torque.

On the other hand, in this embodiment, the rotor side claw-like magnetic poles 25 and 27 are formed in an asymmetrical shape in which the distal end sides are shifted in the counter rotating direction of the rotor 12. The stator side claw-like magnetic poles 35 and 37 are formed in an asymmetrical shape in which the distal end sides are shifted in the rotating direction of the rotor 12. Consequently, the repulsion component of the reluctance torque acting as the negative torque is suppressed. As a result, the attraction component of the reluctance torque acting as the positive torque remains. Therefore, the torque and the output are improved.

Characteristic advantages of the first embodiment are explained.

(1) The rotor side claw-like magnetic poles 25 and 27 and the stator side claw-like magnetic poles 35 and 37 are formed in shapes (asymmetrical shapes) in which the circumferential centers of the distal end portions are shifted in the circumferential direction with respect to the circumferential centers of the proximal end portions. Consequently, it is possible to vary the reluctance torque according to the shape of the claw-like magnetic poles 25, 27, 35, and 37. As a result, it is possible to vary motor performance (torque and an output) even if power supply to the stator 13 is the same.

(2) The rotor side claw-like magnetic poles 25 and 27 are formed in an asymmetrical shape in which the distal end sides are shifted in the counter rotating direction of the rotor 12. The stator side claw-like magnetic poles 35 and 37 are formed in an asymmetrical shape in which the distal end sides are shifted in the rotating direction of the rotor 12. Consequently, it is possible to suppress the repulsion component of the reluctance torque acting as the negative torque. As a result, it is possible to contribute to improvement of the torque and the output.

Note that the first embodiment may be changed as explained below.

A shift direction (a shifting direction) of the distal end sides of the claw-like magnetic poles 25, 27, 35, and 37 is not limited to the embodiment.

Figure 10:
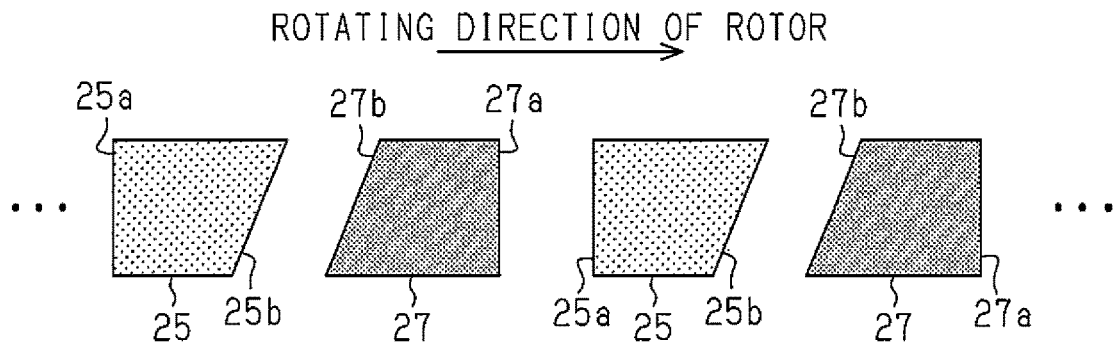
FIG. 10 is a schematic diagram showing first and second rotor side claw-like magnetic poles of another example of the first embodiment in development.

For example, as shown in FIG. 10, a distal end shift direction of the first rotor side claw-like magnetic pole 25 and a distal end shift direction of the second rotor side claw-like magnetic pole 27 may be set opposite to each other. Note that, in FIG. 10, an example is shown in which the distal end shift direction of the first rotor side claw-like magnetic pole 25 is set in the counter rotating direction of the rotor 12 and the distal end shift direction of the second rotor side claw-like magnetic pole 27 is set in the rotating direction of the rotor 12. Consequently, the inclined sections 25*b* and 27*b* of the rotor side claw-like magnetic poles 25 and 27 are opposed to each other in the circumferential direction.

On the stator 13 side, similarly, a distal end shift direction of the first stator side claw-like magnetic pole 35 and a distal end shift direction of the second stator side claw-like magnetic pole 37 may be set in opposite directions each other. The inclined sections 35*b* and 37*b* of the stator side claw-like magnetic poles 35 and 37 may be opposed to each other in the circumferential direction.

Figure 13A:
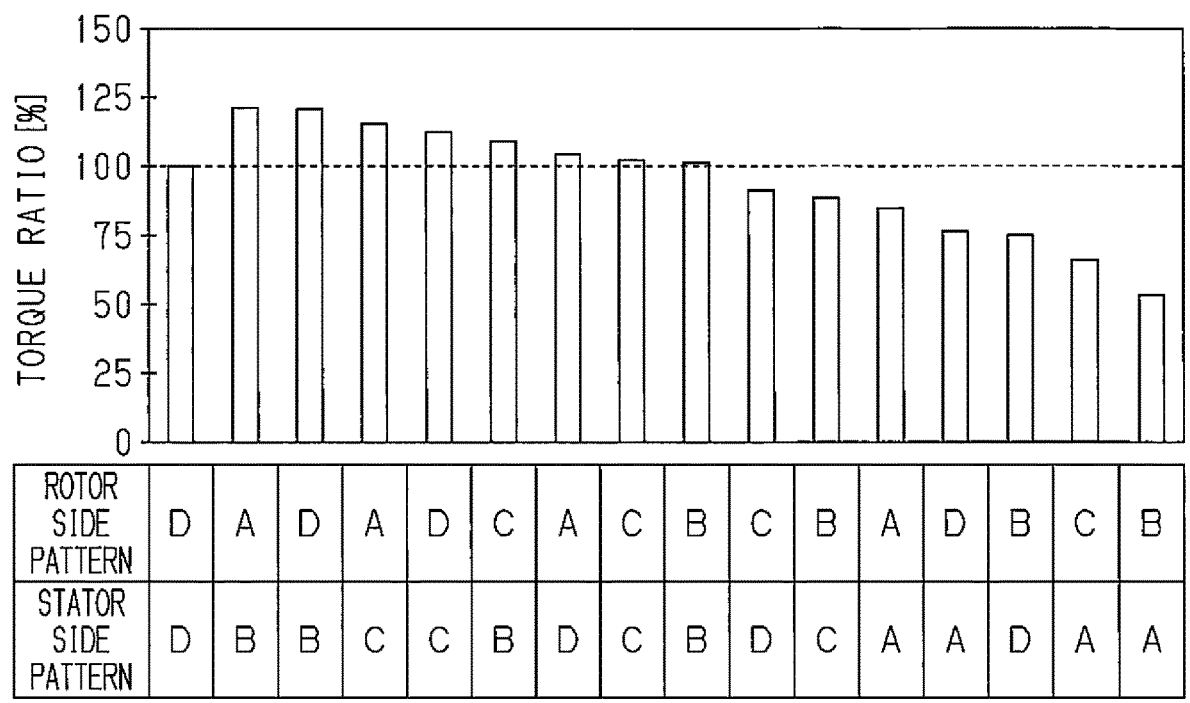
FIG. 13A is a graph showing torques in various patterns in which the shapes of claw-like magnetic poles are different.
Figure 13B:
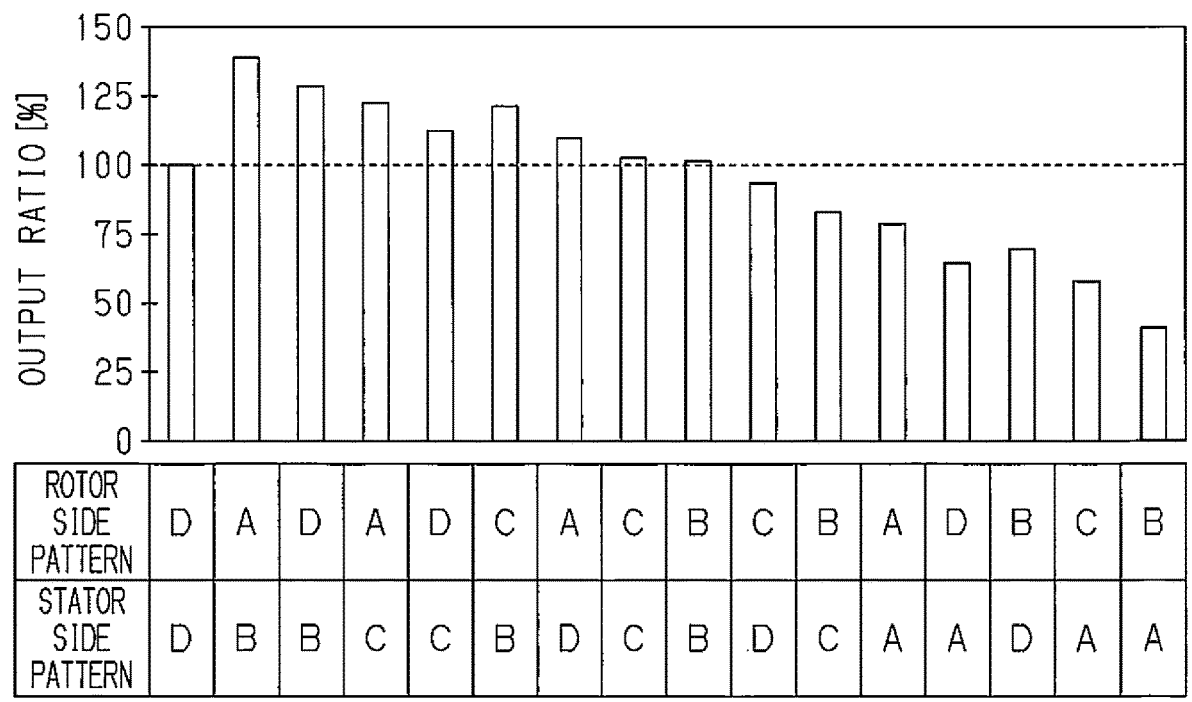
FIG. 13B is a graph showing outputs in the various patterns shown in FIG. 13A.

In FIGS. 13A and 13B, torques and outputs in various patterns in which the distal end shift directions of the claw-like magnetic poles 25, 27, 35, and 37 on the rotor 12 side and the stator 13 side are different are respectively shown. In FIGS. 13A and 13B, a configuration in which the distal end shift direction is the counter rotating direction of the rotor 12 is represented as pattern "A", a configuration in which the distal end shift direction is the rotating direction of the rotor 12 is represented as pattern "B", a configuration in which the distal end shift direction is opposite in the first and second rotor side claw-like magnetic poles 25 and 27 (or the first and second stator side claw-like magnetic poles 35 and 37) (see FIG. 10) is represented as pattern "C", and the conventional configuration (the symmetrical shape) is represented as pattern "D". In FIGS. 13A and 13B, the torque or the output of a configuration in which the patterns of the rotor and the stator side are "D/D" (the conventional configuration) are set to 100%.

As shown in FIG. 13A, among combinations of the patterns, the torque is the highest in a configuration in which the patterns of the rotor and the stator side are "A/B" (the configuration in the embodiment). The torque decreases in "D/B", "A/C", "D/C", "C/B", "A/D", "C/C", and "B/B" in order from the pattern. However, the torques in the patterns are higher than 100%. That is, by setting the claw-like magnetic poles 25, 27, 35, and 37 of the rotor and the stator side in these patterns, it is possible to improve the torque.

The torque is equal to or lower than 100% in a configuration in which the patterns of the rotor and the stator side are "C/D". The torque decreases in "B/C", "A/A", "D/A", "B/D", "C/A", and "B/A" in order from the pattern. That is, by setting the claw-like magnetic poles 25, 27, 35, and 37 of the rotor and the stator side in these patterns, it is possible to provide a motor that can obtain low torque.

In the embodiment, when the rotor 12 shown in FIG. 2 rotates counterclockwise (regularly rotates), the patterns of the rotor and the stator side are "A/B". However, when the rotor 12 rotates clockwise (reversely rotates), the patterns of the rotor and the stator side are "B/A". Consequently, when the rotor 12 is regularly and reversely rotated with the same power supply to the stator 13, it is possible to reduce the torque in the reverse rotation with respect to the torque in the regular rotation.

When two operations having different loads are respectively performed by the regular and reverse rotations of the rotor 12, it is desirable that the operation having a larger load is performed by the regular rotation and the operation having a smaller load is performed by the reverse rotation. For example, in a power window device for a vehicle, loads of an opening motion and a closing motion are different because of the own weight of glass. Therefore, if the regular rotation of the rotor 12 is allocated to the closing motion of the glass and the reverse rotation of the rotor 12 is allocated to the opening motion of the glass, it is possible to realize suitable opening and closing motions of the glass without changing the magnitude of the power supply to the stator 13.

As shown in FIG. 13B, in configurations in which the patterns of the rotor and the stator side are "A/B", "D/B", "A/C", "D/C", "C/B", "A/D", "C/C", and "B/B", the output is higher than 100%. That is, by setting the claw-like magnetic poles 25, 27, 35, and 37 of the rotor and the stator side in these patterns, it is possible to improve the output. The output is the highest in the configuration in which the patterns of the rotor and the stator side are "A/B" (the configuration in the embodiment).

In configurations in which the patterns of the rotor and the stator side are "C/D", "B/C", "A/A", "D/A", "B/D", "C/A", and "B/A", the output is equal to or lower than 100%. That is, by setting the claw-like magnetic poles 25, 27, 35, and 37 of the rotor and the stator side in these patterns, it is possible to provide a motor that can obtain a low output.

As shown in FIGS. 13A and 13B, when the pattern of the stator is "B", that is, the distal end shift directions of the first and second stator side claw-like magnetic poles 35 and 37 are the rotating direction of the rotor 12, it is possible to improve the torque and the output irrespective of the pattern of the rotor.

Figure 11:
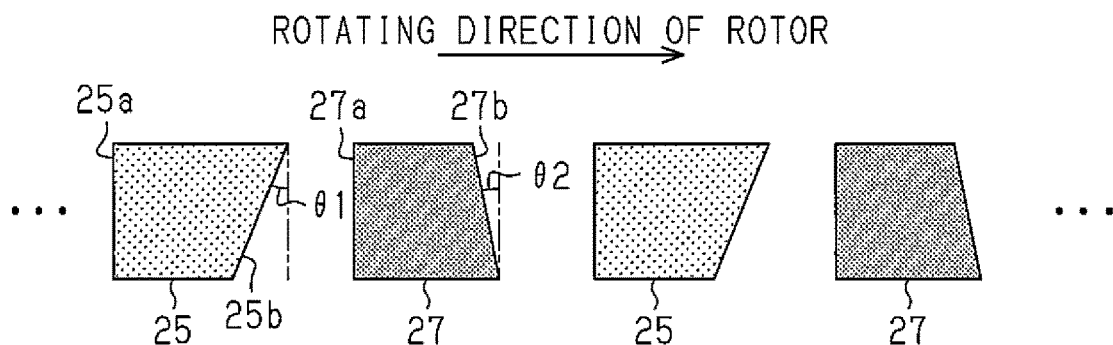
FIG. 11 is a schematic diagram showing first and second rotor side claw-like magnetic poles of still another example of the first embodiment in development.

In the embodiment, the inclination angle $\theta 1$ of the inclined section 25b of the first rotor side claw-like magnetic pole 25 and the inclination angle $\theta 2$ of the inclined section 27b of the second rotor side claw-like magnetic pole 27 are set equal to each other. However, the inclination angles $\theta 1$ and $\theta 2$ are not limited to this. As shown in FIG. 11, the inclination angles $\theta 1$ and $\theta 2$ may be set different from each other. In an example shown in FIG. 11, the inclination angle $\theta 2$ is set smaller than the inclination angle $\theta 1$. However, conversely, the inclination angle $\theta 1$ may be set smaller than the inclination angle $\theta 2$. On the stator 13 side, similarly, the inclination angle $\theta 3$ of the inclined section 35b of the first stator side claw-like magnetic pole 35 and the inclination angle $\theta 4$ of the inclined section 37b of the second stator side claw-like magnetic pole 37 may be set different from each other.

Figure 12:
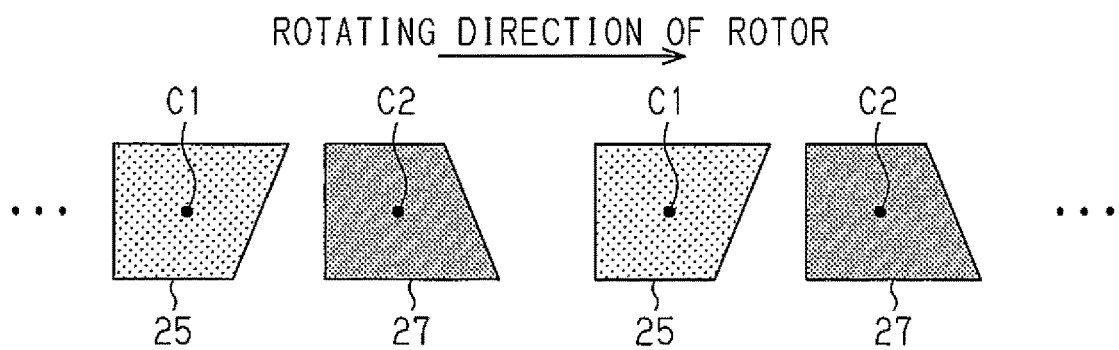
FIG. 12 is a schematic diagram showing first and second rotor side claw-like magnetic poles of still another example of the first embodiment in development.

In the embodiment, the first and second rotor side claw-like magnetic poles 25 and 27 are configured such that the center positions C1 and C2 thereof are arranged at the equal intervals in the circumferential direction. However, the first and second rotor side claw-like magnetic poles 25 and 27 are not limited to this. As shown in FIG. 12, the first and second rotor side claw-like magnetic poles 25 and 27 may be configured such that the center positions C1 and C2 are arranged at unequal intervals in the circumferential direction. On the stator 13 side, similarly, the first and second stator side claw-like magnetic poles 35 and 37 may be configured such that the center positions C3 and C4 thereof are arranged at unequal intervals in the circumferential direction.

In the embodiment, the circumferential ends (the circumferential one ends 25a, 27a, 35a, and 37a) on the opposite side of the inclined sections 25b, 27b, 35b, and 37b in the claw-like magnetic poles 25, 27, 35, and 37 are formed in the linear shape extending along the axial direction of the rotating shaft 11. However, the circumferential ends are not limited to this and may be inclined with respect to the axial direction of the rotating shaft 11. In the embodiment, the claw-like magnetic poles 25, 27, 35, and 37 are formed in the trapezoidal shape as viewed in the radial direction. However, besides the trapezoidal shape, the claw-like magnetic poles 25, 27, 35, and 37 may be formed in, for example, a triangular shape, a semicircular shape, a semielliptical shape, or a polygonal shape.

The number of the claw-like magnetic poles 25, 27, 35, and 37 (the number of magnetic poles) is not limited to the embodiment and may be changed as appropriate according to a configuration.

The first and second rotor cores 21 and 22 in the embodiment are configured such that the distal ends of the first and second rotor side claw-like magnetic poles 25 and 27 are shifted in the circumferential direction. However, the first and second rotor cores 21 and 22 are not limited to this and may be configured such that the radially distal ends of the extending sections 24c and 26c are shifted in the circumferential direction.

Figure 14:
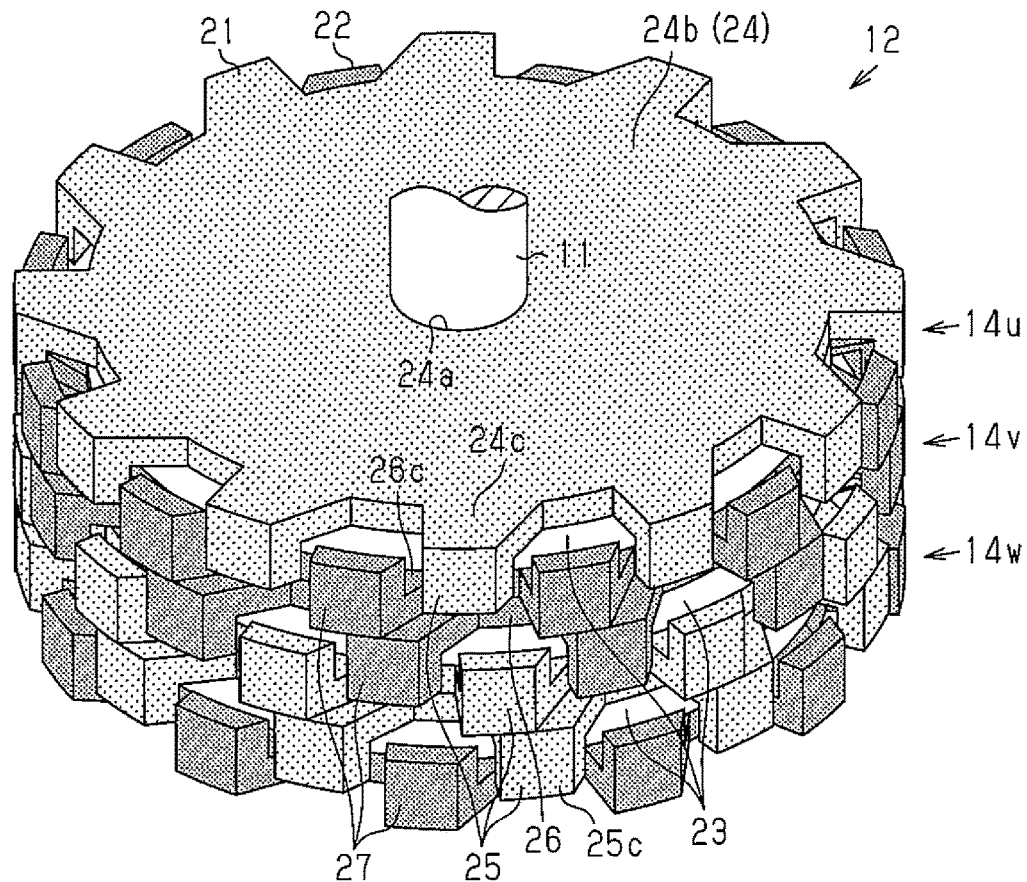
FIG. 14 is a perspective view of a rotor in still another example of the first embodiment.
Figure 15A:
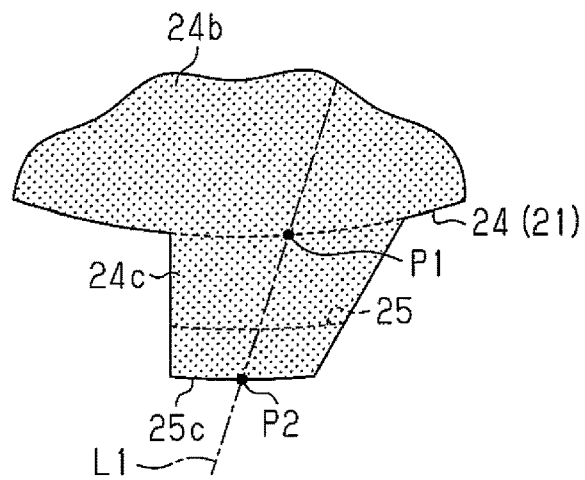
FIG. 15A is a plan view partially showing a first rotor core in the rotor of the example shown in FIG. 14.
Figure 15B:
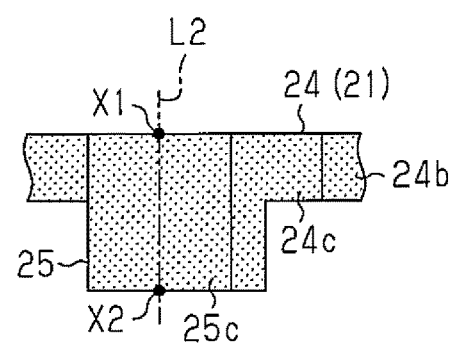
FIG. 15B is a side view showing a first rotor side claw-like magnetic pole of the example shown in FIG. 14.

For example, as shown in FIGS. 14 and 15A and 15B, the extending sections 24c and 26c of the first and second rotor core bases 24 and 26 are formed in shapes in which the radially distal end portions (the outer circumferential side end portions) thereof are shifted to one side in the circumferential direction (in FIG. 14, the clockwise direction).

The extending section 24c of the first rotor core base 24 is explained as an example. As shown in FIG. 15A, the extending section 24c is formed in a trapezoidal shape smaller in width toward the radial outer side when viewed from the axial direction and asymmetrical in the circumferential direction. The extending section 24c is formed in a shape in which the circumferential center P2 of the circumferential distal end portion is shifted to one side in the circumferential direction (the clockwise direction) with respect to the circumferential center P1 at the radially proximal end portion. That is, a straight line L1 passing the circumferential centers P1 and P2 of the proximal end and the distal end of the extending section 24c is formed not to be orthogonal to the axis of the rotating shaft 11.

The first rotor core 21 integrally includes the first rotor side claw-like magnetic poles 25 that project to one side in the axial direction from the radially distal end portions (the outer circumferential side end portions) of the extending sections 24c. As shown in FIG. 15B, an outer circumferential surface 25c (a surface opposed to the stator) of the first rotor side claw-like magnetic pole 25 is formed in a symmetrical rectangular shape when viewed from the radial direction (the front). More specifically, a circumferential center line L2 of the first rotor side claw-like magnetic pole 25 (a straight line passing the circumferential center X1 of the axially proximal end portion and the circumferential center X2 of the axially distal end portion) is parallel to the axial direction. The first rotor side claw-like magnetic pole 25 is formed in a shape line-symmetrical to the circumferential center line L2 when viewed from the radial direction.

The second rotor core 22 includes the extending sections 26c and the second rotor side claw-like magnetic poles 27 respectively having configurations same as the configurations of the extending sections 24c and the first rotor side claw-like magnetic poles 25 of the first rotor core 21.

Note that, when it is assumed that the rotor 12 shown in FIG. 14 rotates counterclockwise, the extending sections 24c and 26c are formed in asymmetrical shapes in which the circumferential centers P2 of the distal end portions are shifted in the counter rotating direction of the rotor 12 with respect to the circumferential centers P1 of the proximal end portions.

With the configuration explained above, it is also possible to vary the reluctance torque according to the shapes of the extending sections 24c and 26c of the first and second rotor cores 21 and 22. As a result, it is possible to vary the motor performance (the torque and the output) even if the power supply to the stator 13 is the same.

The first and second stator cores 31 and 32 in the embodiment are configured such that the distal ends of the first and second stator side claw-like magnetic poles 35 and 37 are shifted in the circumferential direction. However, the first and second stator cores 31 and 32 are not limited to this and may be configured such that the radially distal ends of the extending sections 34b and 36b are shifted in the circumferential direction.

Figure 17A:
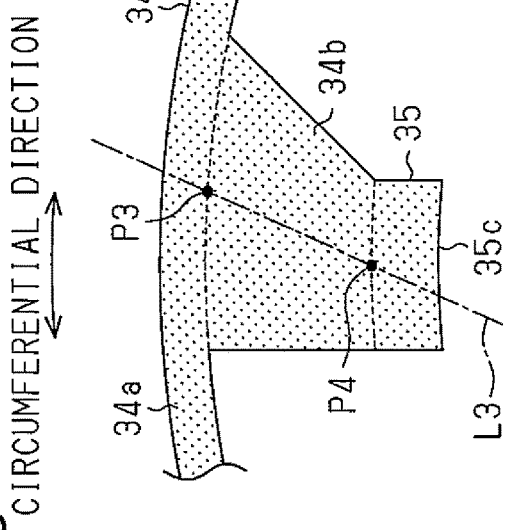
FIG. 17A is a plan view partially showing a first stator core of the stator of the example shown in FIG. 16.
Figure 17B:
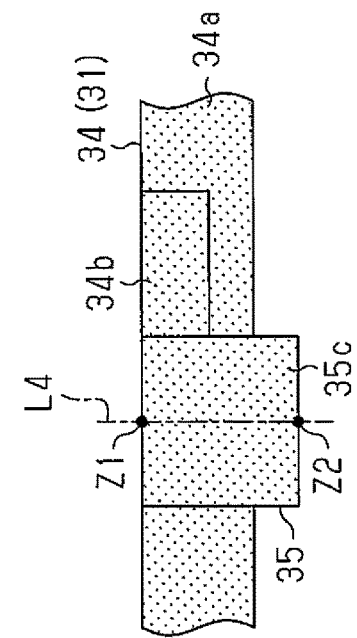
FIG. 17B is a side view showing a first stator side claw-like magnetic pole of the stator of the example shown in FIG. 16.

For example, as shown in FIGS. 16 and 17A and 17B, the extending sections 34b and 36b of the first and second stator core bases 34 and 36 are formed in shapes in which the radially distal end portions (the inner circumferential side end portions) thereof are shifted to one side in the circumferential direction (in FIG. 16, the counterclockwise direction).

The extending section 34b of the first stator core base 34 is explained as an example. As shown in FIG. 17A, the extending section 34b is formed in a trapezoidal shape smaller in width toward the radial inner side when viewed from the axial direction and asymmetrical in the circumferential direction. The extending section 34b is formed in a shape in which a circumferential center P4 of the radially distal end portion is shifted to one side in the circumferential direction (the counterclockwise direction) with respect to a circumferential center P3 at the radially proximal end portion. That is, a straight line L3 passing the circumferential centers P3 and P4 of the proximal end and the distal end of the extending section 34b is formed not to be orthogonal to the axis of the rotating shaft 11.

The first stator core 31 integrally includes the first stator side claw-like magnetic poles 35 projecting to one side in the axial direction from the radially distal end portions (the inner circumferential side end portions) of the extending sections 34b. As shown in FIG. 17B, an inner circumferential surface 35c (a surface opposed to the rotor) of the first stator side claw-like magnetic pole 35 is formed in a symmetrical rectangular shape when viewed from the radial direction (the front). More specifically, a circumferential center line L4 of the first stator side claw-like magnetic pole 35 (a straight line passing the circumferential center Z1 of the axially proximal end portion and the circumferential center Z2 of the axially distal end portion) is parallel to the axial direction. The first stator side claw-like magnetic pole 35 is formed in a shape line-symmetrical to the circumferential center line L4 when viewed from the radial direction.

The second stator core 32 includes the extending sections 36b and the second stator side claw-like magnetic poles 37 respectively having configurations same as the configurations of the extending sections 34b and the first stator side claw-like magnetic poles 35 of the first stator core 31.

Note that, when it is assumed that the rotor 12 rotates counterclockwise, the extending sections 34b and 36b are formed in asymmetrical shapes in which the circumferential centers P4 of the distal end portions are shifted in the rotating direction of the rotor 12 with respect to the circumferential centers P3 of the proximal end portions.

With the configuration explained above, as in the configurations explained above, it is possible to vary the reluctance torque according to the shapes of the extending sections 34b and 36b of the first and second stator cores 31 and 32. As a result, it is possible to vary the motor performance (the torque and the output) even if the power supply to the stator 13 is the same.

The shift direction (the shifting direction) of the radially distal end sides of the extending sections 24c, 26c, 34b, and 36b is not limited to the examples shown in FIGS. 14 to 17B.

Figure 18A:
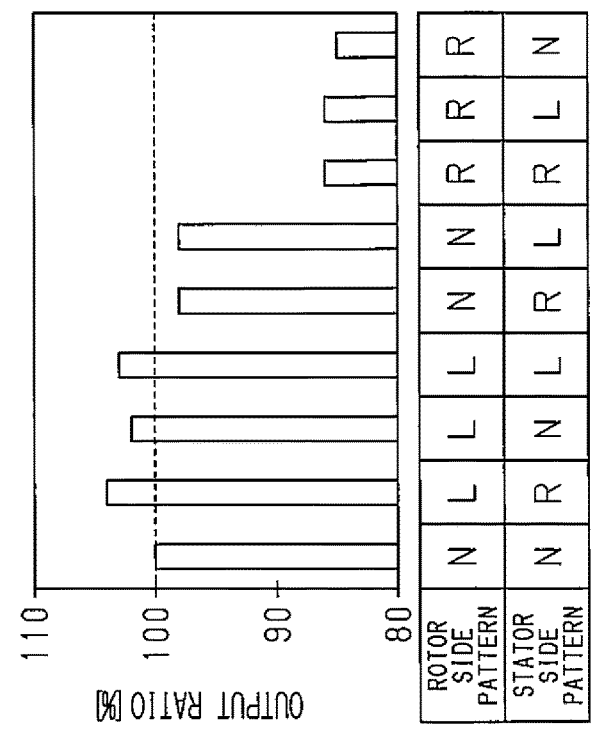
FIG. 18A is a graph showing torques in various patterns in which shapes of extending sections are different.
Figure 18B:
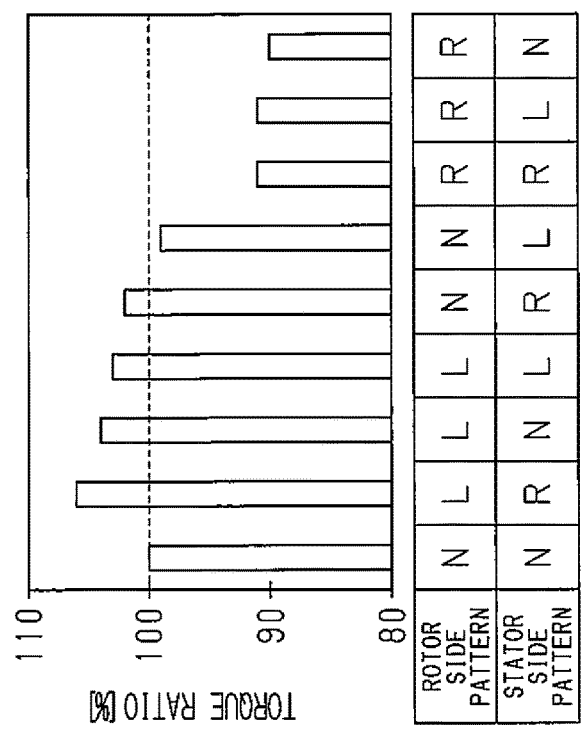
FIG. 18B is a graph showing outputs in the various patterns showing in FIG. 18A.

In FIGS. 18A and 18B, torques and outputs in various patterns in which the distal end shift directions of the extending sections 24c, 26c, 34b, and 36b on the rotor 12 side and the stator 13 side are different are respectively shown. In FIGS. 18A and 18B, a configuration in which the distal end shift direction is the counter rotating direction of the rotor 12 is represented as pattern "L", a configuration in which the distal end shift direction is the rotating direction of the rotor 12 is represented as pattern "R", and the conventional configuration (the symmetrical shape) is represented as pattern "N". In FIGS. 18A and 18B, the torque or the output of a configuration in which the patterns on the motor side and the stator side are "N/N" (the conventional configuration) are set to 100%.

As shown in FIG. 18A, among combinations of the patterns, the torque is the highest in a configuration in which the patterns of the rotor and the stator side are "L/R" (the configuration shown in FIGS. 14 to 17B). The torque decreases in "L/N", "L/L", and "N/R" in order from the pattern. However, the torques in the patterns are higher than 100%. That is, by setting the extending sections 24c, 26c, 34b, and 36b of the rotor and the stator side in these patterns, it is possible to improve the torque.

The torque is equal to or lower than 100% in configurations in which the patterns of the rotor and the stator side are "N/L", "R/R", "R/L", and "R/N". That is, by setting the extending sections 24c, 26c, 34b, and 36b of the rotor and the stator side in these patterns, it is possible to provide a motor that can obtain low torque.

In the combinations of the rotor 12 and the stator 13 shown in FIGS. 14 and 16, when the rotor 12 rotates counterclockwise (regularly rotates), the patterns of the rotor and the stator side are "L/R". However, when the rotor 12 rotates clockwise (reversely rotates), the patterns of the rotor and the stator side are "R/L". Consequently, when the rotor 12 is regularly and reversely rotated with the same power supply to the stator 13, it is possible to reduce the torque in the reverse rotation with respect to the torque in the regular rotation.

As shown in FIG. 18B, in configurations in which the patterns of the rotor and the stator side are "L/R", "L/N", and "L/L", the output is higher than 100%. That is, by setting the extending sections 24c, 26c, 34b, and 36b of the rotor and the stator side in these patterns, it is possible to improve the output. Note that the output is the highest in a configuration in which the patterns of the rotor and the stator side are "L/R" (the configuration in the embodiment).

In configurations in which the patterns of the rotor and the stator side are "N/R", "N/L", "R/R", "R/L", and "R/N", the output is equal to or lower than 100%. That is, by setting the extending sections 24c, 26c, 34B, and 36b of the rotor and the stator side in these patterns, it is possible to provide a motor that can obtain a low output.

As shown in FIGS. 18A and 18B, when the pattern of the rotor is "L", that is, when the distal end shift directions of the extending sections 24c and 26c of the first and second rotor cores 21 and 22 are the counter rotating direction of the rotor 12, it is possible to improve the torque and the output irrespective of the pattern of the stator.

Note that, in the example shown in FIGS. 14 to 17B, the distal end shift directions of the extending sections 24c and 26c of the first and second rotor cores 21 and 22 are the same direction. However, the distal end shift directions are not limited to this. The distal end shift directions may be opposite in the extending sections 24c of the first rotor core 21 and the extending sections 26c of the second rotor core 22. On the stator 13 side, similarly, the distal end shift direction of the extending sections 34b of the first stator core 31 and the distal end shift direction of the extending section 36b of the second stator core 32 may be opposite to each other.

In the example shown in FIGS. 14 to 17B, distal end shift amounts (tilts of the straight line L1 in the circumferential direction) of the extending sections 24c and 26c of the first and second rotor cores 21 and 22 are set equal to each other. However, the distal end shift amounts are not limited to this and may be set different in the extending sections 24c on the first rotor core 21 side and the extending sections 26c on the second rotor core 22 side. Similarly, in the example shown in FIGS. 14 to 17B, distal end shift amounts (tilts of the straight line L3 in the circumferential direction) of the extending sections 34b and 36b of the first and second stator cores 31 and 32 are set equal to each other. However, the distal end shift amounts are not limited to this and may be set different in the extending sections 34b on the first stator core 31 side and the extending sections 36b on the second stator core 32 side.

In the example shown in FIGS. 14 to 17B, the claw-like magnetic poles 25, 27, 35, and 37 are formed in the rectangular shape in the radial direction view (the symmetrical shape in the circumferential direction). However, the claw-like magnetic poles 25, 27, 35, and 37 are not limited to this and may be formed in an asymmetrical shape as in the embodiment.

In the rotor 12 in the embodiment, the magnetization direction of the magnetic field magnet 23 in the V phase is a direction opposite to the magnetization direction of the magnetic field magnets 23 of the U phase and the W phase. However, the magnetization directions are not limited to this. The magnetization directions of the magnetic field magnets 23 in the respective phases may be the same.

In the embodiment, the magnetic field magnet 23 is the ferrite magnet. However, besides the ferrite magnet, the magnetic field magnet 23 may be, for example, a neodymium magnet.

In the embodiment, the rotor 12 (the stator 13) is configured by the rotor sections 14u, 14v, and 14w (the stator sections 30u, 30v, and 30w) of the three layers. However, the rotor sections 14u, 14v, and 14w (the stator sections 30u, 30v, and 30w) may be configured by two or less layers or for or more layers.

In the embodiment, the present invention is applied to the brushless motor 10 of the inner rotor type in which the rotor 12 is arranged on the inner side of the stator 13. However, the present invention may be applied to a motor of an outer rotor type.

Technical ideas that can be grasped from the first embodiment and another example of the first embodiment are additionally explained below.

(A) Inclined sections inclined with respect to the axial direction are respectively formed at the circumferential end portions of the first and second claw-like magnetic poles of the rotor. In the inclined sections of the first claw-like magnetic poles and the inclined sections of the second claw-like magnetic poles, inclination angles thereof are set to be different from each other.

(B) Inclined sections inclined with respect to the axial direction are respectively formed at the circumferential end portions of the first and second claw-like magnetic poles of the stator. In the inclined sections of the first claw-like magnetic poles and the inclined sections of the second claw-like magnetic poles, inclination angles thereof are set to be different from each other.

(C) The first and second claw-like magnetic poles of the rotor are configured such that the center positions thereof are arranged at unequal intervals in the circumferential direction.

(D) The first and second claw-like magnetic poles of the stator are configured such that the center positions thereof are arranged at unequal intervals in the circumferential direction.

With a motor described in (A) to (D) above, it is possible to vary the motor performance (the torque and the output) even if the power supply to the stator is the same.

A motor according to a second embodiment (an example of a multi-Lundell type motor) is explained below.

Figure 19:
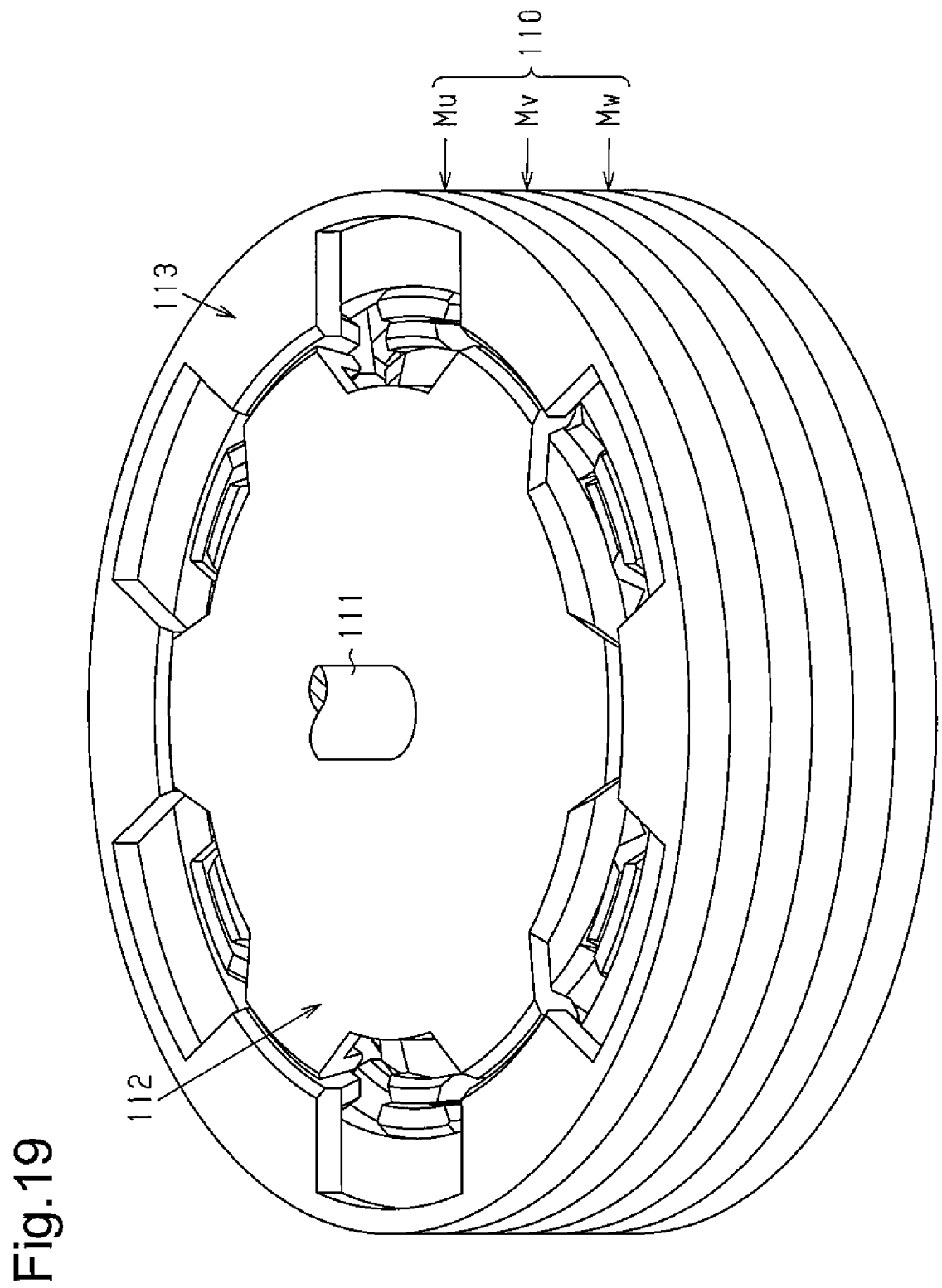
FIG. 19 is a perspective view of a motor according to a second embodiment of the present invention.

As shown in FIG. 19, a motor 110 in this embodiment includes a rotor 112 including a rotating shaft 111 and an annular stator 113 firmly fixed to a motor housing (not shown in the figure) arranged on the outer side of the rotor 112.

The motor 110 is configured from single motor sections in three stages stacked in the axial direction. The single motor sections in the three stages are configured in the order of a U-phase motor section Mu, a V-phase motor section Mv, and a W-phase motor section Mw from the top in FIG. 19.

Figure 20:
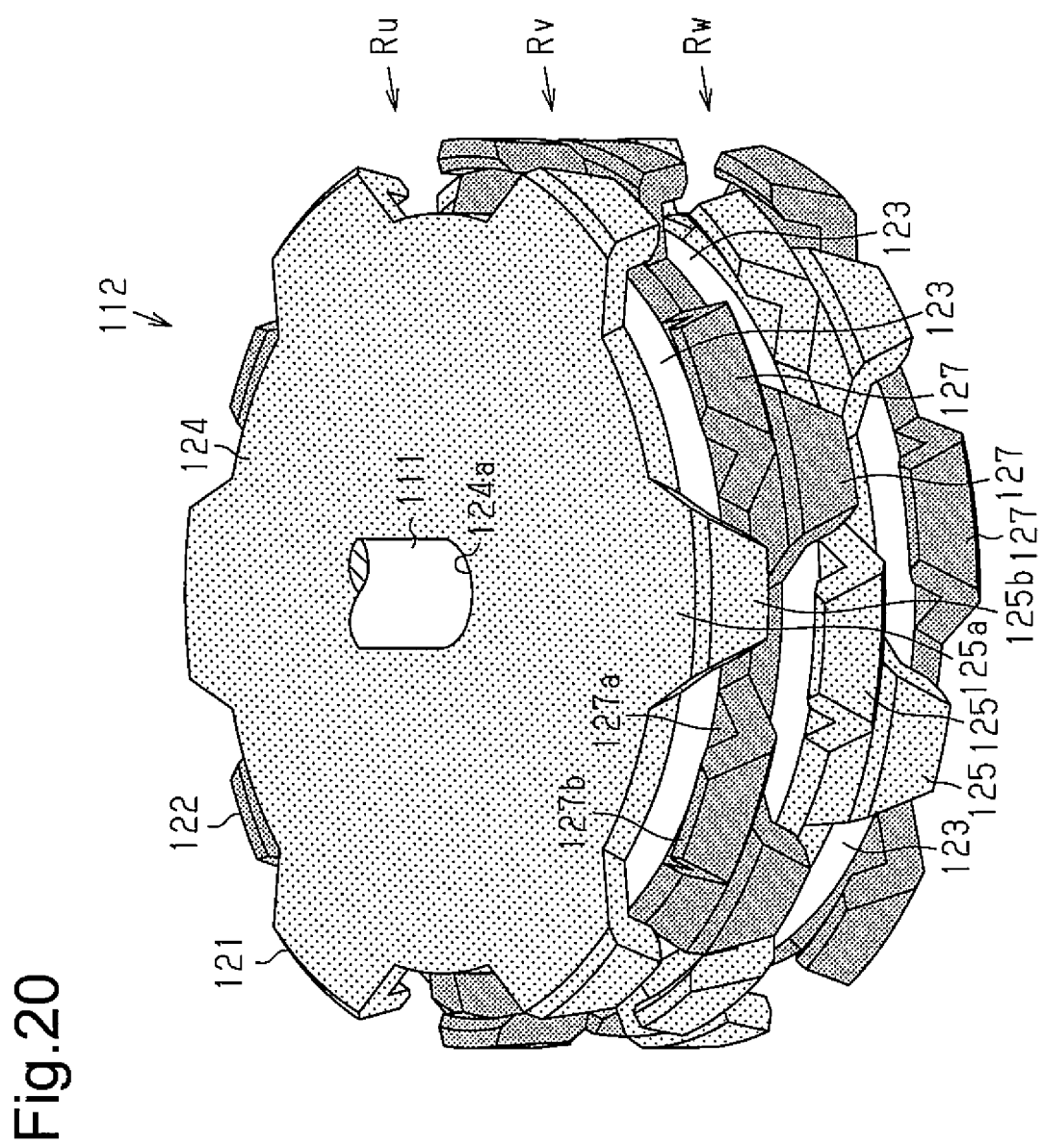
FIG. 20 a perspective view of a rotor according to the second embodiment.
Figure 26:
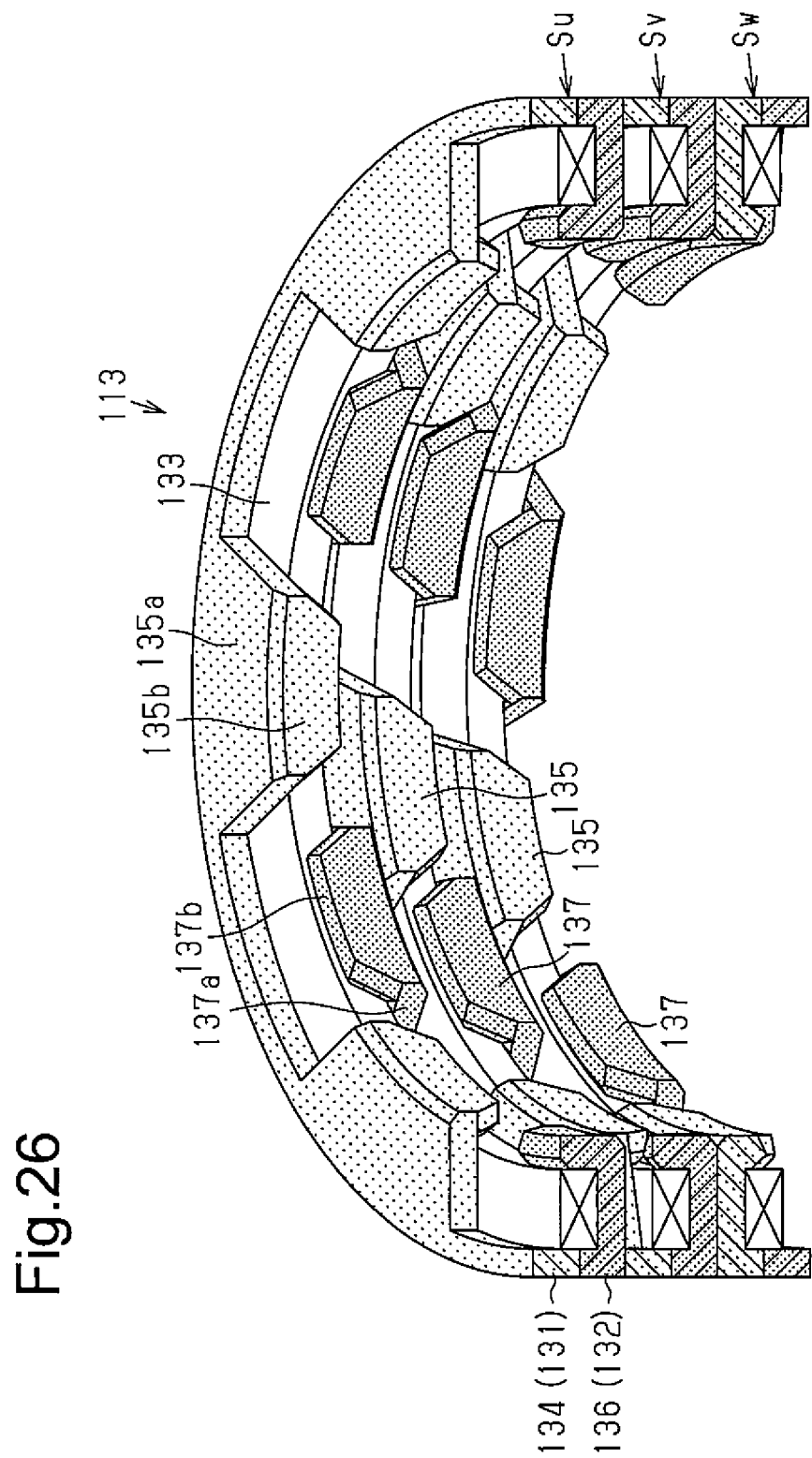
FIG. 26 is a sectional perspective view of a stator in the second embodiment.

As shown in FIGS. 20 and 26, the three motor sections Mu, Mv, and Mw respectively include rotor sections (a U-phase rotor section Ru, a V-phase rotor section Rv, and a W-phase rotor section Rw) and stator sections (a U-phase stator section Su, a V-phase stator section Sv, and a W-phase stator section Sw). The rotor sections Ru, Rv, and Rw in the respective phases configure the rotor 112. The stator sections Su, Sv, and Sw in the respective phases configure the stator 113.

Configuration of the Rotor

As shown in FIG. 20, the rotor sections Ru, Rv and Rw in the three phases configuring the rotor 112 are stacked in order in the axial direction. The rotor sections Ru, Rv, and Rw have substantially the same configurations one another and are configured from first and second rotor cores 121 and 122 and magnetic field magnets 123 sandwiched by the first and second rotor cores 121 and 122.

Figure 21:
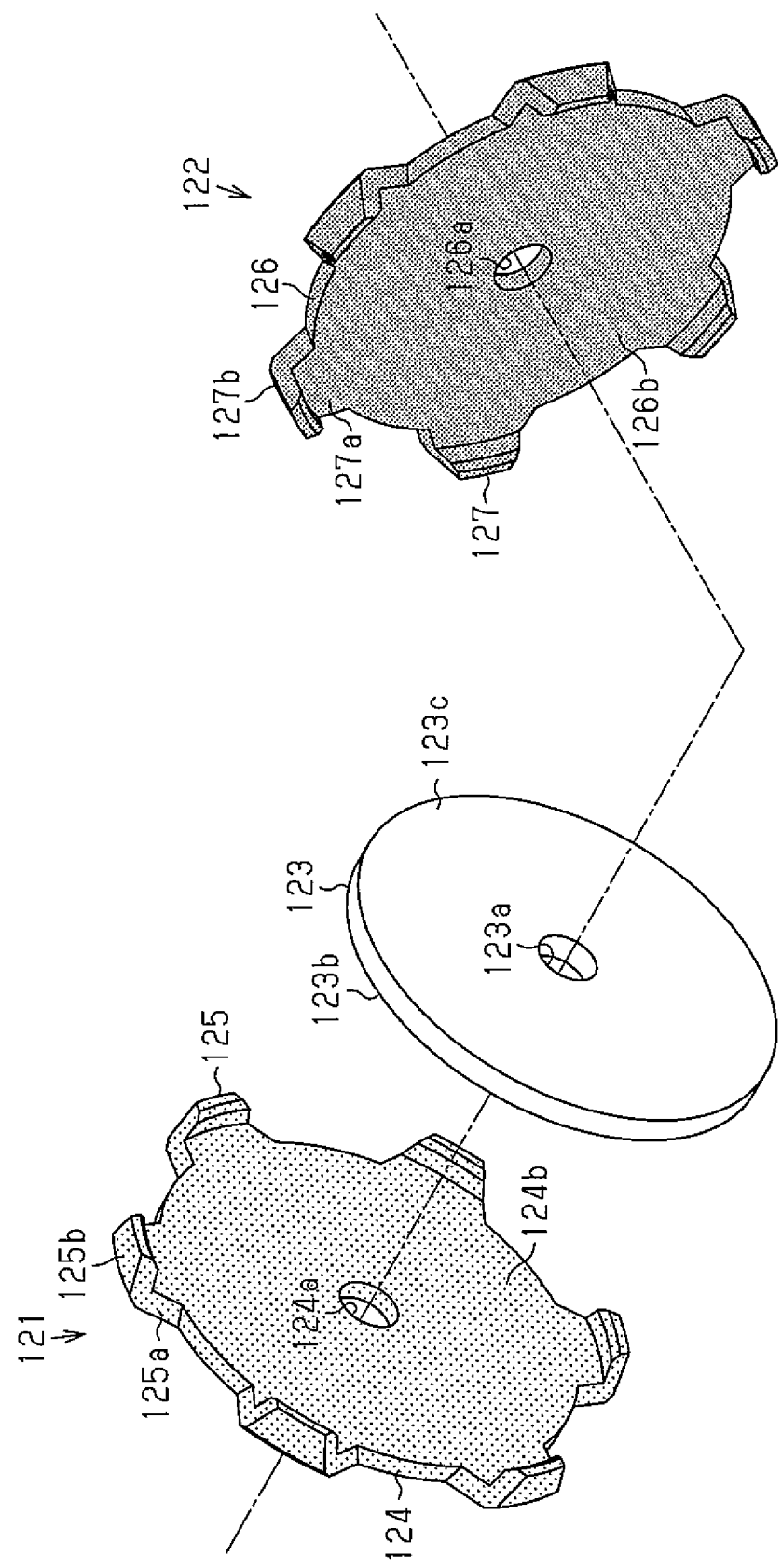
FIG. 21 is an exploded perspective view of a rotor section in the second embodiment.
Figure 22:
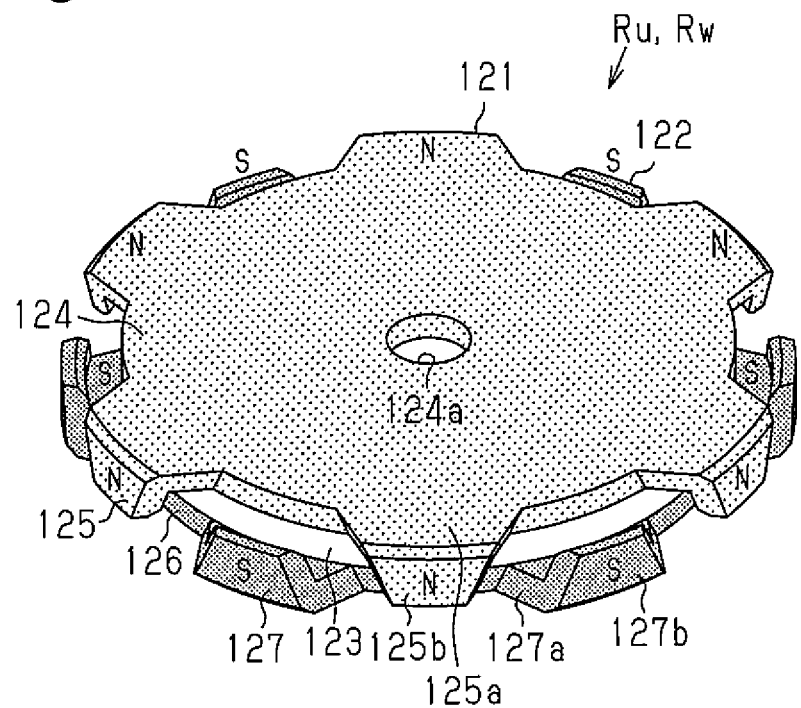
FIG. 22 is a perspective view of U-phase and W-phase rotor sections in the second embodiment.

As shown in FIGS. 20 and 21, the first rotor core 121 includes a disk-like first rotor core base 124 including, in the radial center, a through-hole 124a through which the rotating shaft 111 is inserted and fixed. At the outer circumferential edge of the first rotor core base 124, six first rotor side claw-like magnetic poles 125 are provided at equal intervals (60 degree intervals) one another.

The first rotor side claw-like magnetic pole 125 integrally includes a radially extending section 125a extending from the outer circumferential edge of the first rotor core base 124 to the radial outer side and a first magnetic pole section 125b projecting to one side in the axial direction from the distal end portion (the radial outer side end portion) of the radially extending section 125a. Note that the first rotor side claw-like magnetic pole 125 may be formed by bending the first magnetic pole section 125b at a right angle with respect to the radially extending section 125a. Alternatively, the radially extending section 125a and the first magnetic pole section 125b may be integrally molded by casting.

The radially extending section 125a is formed in a trapezoidal shape smaller in width toward the radial outer side when viewed from the axial direction. The first magnetic pole section 125b is formed in a trapezoidal shape smaller in width toward the distal end when viewed from the radial direction. Both the circumferential side surfaces of the first rotor side claw-like magnetic poles 125 including the radially extending section 125a and the first magnetic pole section 125b are flat surfaces and are formed to be closer to each other toward the radial outer side. The first rotor side claw-like magnetic pole 125 is formed line-symmetrically to the circumferential center thereof.

As shown in FIG. 21, the second rotor core 122 is formed in a shape same as the shape of the first rotor core 121 and includes a second rotor core base 126 and second rotor side claw-like magnetic poles 127. The second rotor core base 126 (a through-hole 126a) and the second rotor side claw-like magnetic poles 127 (radially extending sections 127a and second magnetic pole sections 127b) are respectively formed in shapes same as the shapes of the first rotor core base 124 (the through-hole 124a) and the first rotor side claw-like magnetic poles 125 (the radially extending sections 125a and the first magnetic pole sections 125b).

As shown in FIG. 20, the first rotor core 121 and the second rotor core 122 are assembled such that the distal ends of the magnetic pole sections 125b and 127b thereof face opposite directions each other. The second magnetic pole sections 127b are arranged in the circumferential direction between corresponding ones of the first magnetic pole sections 125b. That is, the first magnetic pole sections 125b and the second magnetic pole sections 127b are alternately lined in the circumferential direction in an assembled state.

Note that the axial length of the first magnetic pole section 125b is set such that the distal end face of the first magnetic pole section 125b is in the same position as an opposed surface 126b (the axially inner side surface) of the second rotor core base 126. Similarly, the axial length of the second magnetic pole section 127b is set such that the distal end face of the second magnetic pole section 127b is in the same position as an opposed surface 124b (the axially inner side surface) of the first rotor core base 124.

In the assembled state of the first and second rotor cores 121 and 122, the first and second rotor core bases 124 and 126 are formed parallel to each other. The magnetic field magnet 123 is arranged between the first and second rotor core bases 124 and 126.

As shown in FIG. 21, the magnetic field magnet 123 is, for example, a disk-like permanent magnet formed by a ferrite magnet. A through-hole 123a, through which the rotating shaft 111 is inserted, is formed in the center position of the magnetic field magnet 123. One end face 123b of the magnetic field magnet 123 is in contact with the opposed surface 124b of the first rotor core base 124. The other end face 123c of the magnetic field magnet 123 is in contact with the opposed surface 126b of the second rotor core base 126. The magnetic field magnet 123 is sandwiched and fixed in the axial direction between the first rotor core base 124 and the second rotor core base 126. Note that the outer diameter of the magnetic field magnet 123 is set to coincide with the outer diameter of the core bases 124 and 126.

The magnetic field magnet 123 is magnetized in the axial direction to set the first rotor core base 124 side as an N pole and set the second rotor core base 126 side as an S pole. Therefore, the first rotor side claw-like magnetic poles 125 of the first rotor core 121 are caused to function as N poles (first magnetic poles) by the magnetic field magnet 123. The second rotor side claw-like magnetic poles 127 of the second rotor core 122 are caused to function as S poles (second magnetic poles) by the magnetic field magnet 123.

In the rotor sections Ru, Rv, and Rw formed in a so-called Lundell type structure including the magnetic field magnets 123 as explained above, the first rotor side claw-like magnetic poles 125 functioning as the N poles and the second rotor side claw-like magnetic poles 127 functioning as the S poles are alternately arranged in the circumferential direction. Each of the rotor sections Ru, Rv, and Rw is configured by twelve poles (six pole pairs).

In this embodiment, an assembly form of the first and second rotor cores 121 and 122 is different in the U-phase and W-phase rotor sections Ru and Rw in the upper and lower stages and the V-phase rotor section Rv in the middle stage.

Figure 23:
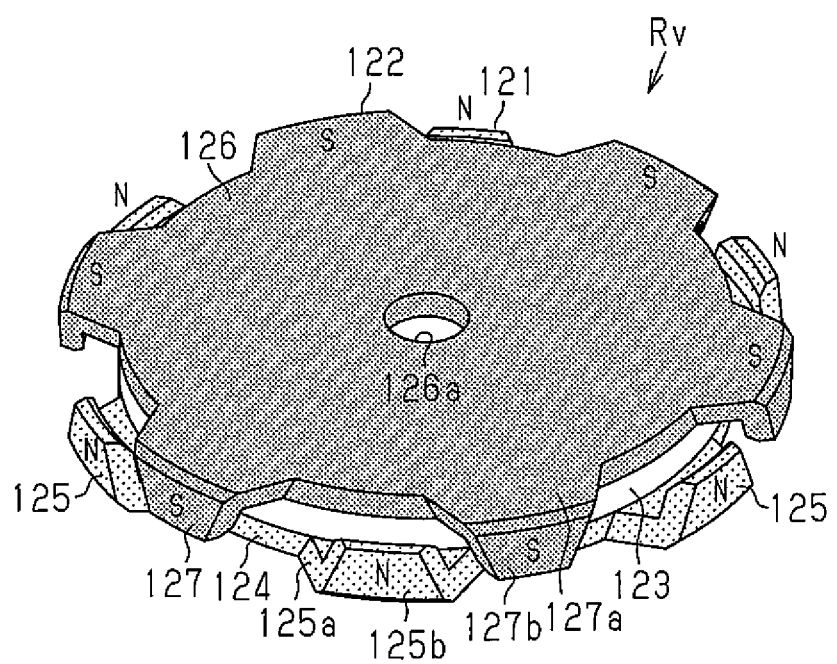
FIG. 23 is a perspective view of a V-phase rotor section in the second embodiment.

More specifically, as shown in FIGS. 20 and 23, the U-phase and W-phase rotor sections Ru and Rw in the upper and lower stages are formed in the same shape each other. In the U-phase and W-phase rotor sections Ru and Rw, the first and second rotor cores 121 and 122 are assembled such that the first magnetic pole sections 125b of the first rotor side claw-like magnetic pole 125 and the second magnetic pole sections 127b of the second rotor side claw-like magnetic poles 127 are arranged at equal intervals (30 degree interval) in the circumferential direction.

On the other hand, as shown in FIGS. 20 and 23, in the V-phase rotor section Rv in the middle stage, the first and second rotor cores 121 and 122 are assembled such that the first magnetic pole sections 125b and the second magnetic pole sections 127b are arranged at unequal intervals in the circumferential direction. That is, in the V-phase rotor section Rv, the first magnetic pole sections 125b and the second magnetic pole sections 127b are formed at equal intervals. However, the first magnetic pole section 125b is assembled to be closer to one of the second magnetic pole sections 127b on two sides thereof and separated from the other. In this embodiment, the interval between the first and second magnetic pole sections 125b and 127b are set to 24 degrees between the first and second magnetic pole sections 125b and 127b close to each other and set to 36 degrees between the first and second magnetic pole sections 125b and 127b separated from each other.

A stacked structure of the rotor sections Ru, Rv, and Rw in the respective phases is explained.

Figure 24:
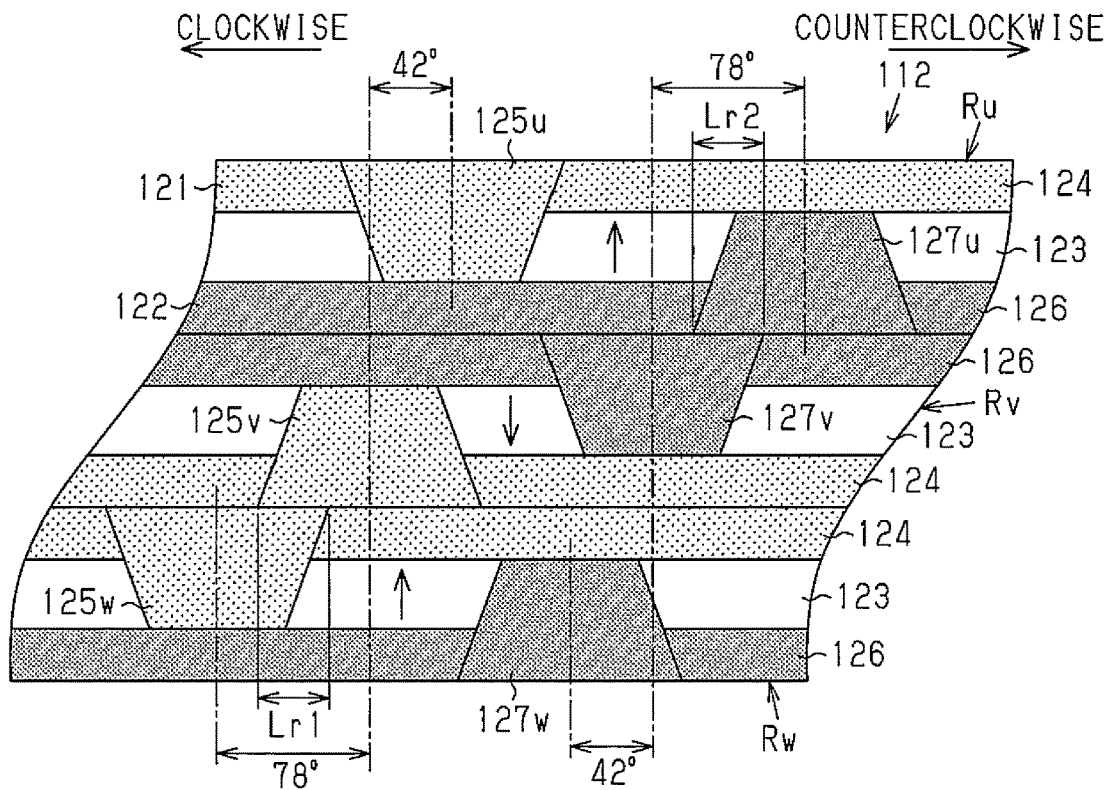
FIG. 24 is a schematic diagram for explaining a positional relation between first and second rotor side claw-like magnetic poles in the second embodiment.

As shown in FIG. 24, the U-phase rotor section Ru, the V-phase rotor section Rv, and the W-phase rotor section Rw are stacked in order in the axial direction to configure the rotor 112.

The V-phase rotor section Rv in the middle stage is stacked in a reversed state with respect to the U-phase and W-phase rotor sections Ru and Rw in the upper and lower stages. That is, between the U phase and the V phase, the second rotor core bases 126 are adjacent to each other in the axial direction. Between the V phase and the W phase, the first rotor core bases 124 are adjacent to each other in the axial direction.

Consequently, magnetization directions of the magnetic field magnets 123 in the U phase and the W phase are set in the same direction (in FIG. 24, upward). A magnetization direction of the magnetic field magnet 123 in the V phase is set in a direction opposite to the magnetization direction of the magnetic field magnets 123 in the U phase and the W phase. More specifically, S poles of the magnetic field magnets 123 in the U phase and the V phase are opposed to each other via two second rotor core bases 126 adjacent to each other. N poles of the magnetic field magnets 123 in the V phase and the W phase are opposed to each other via two first rotor core bases 124 adjacent to each other. That is, magnetization directions of the rotor sections Ru, Rv, and Rw (the magnetic field magnets 123) are opposite to magnetization directions of phases adjacent to each other.

Projecting directions in the axial direction of the first magnetic pole sections 125b (the first rotor side claw-like magnetic poles 125) of the U-phase and W-phase rotor sections Ru and Rw are the same direction (in FIG. 24, downward). On the other hand, a projecting direction of the first magnetic pole sections 125b in the V phase is a direction (in FIG. 24, upward) opposite to the projecting direction of the first magnetic pole sections 125b in the U phase and the W phase.

Similarly, projecting directions in the axial direction of the second magnetic pole sections 127b (the second rotor side claw-like magnetic poles 127) of the U-phase and W-phase rotor sections Ru and Rw are the same direction (in FIG. 24, upward). A projecting direction of the second magnetic pole sections 127b in the V phase is a direction (in FIG. 24, downward) opposite to the projecting direction of the second magnetic pole sections 127b in the U phase and the W phase.

The W-phase rotor section Rw is provided to be shifted 120 degrees in the phase in the electrical angle (20 degrees in the mechanical angle) in the clockwise direction with respect to the U-phase rotor section Ru including the same configuration.

The V-phase rotor section Rv is provided such that the first rotor side claw-like magnetic pole 125 thereof (in FIG. 24, a first rotor side claw-like magnetic pole 125v) is shifted 42 degrees in the electrical angle (7 degrees in the mechanical angle) in the clockwise direction with respect to a first rotor side claw-like magnetic pole 125u in the U phase. That is, a first rotor side claw-like magnetic pole 125w in the W phase is provided to be shifted 78 degrees in the electrical angle (13 degrees in the mechanical angle) in the clockwise direction with respect to the first rotor side claw-like magnetic pole 125v in the V phase.

A second rotor side claw-like magnetic pole 127v in the V phase is provided to be shifted 78 degrees in the electrical angle (13 degrees in the mechanical angle) in the clockwise direction with respect to a second rotor side claw-like magnetic pole 127u in the U phase. That is, a second rotor side claw-like magnetic pole 127w in the W phase is provided to be shifted 42 degrees in the electrical angle (7 degrees in the mechanical angle) in the clockwise direction with respect to the second rotor side claw-like magnetic pole 127v in the V phase.

Figure 25:
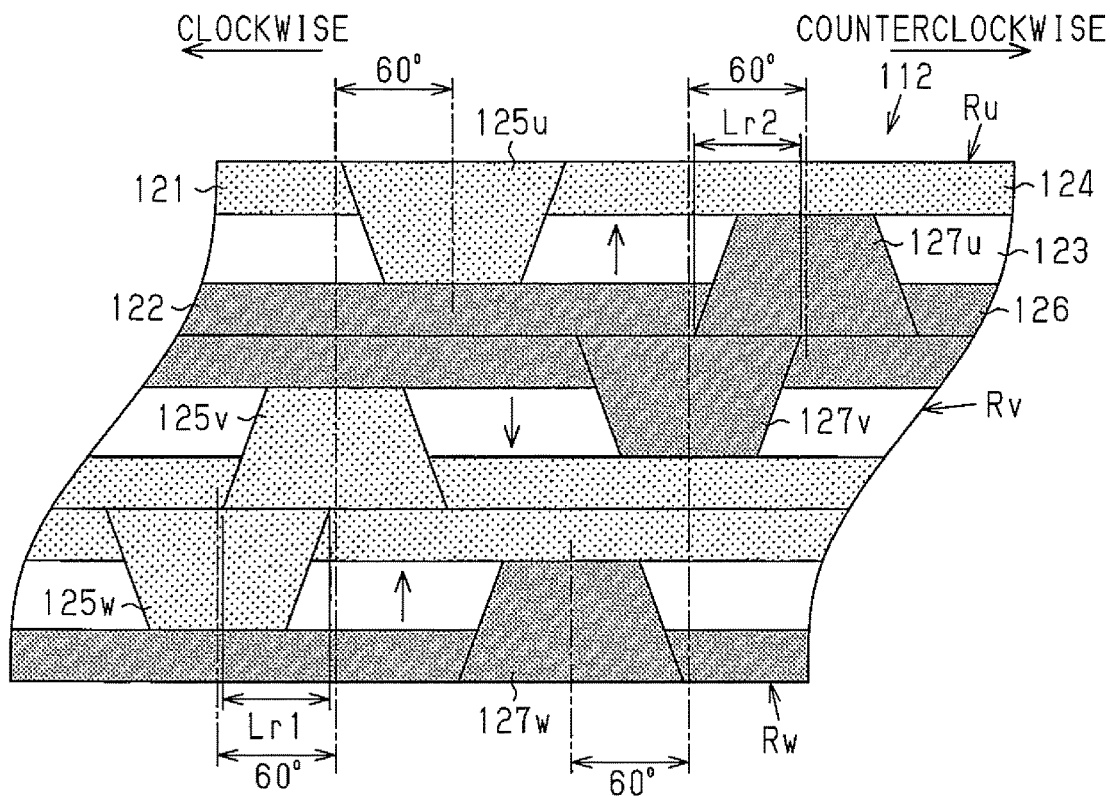
FIG. 25 is a schematic diagram for explaining a positional relation between first and second rotor side claw-like magnetic poles of a reference configuration.

As shown in FIG. 25, a configuration in which the first and second rotor side claw-like magnetic poles 125v and 127v in the V phase are arranged at equal intervals and shifted in the phase 60 degrees in the electrical angle (10 degrees in the mechanical angle) in the clockwise direction with respect to the U phase is set as a reference position. The first rotor side claw-like magnetic pole 125v in the V phase in this embodiment shown in FIG. 24 is shifted 18 degrees in the electrical angle (3 degrees in the mechanical angle) in the counterclockwise direction with respect to the reference position. The second rotor side claw-like magnetic pole 127v in the V phase in this embodiment shown in FIG. 24 is shifted 18 degrees in the electrical angle in the clockwise direction with respect to the reference position.

That is, in the V-phase rotor section Rv in this embodiment, the first rotor core 121 in the V phase (the first rotor side claw-like magnetic pole 125v) is shifted with respect to the reference position in a rotating direction in which an overlapping width Lr1 in the circumferential direction of the first rotor side claw-like magnetic poles 125v and 125w in the V phase and the W phase decreases. Similarly, the second rotor core 122 in the V phase (the second rotor side claw-like magnetic pole 127v) is shifted with respect to the reference position in a rotating direction in which an overlapping width Lr2 in the circumferential direction of the second rotor side claw-like magnetic poles 127u and 127v in the U phase and the V phase decreases.

Stator

As shown in FIG. 26, the stator 113 arranged on the radial outer side of the rotor 112 is configured from stator sections Su, Sv, and Sw in the three phases (the U phase, the V phase, and the W phase) stacked in the axial direction to correspond to the rotor sections Ru, Rv, and Rw. The stator sections Su, Sv, and Sw have substantially the same configurations one another and are configured from first and second stator cores 131 and 132 and winding wires 133 arranged in the axial direction between the first and second stator cores 131 and 132.

Figure 27:
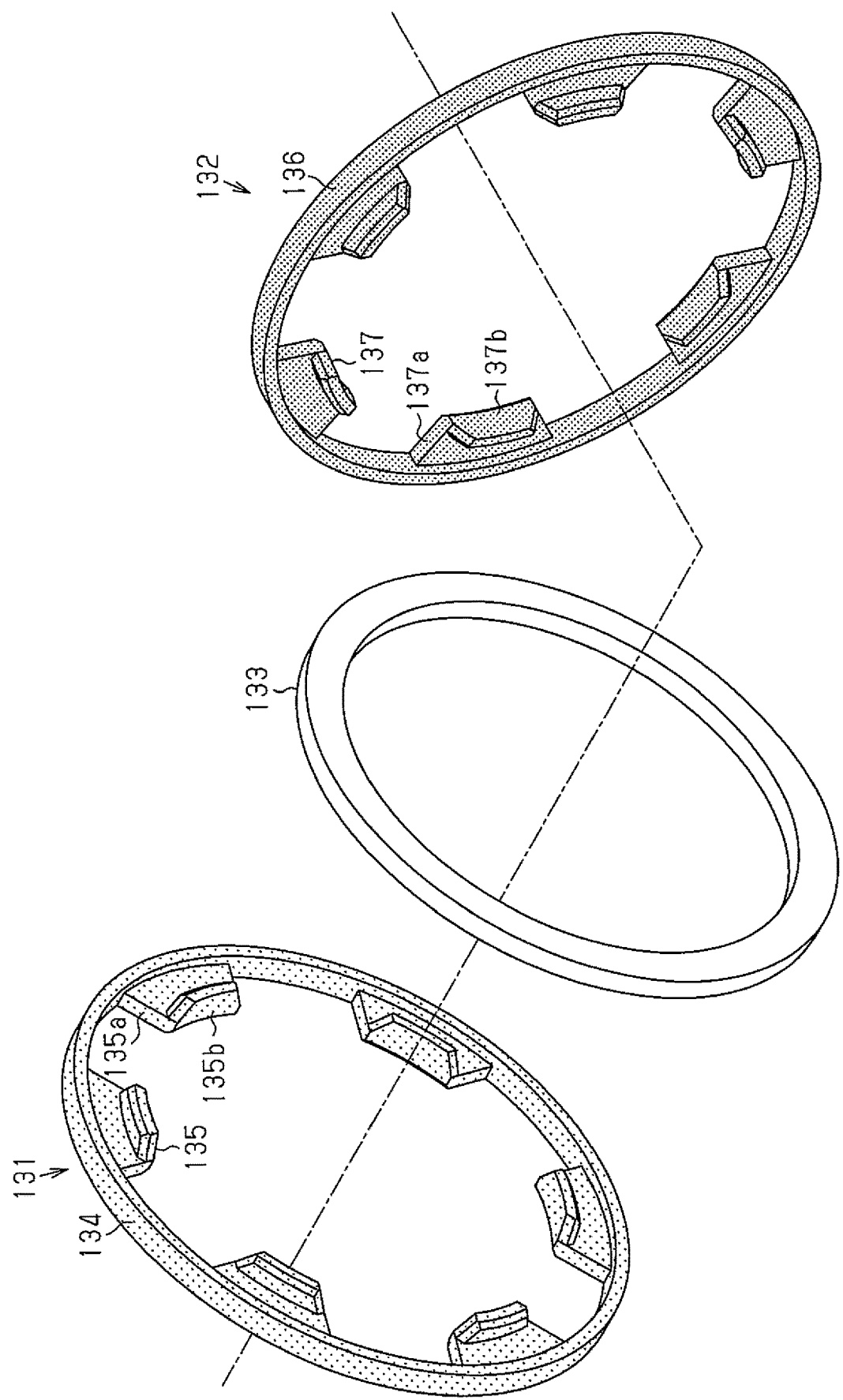
FIG. 27 is an exploded perspective view of a stator section in the second embodiment.

As shown in FIGS. 26 and 27, the first stator core 131 includes a cylindrical first stator core base 134 centering on the axis of the rotating shaft 111. On the inner circumferential surface of the first stator core base 134, six first stator side claw-like magnetic poles 135 are provided at equal intervals (60 degree intervals) one another.

The first stator side claw-like magnetic pole 135 integrally includes a radially extending section 135a extending from the inner circumferential surface of the first stator core base 134 to the radial inner side and a first magnetic pole section 135b projecting to one side in the axial direction from the distal end portion (the radial inner side end portion) of the radially extending section 135a. Note that the first stator side claw-like magnetic pole 135 may be formed by bending the first magnetic pole section 135b at a right angle with respect to the radially extending section 135a. The radially extending section 135a and the first magnetic pole section 135b may be integrally molded by casting.

The radially extending section 135a is formed in a trapezoidal shape smaller in width toward the radial inner side when viewed from the axial direction. The first magnetic pole section 135b is formed in a trapezoidal shape smaller in width toward the distal end when viewed from the radial direction. The first stator side claw-like magnetic pole 135 is formed line-symmetrically with respect to a circumferential center thereof.

As shown in FIG. 27, the second stator core 132 includes a configuration same as the configuration of the first stator core 131 and includes a second stator core base 136 and second stator side claw-like magnetic poles 137. The second stator core base 136 and the second stator side claw-like magnetic poles 137 (radially extending sections 137a and second magnetic pole sections 137b) are respectively formed in shapes same as the first stator core base 134 and the first stator side claw-like magnetic poles 135 (the radially extending section 135a and the first magnetic pole sections 135b) of the shapes of the first stator core 131.

As shown in FIG. 26, the first and second stator core bases 134 and 136 are set in contact with each other in the axial direction to configure the outer circumferential walls of the stator sections Su, Sv, and Sw. In spaces on the inner circumferential sides of the first and second stator core bases 134 and 136 and in the axial direction between the radially extending sections 135a and 137a, winding wires 133 formed in a ring shape in the circumferential direction of the rotating shaft 111 are arranged.

The first stator core 131 and the second stator core 132 are assembled such that the distal ends of the magnetic pole sections 135b and 137b thereof face opposite directions each other. The second magnetic pole sections 137b are arranged in the circumferential direction between corresponding ones of the first magnetic pole sections 135b. That is, the first magnetic pole sections 135b and the second magnetic pole sections 137b are alternately lined in the circumferential direction in the assembled state. The radially extending sections 135a and 137a of the first and second stator side claw-like magnetic poles 135 and 137 are formed parallel to each other.

The stator sections Su, Sv, and Sw configured as explained above are formed in a so-called Lundell type (a claw pole type) structure including twelve poles that energize, with the winding wires 133, the first and second stator side claw-like magnetic poles 135 and 137 to be different magnetic poles each other at every moment.

In the stator 113 in this embodiment, as in the case of the rotor 112, an assembly form of the first and second stator cores 131 and 132 is different in the U-phase and W-phase stator sections Su and Sw in the upper and lower stages and the V-phase stator section Sv in the middle stage.

Figure 28:
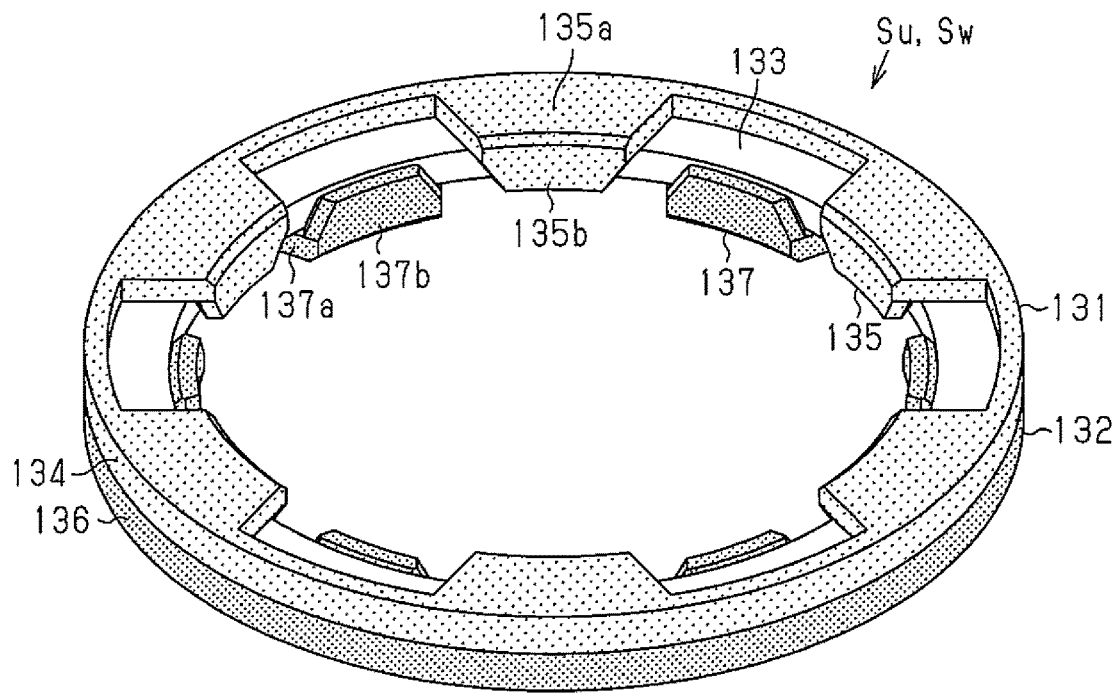
FIG. 28 is a perspective view of U-phase and W-phase stator sections in the second embodiment.

More specifically, as shown in FIGS. 26 and 28, the U-phase and W-phase stator sections Su and Sw in the upper and lower stages are formed in the same shape each other. In the U-phase and W-phase stator sections Su and Sw, the first and second stator cores 131 and 132 are assembled such that the first magnetic pole sections 135b of the first stator side claw-like magnetic pole 135 and the second magnetic pole sections 137b of the second stator side claw-like magnetic poles 137 are arranged at equal intervals (30 degree interval) in the circumferential direction.

Figure 29:
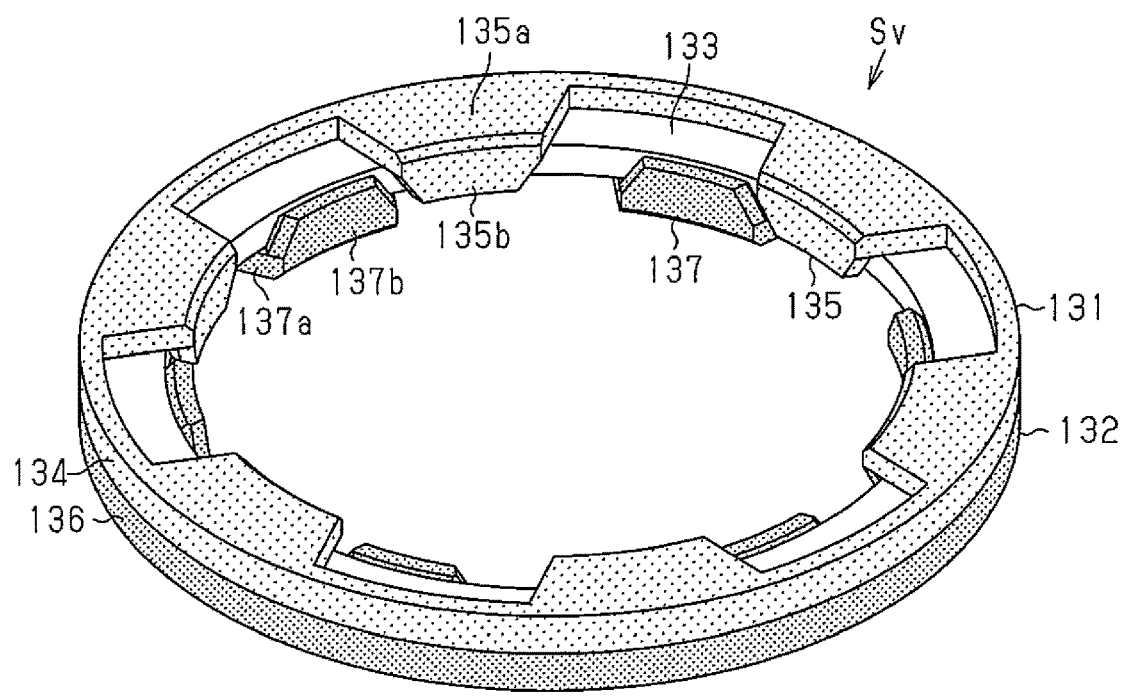
FIG. 29 is a perspective view of a V-phase stator section in the second embodiment.

On the other hand, as shown in FIGS. 26 and 29, in the V-phase stator section Sv in the middle stage, the first and second stator cores 131 and 132 are assembled such that the first magnetic pole sections 135b and the second magnetic pole sections 137b are arranged at unequal intervals in the circumferential direction. That is, in the V-phase stator section Sv, the first magnetic pole sections 135b and the second magnetic pole sections 137b are formed at equal intervals. However, the second magnetic pole section 135b is assembled to be closer to one of the second magnetic pole sections 137b on two sides thereof and separated from the other. In this embodiment, the interval between the first and second magnetic pole sections 135b and 137b is set to 24 degrees between the first and second magnetic pole sections 135b and 137b close to each other and set to 36 degrees between the first and second magnetic pole sections 135b and 137b separated from each other.

A stacked structure of the stator sections Su, Sv, and Sw in the respective phases is explained.

Figure 30:
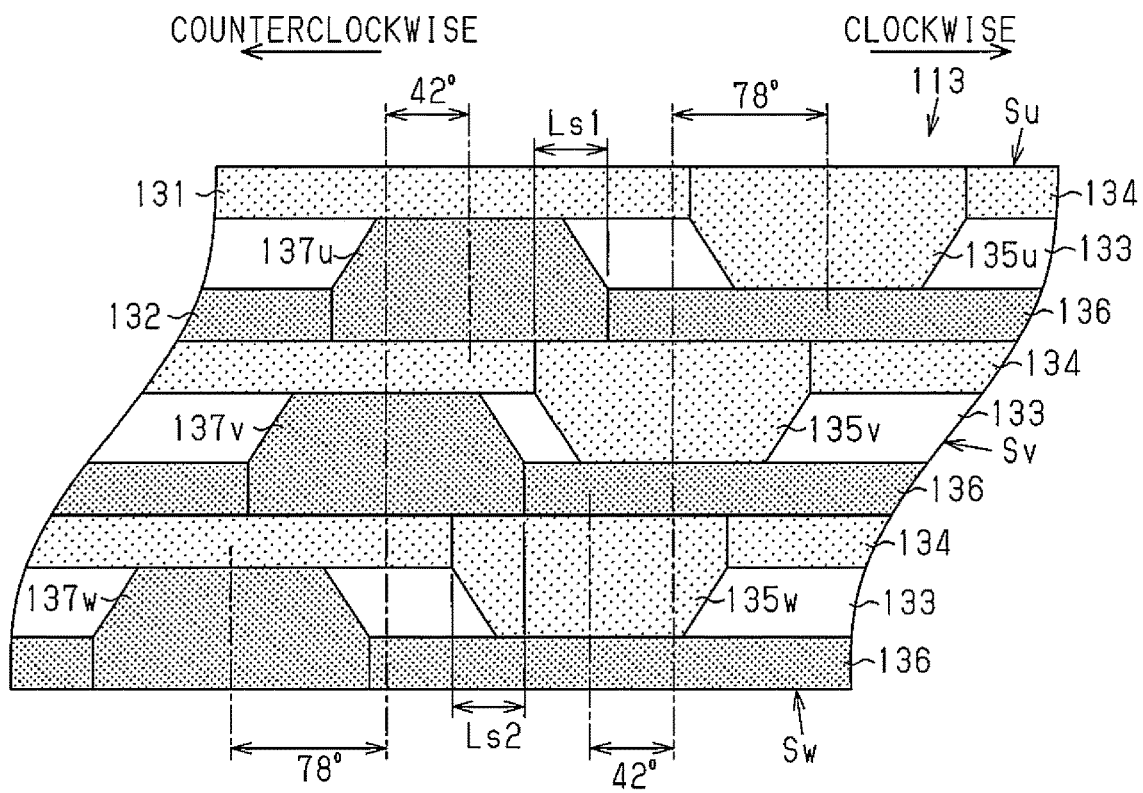
FIG. 30 is a schematic diagram for explaining a positional relation between first and second stator side claw-like magnetic poles in the second embodiment.

As shown in FIG. 30, the U-phase stator section Su, the V-phase stator section Sv, and the W-phase stator section Sw are stacked in order in the axial direction to configure the stator 113. The stator sections Su, Sv, and Sw are stacked such that the first stator core base 134 and the second stator core base 136 are alternately arranged in the axial direction.

The W-phase stator section Sw is provided to be shifted in the phase 120 degrees in the electrical angle (20 degrees in the mechanical angle) in the counterclockwise direction with respect to the U-phase stator section Su including the same configuration.

The V-phase stator section Sv is provided such that the first stator side claw-like magnetic pole 135 thereof (in FIG. 30, a first stator side claw-like magnetic pole 135v) is shifted 78 degrees in the electrical angle (13 degrees in the mechanical angle) in the counterclockwise direction with respect to a first stator side claw-like magnetic pole 135u in the U phase. That is, a first stator side claw-like magnetic pole 135w in the W phase is provided to be shifted 42 degrees in the electrical angle (7 degrees in the mechanical angle) in the counterclockwise direction with respect to the first stator side claw-like magnetic pole 135v in the V phase.

A second stator side claw-like magnetic pole 137v in the V phase is provided to be shifted 42 degrees in the electrical angle (7 degrees in the mechanical angle) in the counterclockwise direction with respect to a second stator side claw-like magnetic pole 137u in the U phase. That is, a second stator side claw-like magnetic pole 137w in the W phase is provided to be shifted 78 degrees in the electrical angle (13 degrees in the mechanical angle) in the counterclockwise direction with respect to the second stator side claw-like magnetic pole 137v in the V phase.

Figure 31:
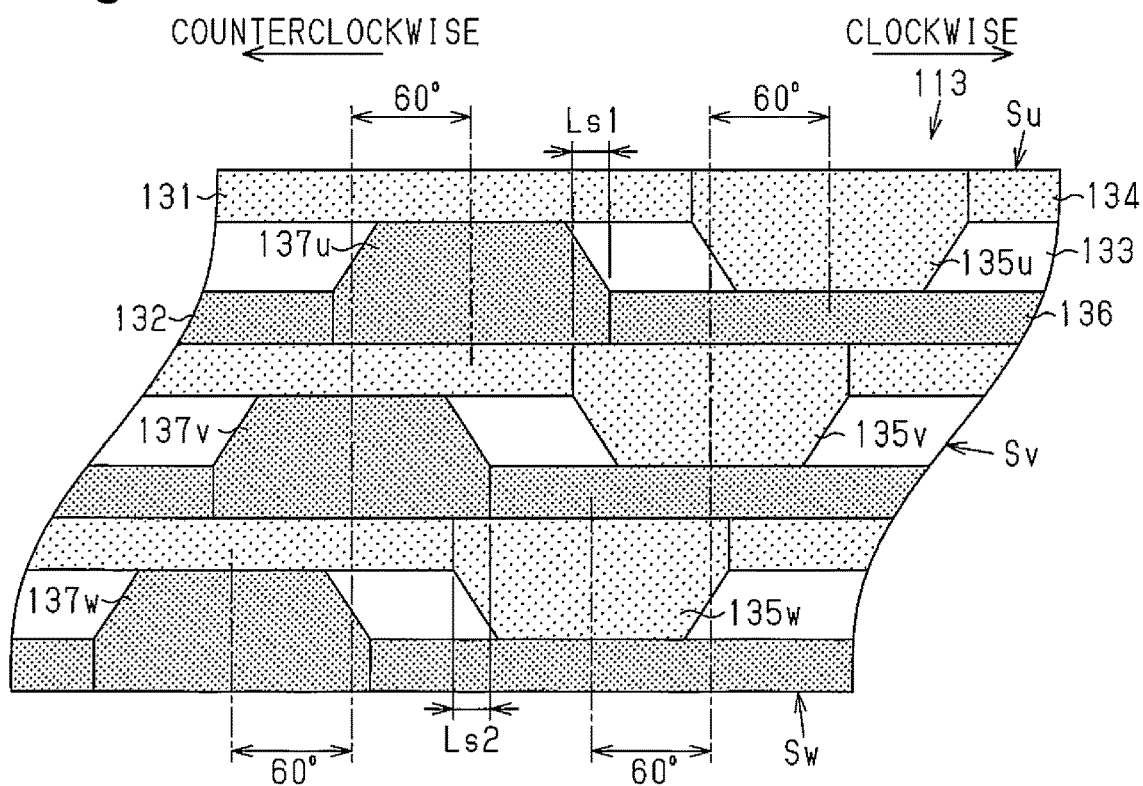
FIG. 31 is a schematic diagram for explaining a positional relation between first and second stator side claw-like magnetic poles of the reference configuration.

As shown in FIG. 31, a configuration in which the first and second stator side claw-like magnetic poles 135v and 137v in the V phase are arranged at equal intervals and shifted in the phase 60 degrees in the electrical angle (10 degrees in the mechanical angle) in the counterclockwise direction with respect to the U phase is set as a reference position. The first stator side claw-like magnetic pole 135v in the V phase in this embodiment shown in FIG. 30 is shifted 18 degrees in the electrical angle (3 degrees in the mechanical angle) in the counterclockwise direction with respect to the reference position. The second stator side claw-like magnetic pole 137v in the V phase in this embodiment shown in FIG. 30 is shifted 18 degrees in the electrical angle in the clockwise direction with respect to the reference position.

That is, in the V-phase stator section Sv in this embodiment, the first stator core 131 (the first stator side claw-like magnetic pole 135v) is shifted with respect to the reference position in a rotating direction in which an overlapping width Ls1 in the circumferential direction of the second stator side claw-like magnetic pole 137u in the U phase and the first stator side claw-like magnetic pole 135v in the V phase increases. Similarly, the second stator core 132 in the V phase (the second stator side claw-like magnetic pole 137v) is shifted with respect to the reference position in a rotating direction in which an overlapping width Ls2 in the circumferential direction of the second stator side claw-like magnetic pole 137v in the V phase and the first stator side claw-like magnetic pole 135w in the W phase increases.

That is, as opposed to the rotor sections Ru, Rv, and Rw further shifted in the clockwise direction in the U phase, the V phase, and the W phase toward the axial direction, the stator sections Su, Sv, and Sw are further shifted in the counterclockwise direction in the U phase, the V phase, and the W phase toward the axial direction. In other words, in the rotor 112 and the stator 113, a sifting direction is reversed in units of the sections in the respective phases.

Action of the motor 110 configured as explained above is explained.

When a three-phase alternating-current power supply voltage is applied to the stator 113, a U-phase power supply voltage is applied to the winding wire 133 of the U-phase stator section Su, a V-phase power supply voltage is applied to the winding wire 133 of the V-phase stator section Sv, and a W-phase power supply voltage is applied to the winding wire 133 of the W-phase stator section Sw. Consequently, a rotating magnetic field is generated in the stator 113 and the rotor 112 is driven to rotate.

Figure 32:
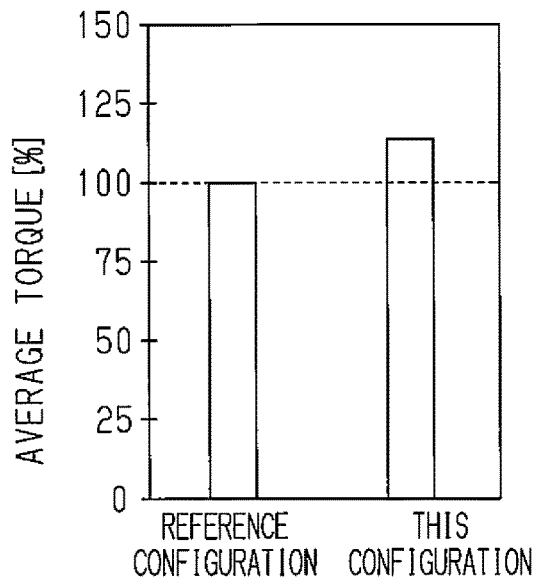
FIG. 32 is a graph showing comparison of average torques in the second embodiment and the reference configuration.

FIG. 32 is a graph of comparison of average torques of the configuration in this embodiment in which the claw-like magnetic poles 125, 127, 135, and 137 in the V phase are arranged at unequal intervals and a reference configuration (see FIGS. 25 and 31) in which the claw-like magnetic poles 125, 127, 135, and 137 in the V phase are present in the reference position. As shown in FIG. 32, with the configuration in this embodiment, average torque is improved to 110% or more with respect to the reference configuration. This is considered to be because, on the rotor 112 side, a magnetic flux is dispersed because the overlapping widths Lr1 and Lr2 decrease with respect to the reference configuration and, as a result, torque is improved.

Characteristic advantages of the second embodiment are explained.

(3) The first and second stator side claw-like magnetic poles 135 and 137 of the V-phase stator section Sv are arranged at unequal intervals to increase the overlapping widths Ls1 in the circumferential direction between the first stator side claw-like magnetic poles 135 of the V-phase stator section Sv and the second stator side claw-like magnetic poles 137 of the U-phase stator sections Su with respect to the reference configuration, and to increase the overlapping widths Ls2 in the circumferential direction between the second stator side claw-like magnetic poles 137 of the V-phase stator section Sv and the first stator side claw-like magnetic poles 135 of the W-phase stator sections Sw with respect to the reference configuration. The first and second rotor side claw-like magnetic poles 125 and 127 of the V-phase rotor section Rv are arranged at unequal intervals to reduce the overlapping widths Lr1 in the circumferential direction between the first rotor side claw-like magnetic poles 125 of the V-phase rotor section Rv and the first rotor side claw-like magnetic poles 125 of the W-phase rotor sections Rw with respect to the reference configuration, and to reduce the overlapping widths Lr2 in the circumferential direction between the second rotor side claw-like magnetic poles 127 of the V-phase rotor section Rv and the second rotor side claw-like magnetic poles 127 of the U-phase rotor sections Ru with respect to the reference configuration. Consequently, it is possible to improve torque compared with the reference configuration (see FIG. 32).

(4) The first and second rotor side claw-like magnetic poles 125 and 127 of the rotor sections Ru, Rv, and Rw in the respective phases are respectively provided at equal intervals in the circumferential direction. In the U-phase and W-phase rotor sections Ru and Rw, the first and second rotor cores 121 and 122 are assembled such that the first rotor side claw-like magnetic poles 125 and the second rotor side claw-like magnetic poles 127 are alternately arranged at equal intervals in the circumferential direction. In the V-phase rotor section Rv, the first and second rotor cores 121 and 122 are assembled such that the first rotor side claw-like magnetic poles 125 and the second rotor side claw-like magnetic pole 127 are alternately arranged at unequal intervals in the circumferential direction. With this configuration, it is possible to arrange the first and second rotor side claw-like magnetic poles 125 and 127 of the V-phase rotor section Rv at unequal intervals while forming the rotor cores 121 and 122 in the same shape and attaining simplification of component management.

(5) The first and second stator side claw-like magnetic poles 135 and 137 of the stator sections Su, Sv, and Sw in the respective phases are respectively provided at equal intervals in the circumferential direction. In the U-phase and W-phase stator sections Su and Sw, the first and second stator cores 131 and 132 are assembled such that the first stator side claw-like magnetic poles 135 and the second stator side claw-like magnetic pole 137 are alternately arranged at equal intervals in the circumferential direction. In the V-phase stator section Sv, the first and second stator cores 131 and 132 are assembled such that the first stator side claw-like magnetic poles 135 and the second stator side claw-like magnetic pole 137 are alternately arranged at unequal intervals in the circumferential direction. With this configuration, it is possible to arrange the first and second stator side claw-like magnetic poles 135 and 137 of the V-phase stator section Sv at unequal intervals while forming the stator cores 131 and 132 in the same shape and attaining simplification of component management.

Note that the second embodiment may be changed as explained below.

In the V-phase motor section Mv (the V-phase rotor section Rv and the V-phase stator section Sv), the arrangement of the claw-like magnetic poles 125, 127, 135, and 137 is not limited to the embodiment.

Figure 33:
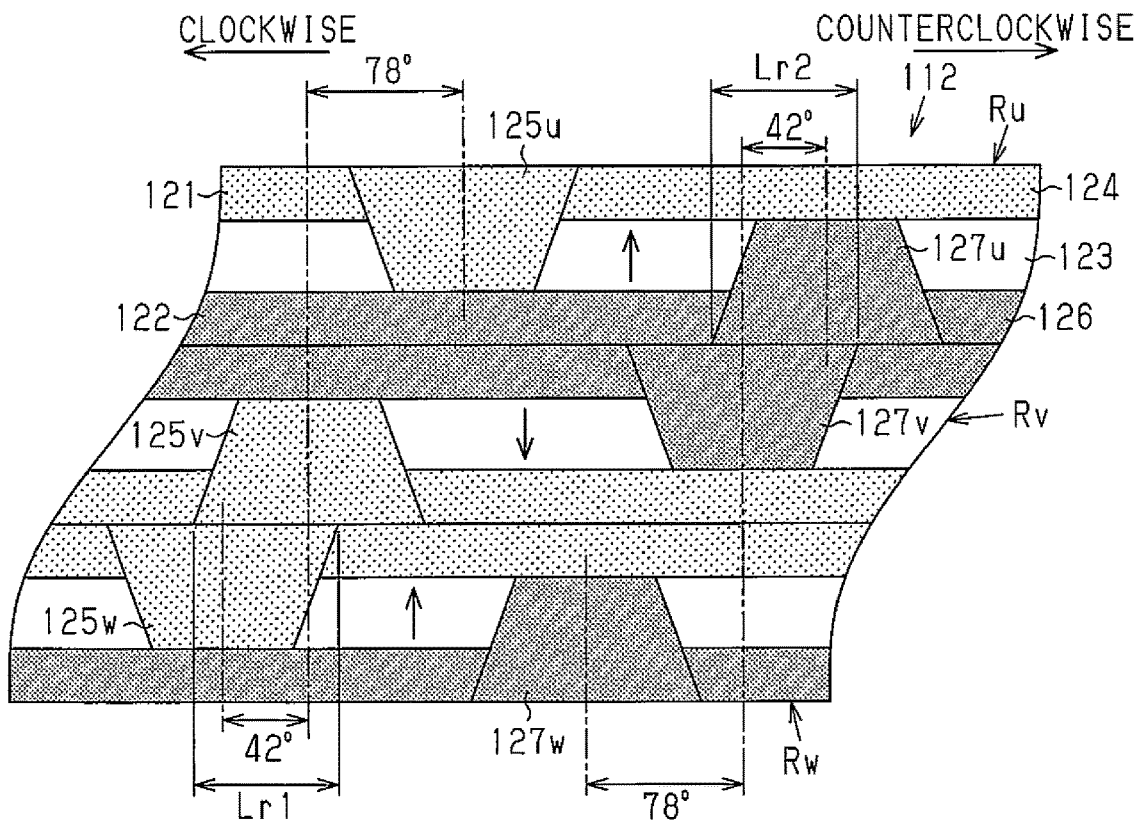
FIG. 33 is a schematic diagram for explaining a positional relation between first and second rotor side claw-like magnetic poles of another example of the second embodiment.

For example, as shown in FIG. 33, the first and second rotor cores 121 and 122 in the V phase may be shifted with respect to the reference configuration of the rotor 112 (see FIG. 25) in a rotating direction in which the overlapping widths Lr1 and Lr2 of the first and second rotor side claw-like magnetic poles 125 and 127 between the V and W phases and between the U and V phases increase. In an example shown in FIG. 33, the first rotor core 121 (the first rotor side claw-like magnetic pole 125v) in the V phase is shifted 18 degrees in the electrical angle clockwise and the second rotor core 122 (the second rotor side claw-like magnetic pole 127v) in the V phase is shifted 18 degrees in the electrical angle counterclockwise with respect to the reference configuration. With this configuration, as in the configuration explained above, the first and second rotor side claw-like magnetic poles 125v and 127v in the V phase are arranged at unequal intervals.

Figure 34:
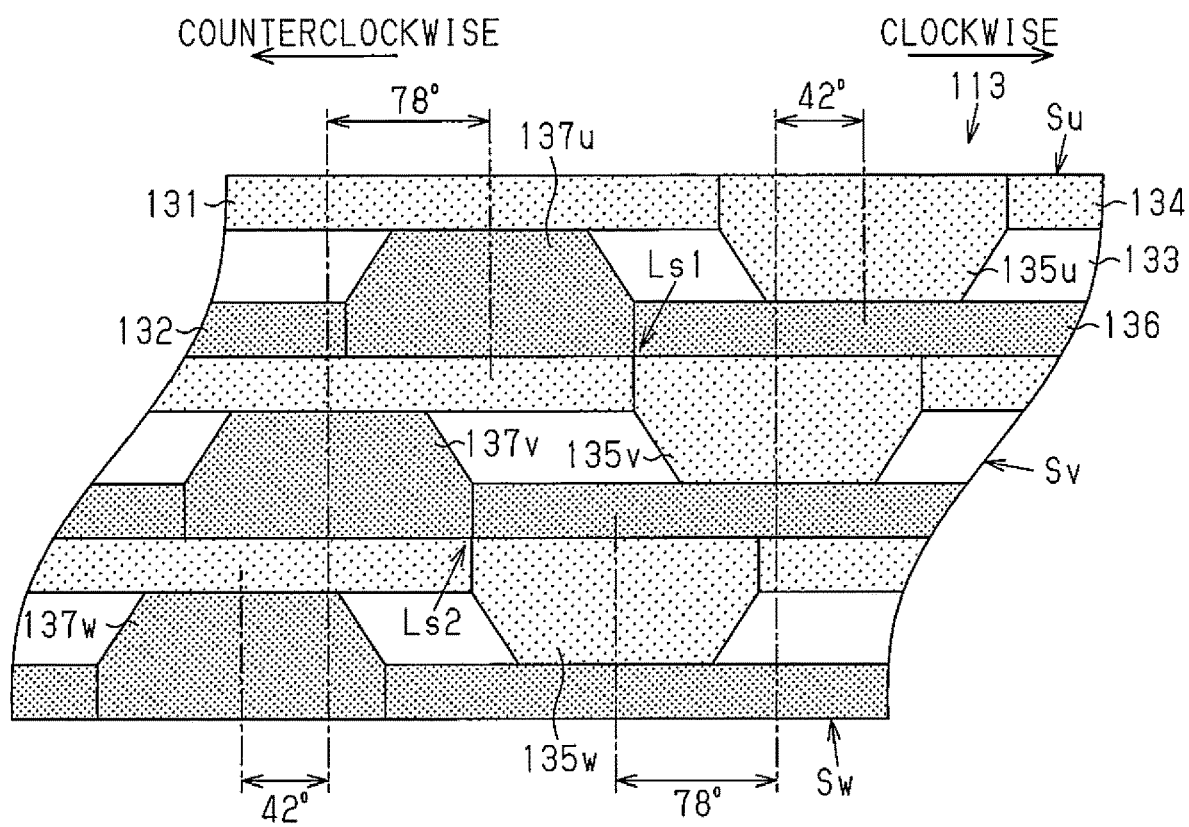
FIG. 34 is a schematic diagram for explaining a positional relation between first and second stator side claw-like magnetic poles of still another example of the second embodiment.

As shown in FIG. 34, the first and second stator cores 131 and 132 in the V phase may be shifted with respect to the reference configuration of the stator 113 (see FIG. 31) in a rotating direction in which the overlapping widths Ls1 and Ls2 of the first and second stator side claw-like magnetic poles 135 and 137 between the U and V phases and between the V and W phases decrease. In an example shown in FIG. 34, the first stator core 131 (the first stator side claw-like magnetic pole 135v) in the V phase is shifted 18 degrees in the electrical angle clockwise and the second stator core 132 (the second stator side claw-like magnetic pole 137v) in the V phase is shifted 18 degrees in the electrical angle counterclockwise with respect to the reference configuration. With this configuration, as in the configuration explained above, the first and second stator side claw-like magnetic poles 135v and 137v in the V phase are arranged at unequal intervals.

In the V-phase motor section Mv, if the first and second stator side claw-like magnetic poles 135v and 137v are arranged at unequal intervals, the first rotor side claw-like magnetic poles 125v and the second rotor side claw-like magnetic poles 127v may be configured at equal intervals in the circumferential direction each other. Similarly, if the first and second rotor side claw-like magnetic poles 125v and 127v are arranged at unequal intervals, the first stator side claw-like magnetic poles 135v and the second stator side claw-like magnetic poles 137v may be configured at equal intervals in the circumferential direction each other.

Figure 35:
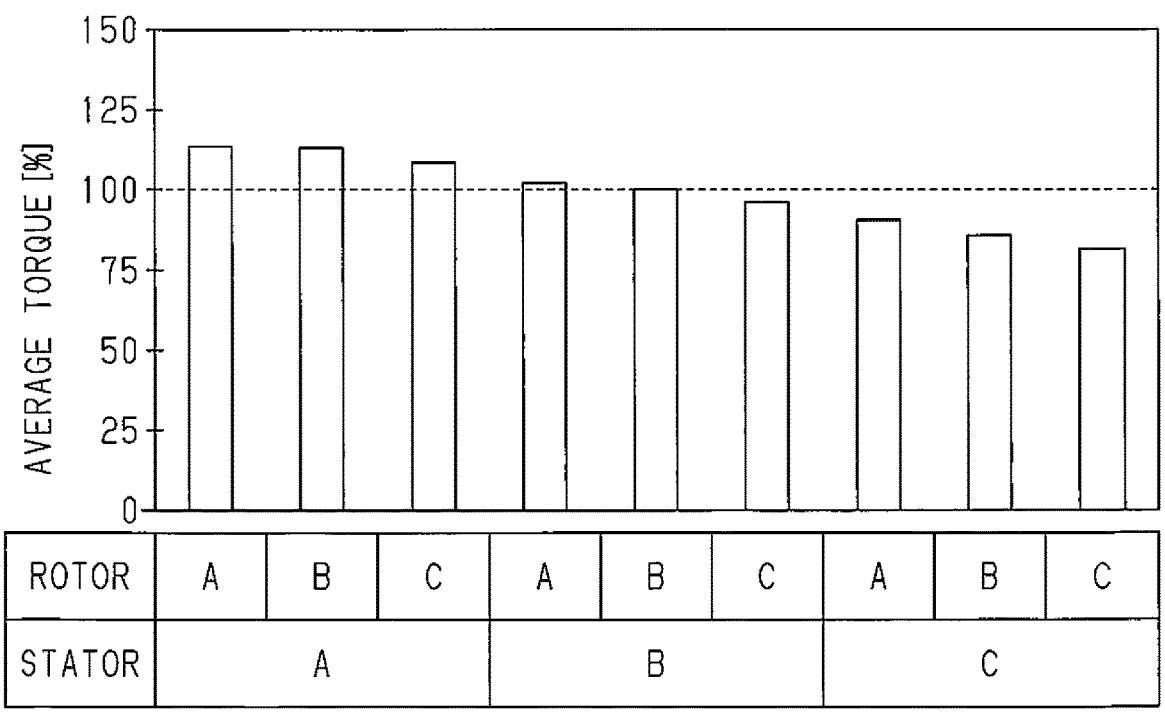
FIG. 35 is a graph showing average torques in various patterns in which the arrangement of claw-like magnetic poles is different.

In FIG. 35, average torques in various patterns in which the configurations of the V-phase rotor section Rv and the V-phase stator section Sv are different are shown.

In FIG. 35, of the rotor, the reference configuration (see FIG. 25) is represented as pattern "B", a configuration in which the overlapping widths Lr1 and Lr2 are reduced with respect to the pattern "B" (see FIG. 24) is represented as pattern "A", and a configuration in which the overlapping widths Lr1 and Lr2 are increased with respect to the pattern "B" (see FIG. 33) is represented as pattern "C".

Of the stator, the reference configuration (see FIG. 31) is represented as pattern "B", a configuration in which the overlapping widths Ls1 and Ls2 are increased with respect to the pattern "B" (see FIG. 30) is represented as pattern "A", and a configuration in which the overlapping widths Ls1 and Ls2 are reduced with respect to the pattern "B" (see FIG. 34) is represented as pattern "C".

In FIG. 35, average torque of the reference configuration in which the patterns of the rotor and the stator side are "B/B" is set to 100%. As shown in the figure, among combinations of the patterns, the torque is the highest in a configuration in which the patterns of the rotor and the stator side are "A/A" (the configuration in the embodiment). The torque decreases in "B/A", "C/A", and "A/B" in order from the pattern. However, the torques in the patterns are higher than 100%. That is, by adopting a combination of these patterns, it is possible to improve the torque compared with the reference configuration.

The torque is equal to or lower than 100% in a configuration in which the patterns of the rotor and the stator side are "C/B". The torque decreases in "A/C", "B/C", and "C/C" in order from the pattern. That is, by adopting a combination of these patterns, it is possible to provide a motor that can obtain low torque.

By variously changing the arrangement in the circumferential direction of the claw-like magnetic poles 125, 127, 135, and 137 of the V-phase motor section Mv, it is possible to vary the motor performance (the torque) without changing power supply to the winding wires 133 and the magnetic field magnet 123. Consequently, with only a simple configuration change of the V-phase motor section Mv, it is possible to obtain multi Lundell type motors of various specifications.

On the stator 113 side, if the pattern "A" in which the overlapping widths Ls1 and Ls2 are increased with respect to the reference configuration is adopted, it is possible to improve the torque from the torque in the reference configuration irrespective of the pattern on the rotor 112 side.

On the rotor 112 side, if the pattern "A" in which the overlapping widths Lr1 and Lr2 are reduced with respect to the reference configuration is adopted, it is possible to improve the torque from the torques in the other patterns "B" and "C" under a condition in which the pattern on the stator 113 side is the same.

In the embodiment, the first and second rotor side claw-like magnetic poles 125v and 127v in the V phase are respectively formed at equal intervals in the circumferential direction in the first and second rotor cores 121 and 122. However, the first and second rotor side claw-like magnetic poles 125v and 127v are not particularly limited to this and may be formed at unequal intervals in the circumferential direction.

In the embodiment, the motor sections Mu, Mv, and Mw in the respective phases are stacked without a gap. However, the motor sections Mu, Mv, and Mw are not particularly limited to this and may be arranged spaced apart from one another in the axial direction.

The number of the claw-like magnetic poles 125, 127, 135, and 137 (the number of magnetic poles) is not limited to the embodiment and may be changed as appropriate according to a configuration.

In the embodiment, the magnetic field magnet 123 is the ferrite magnet. However, other than the ferrite magnet, the magnetic field magnet 123 may be, for example, rare earth magnets such as a neodymium magnet, a samarium iron nitrogen magnet, and a samarium cobalt magnet.

In the embodiment, the present invention is applied to the motor 110 of the inner rotor type in which the rotor 112 is arranged on the inner side of the stator 113. However, the present invention may be applied to a motor of an outer rotor type.

A motor according to a third embodiment is explained.

Figure 36:
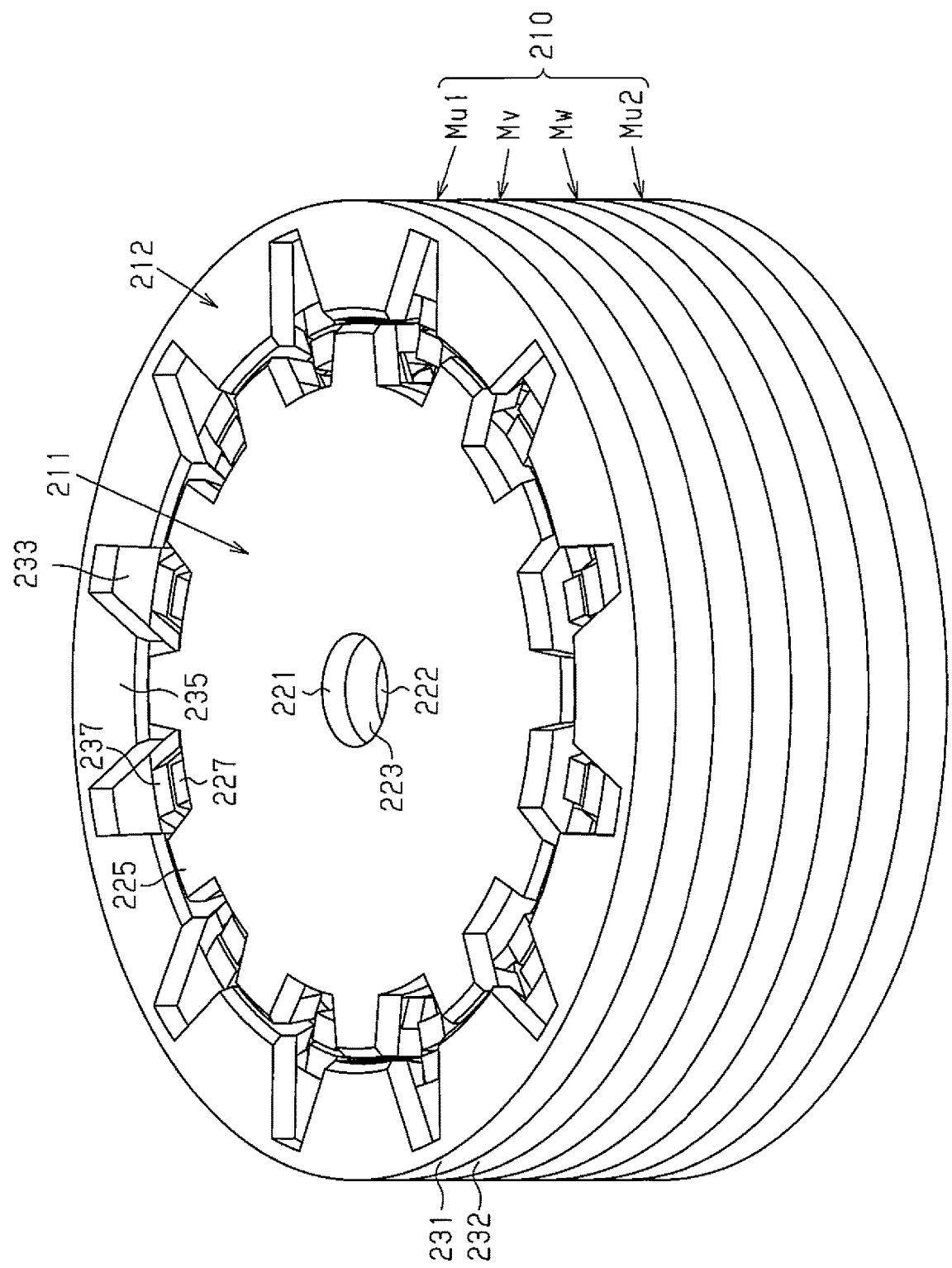
FIG. 36 is a perspective view of a motor according to a third embodiment of the present invention.

FIG. 36 shows an overall perspective view of a brushless motor 210 in this embodiment. An annular stator 212 firmly fixed to a motor housing (not shown in the figure) is arranged on the outer circumferential side of a rotor 211 firmly fixed to a rotating shaft (not shown in the figure).

The brushless motor 210 is configured from single motor sections in four stages stacked in the axial direction. The single motor sections in the four stages are configured in the order of a first U-phase motor section Mu1, a V-phase motor section Mv, a W-phase motor section Mw, and a second U-phase motor section Mu2 from the top in FIG. 36.

Figure 37:
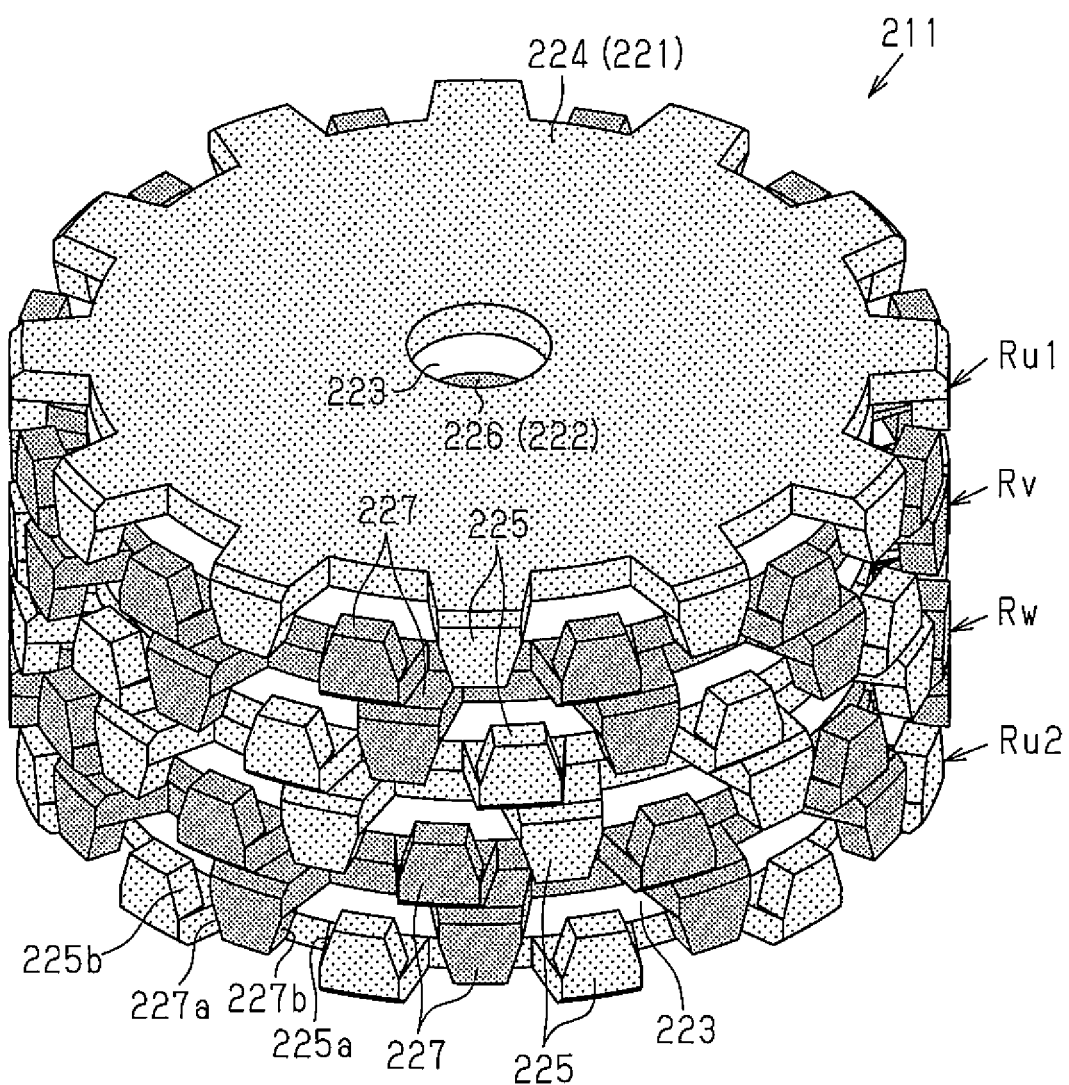
FIG. 37 is a perspective view of a rotor according to the third embodiment.
Figure 39:
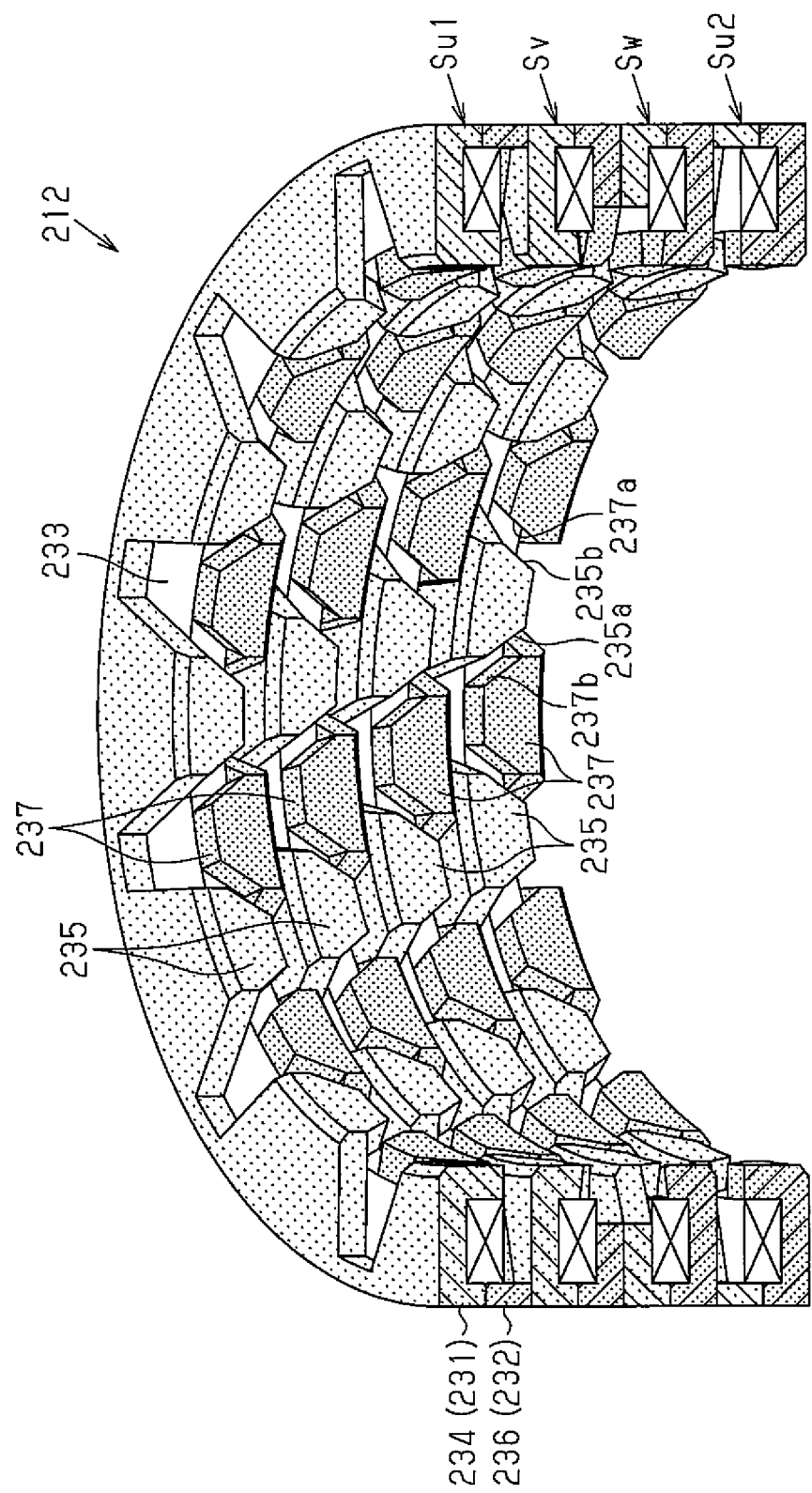
FIG. 39 is a perspective view partially showing a stator in the third embodiment.

As shown in FIGS. 37 and 39, the motor sections Mu1, Mv, Mw, and Mu2 in the four stages respectively include rotor sections (a first U-phase rotor section Ru1, a V-phase rotor section Rv, a W-phase rotor section Rw, and a second U-phase rotor section Ru2) and stator sections (a first U-phase stator section Su1, a V-phase stator section Sv, a W-phase stator section Sw, and a second U-phase stator section Su2). The rotor sections Ru1, Rv, Rw, and Ru2 configure the rotor 211. The stator sections Su1, Sv, Sw, and Su2 configure the stator 212.

Configuration of the Rotor

Figure 38:
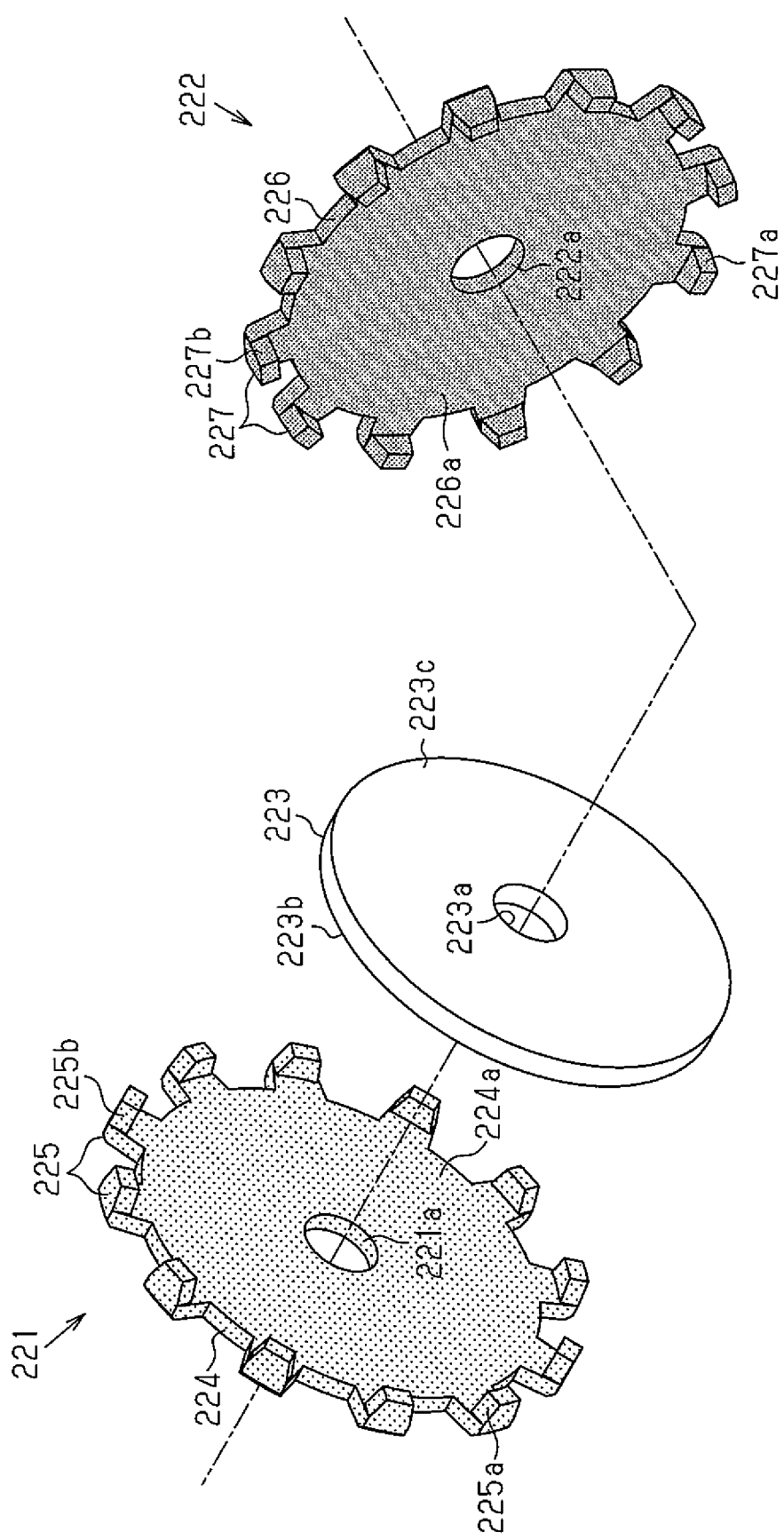
FIG. 38 is an exploded perspective view of a rotor section in the third embodiment.

As shown in FIGS. 37 and 38, the rotor sections Ru1, Rv, Rw, and Ru2 configuring the rotor 211 have the same configuration one another and are configured from first and second rotor cores 221 and 222 and magnetic field magnets 223.

As shown in FIG. 38, the first rotor core 221 includes a first rotor core base 224 formed in a ring plate shape. In the center position of the first rotor core base 224, a through-hole 221a for inserting and firmly fixing the rotating shaft (not shown in the figure) is formed. On the outer circumferential surface of the first rotor core base 224, twelve first rotor side claw-like magnetic poles 225 are projected to the radial outer side at equal intervals in the circumferential direction. The distal ends of the first rotor side claw-like magnetic poles 225 are bent and formed to extend to the second rotor core 222 side in the axial direction.

The first rotor side claw-like magnetic pole 225 is formed in a trapezoidal shape smaller in circumferential width toward the axially distal end side when viewed from the radial direction. That is, two circumferential end faces 225a and 225b of the first rotor side claw-like magnetic pole 225 are flat surfaces and are formed to be closer to each other toward the axially distal end side. Note that the circumferential width of the proximal end portions of the first rotor side claw-like magnetic poles 225 is set smaller than the circumferential width of a gap between the first rotor side claw-like magnetic poles 225 adjacent to each other.

The second rotor core 222 is formed of a material and in a shape same as the material and the shape of the first rotor core 221. In the center position of the second rotor core base 226 formed in a substantially disk shape, a through-hole 222a for inserting and firmly fixing the rotating shaft (not shown in the figure) is formed. On the outer circumferential surface of the second rotor core base 226, twelve second rotor side claw-like magnetic poles 227 are projected to the radial outer side at equal intervals. The distal ends of the second rotor side claw-like magnetic poles 227 are bent and formed to extend to the first rotor core 221 side in the axial direction.

The second rotor side claw-like magnetic pole 227 is formed in a trapezoidal shape smaller in circumferential width toward the axially distal end side when viewed from the radial direction. That is, two circumferential end faces 227a and 227b of the second rotor side claw-like magnetic pole 227 are flat surfaces and are formed to be closer to each other toward the axially distal end side. Note that the circumferential width of the proximal end portions of the second rotor side claw-like magnetic poles 227 is set smaller than the circumferential width of a gap between the second rotor side claw-like magnetic poles 227 adjacent to each other.

The second rotor core 222 is arranged and fixed with respect to the first rotor core 221 such that the second rotor side claw-like magnetic poles 227 of the second rotor core 222 are respectively located between corresponding ones of the first rotor side claw-like magnetic poles 225 of the first rotor core 221 when viewed from the axial direction. In this case, the second rotor core 222 is assembled to the first rotor core 221 such that the magnetic field magnets 223 are arranged in the axial direction between the first rotor core 221 and the second rotor core 222.

More specifically, the magnetic field magnets 223 are sandwiched between a surface (an opposed surface 224a) on the second rotor core base 226 side of the first rotor core base 224 and a surface (an opposed surface 226a) on the first rotor core base 224 side of the second rotor core base 226.

In this case, one circumferential end face 225a of the first rotor side claw-like magnetic pole 225 and the other circumferential end face 227b of the second rotor side claw-like magnetic pole 227 are formed parallel to each other and formed in a substantially linear shape in which a gap between the circumferential end faces 225a and 227b is inclined in the axial direction. The other circumferential end face 225b of the first rotor side claw-like magnetic pole 225 and one circumferential end face 227a of the second rotor side claw-like magnetic pole 227 are formed parallel to each other and formed in a substantially linear shape in which a gap between the circumferential end faces 225b and 227a are inclined with respect to the axial direction.

The magnetic field magnet 223 is, in this embodiment, a ring plate-like permanent magnet made of a ferrite magnet. In the magnetic field magnet 223, a through-hole 223a, through which a rotating shaft (not shown in the figure) is inserted, is formed in the center position thereof. One side surface 223b of the magnetic field magnet 223 is in contact with the opposed surface 224a of the first rotor core base 224. The other side surface 223c of the magnetic field magnet 223 is in contact with the opposed surface 226a of the second rotor core base 226. The magnetic field magnet 223 is sandwiched and fixed between the first rotor core 221 and the second rotor core 222. Note that the outer diameter of the magnetic field magnet 223 is set to coincide with the outer diameter of the first and second rotor core bases 224 and 226.

The magnetic field magnet 223 is magnetized in the axial direction to set the first rotor core 221 side as an N pole and set the second rotor core 222 side as an S pole. Therefore, the first rotor side claw-like magnetic poles 225 of the first rotor core 221 are caused to function as N poles (first magnetic poles) by the magnetic field magnet 223. The second rotor side claw-like magnetic poles 227 of the second rotor core 222 are caused to function as S poles (second magnetic poles) by the magnetic field magnet 223.

The rotor sections Ru1, Rv, Rw, and Ru2 configured in this way are formed in a so-called Lundell type structure including the magnetic field magnets 223. In the rotor sections Ru1, Rv, Rw, and Ru2, the first rotor side claw-like magnetic poles 225 functioning as the N poles and the second rotor side claw-like magnetic poles 227 functioning as the S poles are alternately arranged in the circumferential direction. Each of the rotor sections Ru1, Rv, Rw, and Ru2 is configured by twenty-four poles (twelve pole pairs).

As shown in FIG. 37, the first U-phase rotor section Ru1, the V-phase rotor section Rv, the W-phase rotor section Rw, and the second U-phase rotor section Ru2 are stacked in order in the axial direction to form the rotor 211.

When a configuration in which the first rotor core 221 is on the upper side and the second rotor core 222 is on the lower side with respect to the magnetic field magnet 223 (a configuration in which a magnetization direction of the magnetic field magnet 223 is upward) is a frontward direction of the rotor sections Ru1, Rv, Rw, and Ru2, the first U-phase rotor section Ru1 and the W-phase rotor section Rw are stacked in the frontward direction and the V-phase rotor section Rv and the second U-phase rotor section Ru2 are stacked in a backward direction. Consequently, magnetization direction of the magnetic field magnets 223 in the first U phase and the W phase are set in the same direction (in FIG. 37, upward) and a magnetization direction of the magnetic field magnets 223 in the V phase and the second U phase is set in a direction opposite to the magnetization direction of the magnetic field magnets 223 in the first U phase and the W phase.

The second rotor core bases 226 in the first U phase and the V phase are adjacent to each other in the axial direction. The S pole sides of the magnetic field magnets 223 in the first U phase and the V phase are opposed to each other via the adjacent second rotor core bases 226. The first rotor core bases 224 in the V phase and the W phase are adjacent to each other in the axial direction. The N pole sides of the magnetic field magnets 223 in the V phase and the W phase are opposed to each other via the adjacent first rotor core base 224. The second rotor core bases 226 in the W phase and the second U phase are adjacent to each other in the axial direction. The S pole sides of the magnetic field magnets 223 in the W phase and the second U phase are opposed to each other via the adjacent second rotor core bases 226.

Extending directions in the axial direction of the first rotor side claw-like magnetic poles 225 in the first U phase and the W phase are the same direction (in FIG. 37, the downward). An extending direction in the axial direction of the first rotor side claw-like magnetic poles 225 in the V phase and the second U phase is a direction opposite to the direction. Note that the axially distal ends of the first rotor side claw-like magnetic poles 225 in the first U phase and the first rotor side claw-like magnetic poles 225 in the V phase are separated from each other in the axial direction. The axially distal ends of the first rotor side claw-like magnetic poles 225 in the W phase and the first rotor side claw-like magnetic poles 225 in the second U phase are also separated from each other in the axial direction.

Similarly, extending directions in the axial direction of the second rotor side claw-like magnetic poles 227 in the first U phase and the W phase are the same direction (in FIG. 37, upward). An extending direction in the axial direction of the second rotor side claw-like magnetic poles 227 in the V phase and the second U phase is a direction opposite to the direction. Note that the axially distal ends of the second rotor side claw-like magnetic poles 227 in the V phase and the second rotor side claw-like magnetic poles 227 in the W phase are separated from each other in the axial direction.

The first U-phase rotor section Ru1, the V-phase rotor section Rv, the W-phase rotor section Rw, and the second U-phase rotor section Ru2 are stacked with the phases shifted 60 degrees in the electrical angle (5 degrees in the mechanical angle) from one another. More specifically, the V-phase rotor section Rv is firmly fixed to the rotating shaft with the phase shifted 60 degrees in the electrical angle in the counterclockwise direction with respect to the first U-phase rotor section Ru1. The W-phase rotor section Rw is firmly fixed to the rotating shaft with the phase shifted 60 degrees in the electrical angle in the counterclockwise direction with respect to the V-phase rotor section Rv. The second U-phase rotor section Ru2 is firmly fixed to the rotating shaft with the phase shifted 60 degrees in the electrical angle in the counterclockwise direction with respect to the W-phase rotor section Rw.

Configuration of the Stator

Figure 40:
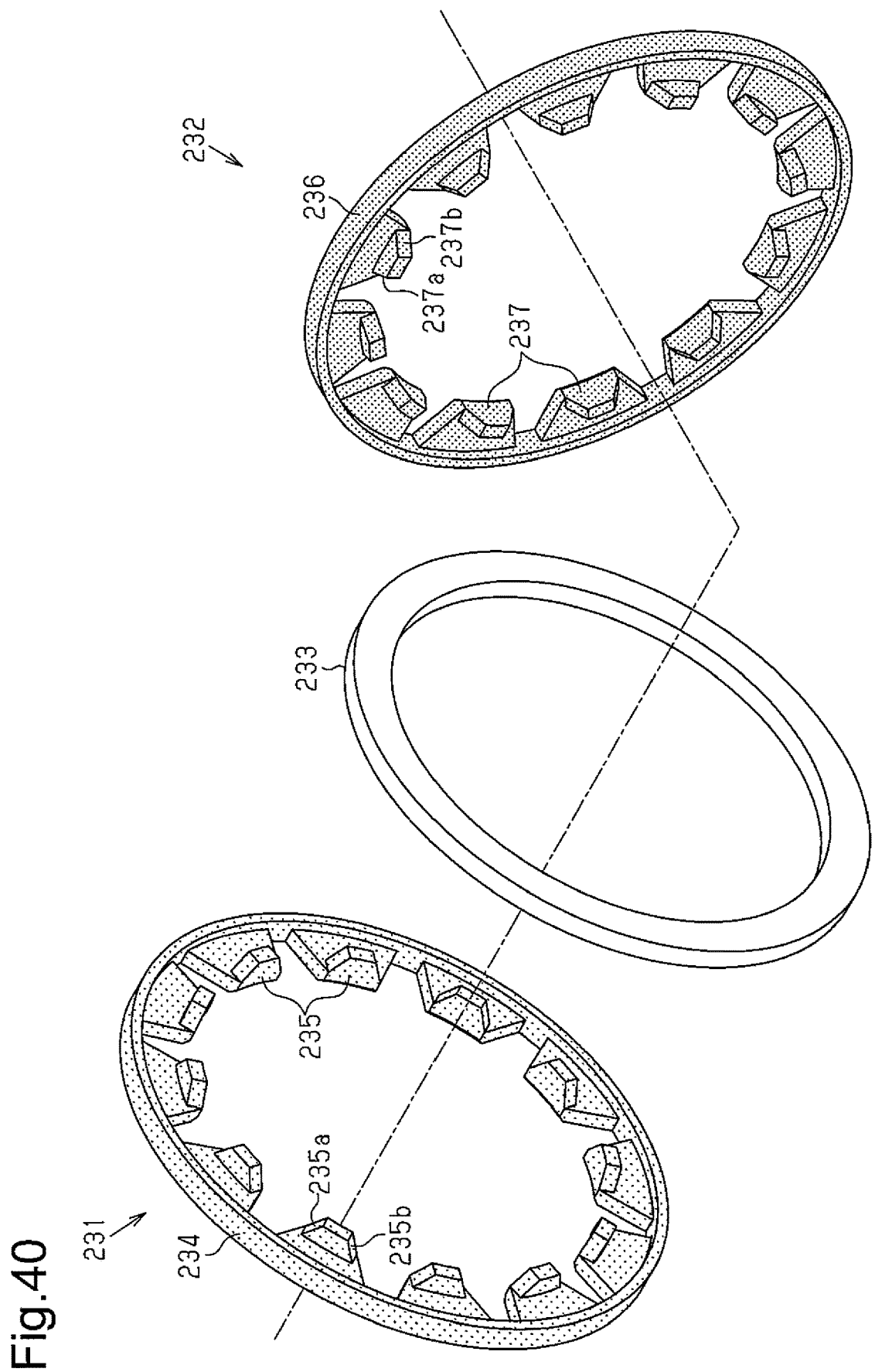
FIG. 40 is an exploded perspective view of a stator section in the third embodiment.

As shown in FIGS. 39 and 40, the stator sections Su1, Sv, Sw, and Su2 configuring the stator 212 are stacked in the axial direction to be respectively opposed to the first U-phase rotor section Ru1, the V-phase rotor section Rv, the W-phase rotor section Rw, and the second U-phase rotor section Ru2 corresponding thereto in the radial direction. The stator sections Su1, Sv, Sw, and Su2 have the same configuration one another and are configured from first and second stator cores 231 and 232 and a coil section 233.

The first stator core 231 includes a cylindrical first stator core base 234 and first stator side claw-like magnetic poles 235 extending to the radial inner side from the first stator core base 234 and bent to the second stator core 232 side in the axial direction at the inner side distal end portion thereof. Twelve first stator side claw-like magnetic poles 235 are formed at equal intervals in the circumferential direction.

The first stator side claw-like magnetic pole 235 is formed in a trapezoidal shape smaller in circumferential width toward the axially distal end side when viewed from the radial direction. That is, two circumferential end faces 235a and 235b of the first stator side claw-like magnetic poles 235 are flat surfaces and are formed to be closer to each other toward the axially distal end side. Note that the circumferential width of the proximal end portions of the first stator side claw-like magnetic poles 235 is set larger than the circumferential width of a gap between the first stator side claw-like magnetic poles 235 adjacent to each other.

As shown in FIG. 40, the second stator core 232 is formed of a material and in a shape same as the material and the shape of the first stator core 231. The second stator core 232 includes a cylindrical second stator core base 236 and second stator side claw-like magnetic poles 237 extending to the radial inner side from the second stator core base 236 and bent to the first stator core 231 side in the axial direction at the inner side distal end portion thereof. Twelve second stator side claw-like magnetic poles 237 are formed at equal intervals in the circumferential direction. Annular distal end faces of the first and second stator core bases 234 and 236 are set in contact with each other in the axial direction.

The second stator side claw-like magnetic pole 237 is formed in a trapezoidal shape smaller in circumferential width toward the axially distal end side when viewed from the radial direction. That is, two circumferential end faces 237a and 237b of the second stator side claw-like magnetic pole 237 are flat surfaces and are formed to be closer to each other toward the axially distal end side. Note that the circumferential width of the proximal end portions of the second stator side claw-like magnetic poles 237 is set larger than the circumferential width of a gap between the second stator side claw-like magnetic poles 237 adjacent to each other.

The second stator core 232 is arranged and fixed with respect to the first stator core 231 such that the second stator side claw-like magnetic poles 237 of the second stator core 232 are respectively located between corresponding ones of the first stator side claw-like magnetic poles 235 of the first stator core 231 when viewed from the axial direction. Note that the second stator core 232 is assembled to the first stator core 231 such that the coil section 233 is arranged in the axial direction between the first stator core 231 and the second stator core 232.

In an assembled state, one circumferential end face 235a of the first stator side claw-like magnetic pole 235 and the other circumferential end face 237b of the second stator side claw-like magnetic pole 237 are formed in parallel to each other and formed in a substantially linear shape in which a gap between the circumferential end faces 235a and 237b is inclined with respect to the axial direction. The other circumferential end face 235b of the first stator side claw-like magnetic pole 235 and one circumferential end face 237a of the second stator side claw-like magnetic pole 237 are formed in parallel to each other and formed in a substantially linear shape in which a gap between the circumferential end faces 235b and 237a is inclined with respect to the axial direction.

Note that the length in the axial direction from the axial outer side surface (a surface on a counter coil section side) of the first stator core 231 to the axial outer side surface of the second stator core 232 is set the same as the length in the axial direction from the axial outer side surface (the rear surface of the opposed surface 224a) of the first rotor core base 224 to the axial outer side surface (the rear surface of the opposed surface 226a) of the second rotor core base 226.

The coil section 233 is formed in an annular shape centering on the axis of the rotating shaft and is configured by internally providing a winding wire in a bobbin. The coil section 233 is arranged between the first and second stator core bases 234 and 236 and the first and second stator side claw-like magnetic poles 235 and 237 in the radial direction. Note that, in FIG. 40, for convenience of explanation, a draw-out terminal of the coil section 233 is not shown in the figure.

The stator sections Su1, Sv, Sw, and Su2 configured as explained above form a stator of a so-called Lundell type (a claw pole type) structure including twenty-four poles that energize, with the coil section 233 between the first and second stator cores 231 and 232, the first and second stator side claw-like magnetic poles 235 and 237 to be different magnetic poles each other at every moment.

As shown in FIG. 39, the first U-phase stator section Su1, the V-phase stator section Sv, the W-phase stator section Sw, and the second U-phase stator section Su2 are stacked in order in the axial direction to form the stator 212. The stator sections Su1, Sv, Sw, and Su2 are stacked in the axial direction such that the first stator core base 234 and the second stator core base 236 are alternately arranged in the axial direction. The distal ends of the first stator side claw-like magnetic poles 235 in the respective phases face one side in the axial direction (in FIG. 39, downward). The distal ends of the second stator side claw-like magnetic poles 237 in the respective phase face the other side in the axial direction (in FIG. 39, upward).

The first U-phase stator section Su1, the V-phase stator section Sv, the W-phase stator section Sw, and the second U-phase stator section Su2 are stacked with the phases shifted 60 degrees in the electrical angle (5 degrees in the mechanical angle) from one another. More specifically, the V-phase stator section Sv is provided with the phase shifted 60 degrees in the electrical angle in the clockwise direction with respect to the first U-phase stator section Su1. The W-phase stator section Sw is provided with the phase shifted 60 degrees in the electrical angle in the clockwise direction with respect to the V-phase stator section Sv. The second U-phase stator section Su2 is provided with the phase shifted 60 degrees in the electrical angle in the clockwise direction with respect to the W-phase stator section Sw.

That is, a direction of inclination with respect to the axial direction formed by the shift of the four rotor sections Ru1, Rv, Rw, and Ru2 when viewed from the radial direction and a direction of inclination with respect to the axial direction formed by the shift of the four stator sections Su1, Sv, Sw, and Su2 when viewed from the radial direction are opposite directions each other on opposed surfaces of the rotor 211 and the stator 212. Consequently, it is possible to cause the first and second rotor side claw-like magnetic poles 225 and 227 in the respective phases to suitably follow switching of the magnetic poles of the first and second stator side claw-like magnetic poles 235 and 237. As a result, it is possible to realize suitable rotation of the rotor 211.

A U-phase power supply voltage of a three-phase alternating-current power supply is applied to the coil sections 233 of the first and second U-phase stator sections Su1 and Su2, a V-phase power supply voltage of the three-phase alternating-current power supply is applied to the coil section 233 of the V-phase stator section Sv, and a W-phase power supply voltage of the three-phase alternating-current power supply is applied to the coil section 233 of the W-phase stator section Sw.

The stator sections Su1, Sv, Sw, and Su2 explained above are respectively arranged on the outer circumferential sides of the rotor sections Ru1, Rv, Rw, and Ru2 corresponding thereto to configure the motor sections Mu1, Mv, Mw, and Mu2. Note that all the axial thicknesses of the rotor sections Ru1, Rv, Rw, and Ru2 and the stator sections Su1, Sv, Sw, and Su2 are set equal.

Action of the brushless motor 210 configured as explained above is explained.

When a three-phase alternating-current power supply voltage is applied to the stator 212, a U-phase power supply voltage is applied to the coil sections 233 of the first and second U-phase stator sections Su1 and Su2, a V-phase power supply voltage is applied to the coil section 233 of the V-phase stator section Sv, and a W-phase power supply voltage is applied to the coil section 233 of the W-phase stator section Sw. Consequently, a rotating magnetic field is generated in the stator 212 and the rotor 211 is driven to rotate. In this case, the V-phase power supply voltage and the W-phase power supply voltage respectively supplied to the V-phase and W-phase stator sections Sv and Sw are set equal to each other. The U-phase power supply voltage supplied to the first and second U-phase stator sections Su1 and Su2 is set to a half value of the V-phase power supply voltage and the W-phase power supply voltage. That is, a total of the U-phase power supply voltages supplied to the first and second U-phase stator sections Su1 and Su2 is equal to the V-phase power supply voltage and the W-phase power supply voltage.

The brushless motor 210 in this embodiment is configured in a four-stage structure in which the first U-phase motor section Mu1, the V-phase motor section Mv, the W-phase motor section Mw, and the second U-phase motor section Mu2 are stacked in order in the axial direction. That is, the first U-phase motor section Mu1 and the second U-phase motor section Mu2 are respectively arranged in stages at two ends of the four stages.

Figure 41A:
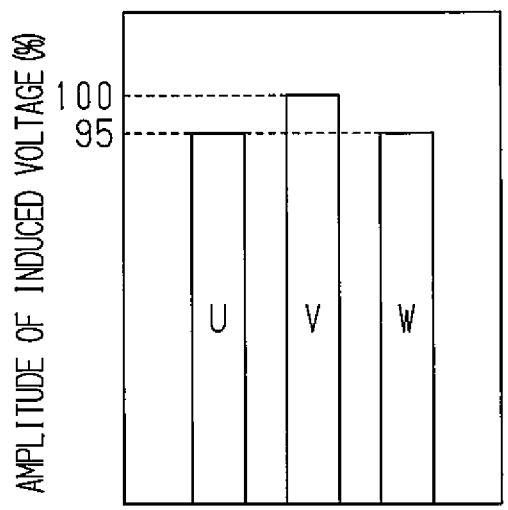
FIG. 41A is a graph showing induced voltages in respective phases in a conventional motor.
Figure 41B:
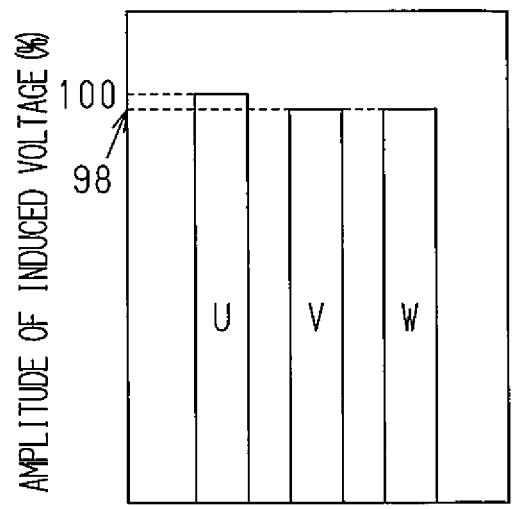
FIG. 41B is a graph showing induced voltages in respective phases in the motor according to the third embodiment.

FIG. 41A is a graph of induced voltages in the respective phases in the conventional motor of the three-stage structure in which the U phase, the V phase, and the W phase are arranged in order stage by stage to correspond to the three-phase alternating-current power supply. FIG. 41B is a graph of induced voltages in the respective phases in the brushless motor 210 in this embodiment.

As shown in FIG. 41A, in the conventional motor, an induced voltage in the V phase located in the middle stage among the induced voltages generated in the respective phases is the highest. The magnitude of induced voltages in the U phase and the V phase is 95% with respect to the magnitude of the induced voltage in the V phase. That is, a difference of induced voltages in the other two phases from the induced voltage in the V phase, which is largest among the phases is 5%.

On the other hand, as shown in FIG. 41B, in the brushless motor 210 in this embodiment, an induced voltage in the U phase, which is a total of induced voltages generated in the first and second U-phase motor sections Mu1 and Mu2 located in the stages at two ends, is the highest among the induced voltages generated in the respective phases. Induced voltages in the V phase and the W phase located in the middle stage are equal to each other. The magnitude of the induced voltages in the V phase and the W phase is 98% of the magnitude of the induced voltage in the U phase. That is, a difference of induced voltages in the other two phases from the induced voltage in the U phase, which is the largest among other phases is 2%. Compared with the conventional motor, a balance of the induced voltages generated in the respective phases is improved.

In the conventional motor, a magnetic flux easily leaks in single motor sections in the U phase and the W phase located at two ends. Therefore, the magnitudes of induced voltages generated in the single motor sections in the U phase and the W phase and a single motor section in the V phase are different. Therefore, in the structure in this embodiment, a single motor section in the U phase is added such that the single motor section in the W phase is not a stage at an end. With the structure in this embodiment, it is possible to improve a balance of the induced voltages generated in the respective phases.

The motor sections Mu1, Mv, Mw, and Mu2 are arranged in the order of the U phase, the V phase, the W phase, and the U phase. Therefore, a transition of magnetic flux generation among the phases is smoothly performed. As a result, it is possible to contribute to improvement of motor performance.

In this embodiment, the rotor sections Ru1, Rv, Rw, and Ru2 are formed in the Lundell structure. Therefore, when a change in the number of magnetic poles is requested, the number of poles can be easily changed by changing the number of the first and second rotor side claw-like magnetic poles 225 and 227 while forming the magnetic field magnets 223 in the same structure. Similarly, the stator sections Su1, Sv, Sw, and Su2 are formed in the Lundell type (the claw pole type) structure. Therefore, the number of poles is easily changed by changing the number of the first and second stator side claw-like magnetic poles 235 and 237 while forming the coil sections 233 in the same structure. That is, in the brushless motor 210 in this embodiment, it is possible to easily cope with, without involving a large design change, a specification change in which the numbers of magnetic poles of the rotor 211 and the stator 212 are variously combined.

In this embodiment, in the magnetic field magnets 223 of the first U-phase and W-phase rotor sections Ru1 and Rv, magnetization directions are set opposite to the magnetization directions of the magnetic field magnets 223 of the V-phase and second U-phase rotor sections Rv and Ru2. Consequently, the same polarities of the magnetic field magnets 223 in stages adjacent to each other are opposed to each other. Therefore, magnetic fluxes of the magnetic field magnets 223 less easily leak to the motor sections Mu1, Mv, Mw, and Mu2 sides adjacent to one another. As a result, an effective magnetic flux contributing to the rotation of the rotor 211 is efficiently improved.

Characteristic advantages of the third embodiment are explained.

(6) The single motor sections arranged in a plurality of stages include the two U-phase motor sections Mu1 and Mu2, the one V-phase motor section Mv, and the one W-phase motor section Mw. The U-phase motor sections Mu1 and Mu2 are arranged in the stages at the axial two ends. With this configuration, it is possible to improve a balance of induced voltages generated in the respective phases (see FIGS. 41A and 41B). As a result, it is possible to suppress the motor performance from being deteriorated by imbalance of the induced voltages in the respective phases. Further, by forming the motor sections Mu1, Mv, Mw, and Mu2 in the four stage configuration, it is possible to improve the balance of the induced voltages generated in the respective phases while suppressing an increase in size in the axial direction as much as possible.

(7) On the axial two sides of the V-phase motor section Mv, the first U-phase motor section Mu1 and the W-phase motor section Mw are respectively arranged. On the axial two sides of the W-phase motor section Mw, the V-phase motor section Mv and the second U-phase motor section Mu2 are respectively arranged. With this configuration, two single motor sections of the other phase are respectively arranged on two sides of the V-phase and W-phase motor sections Mv and Mw (i.e., the motor sections are arranged in the order of the U phase, the V phase, the W phase, and the U phase). Therefore, a transition of magnetic flux generation among the phases is smoothly performed. It is possible to contribute to the improvement of the motor performance.

Note that the third embodiment may be changed as explained below.

In the embodiment, the brushless motor 210 is configured in the four stage structure by the four single motor sections (the first U-phase motor section Mu1, the V-phase motor section Mv, the W-phase motor section Mw, and the second U-phase motor section Mu2). However, the motor sections are not limited to this. The number of stages may be changed as appropriate as long as the numbers of the V-phase and W-phase motor sections Mv and Mw are the same number (n) and the number of U-phase motor sections is (n+1).

For example, the brushless motor 210 may have a configuration including a seven stage structure including three U-phase motor sections and two V-phase motor sections and two W-phase motor sections, two among the three U-phase motor sections being arranged in stages at two ends. With this configuration, it is possible to obtain effects substantially the same as the effects in the embodiment. In this case, it is preferable to arrange the single motor sections in the seven stages in the order of the U phase, the V phase, the W phase, the U phase, the V phase, the W phase, and the U phase. Consequently, a transition of magnetic flux generation among the phases is smoothly performed. It is possible to contribute to improvement of the motor performance.

In this embodiment, the motor sections Mu1, Mv, Mw, and Mu2 are stacked without a gap. However, the motor sections Mu1, Mv, Mw, and Mu2 are not limited to this. The motor sections Mu1, Mv, Mw, and Mu2 may be arranged spaced from one another in the axial direction.

The number of the claw-like magnetic poles 225, 227, 235, and 237 (the number of magnetic poles) is not limited to the embodiment and may be changed as appropriate according to a configuration.

In the rotor 211 in the embodiment, all magnetization directions of the magnetic field magnets 223 in the respective phases may be set in the same direction.

In the embodiment, the magnetic field magnet 223 is the ferrite magnet. However, other than the ferrite magnet, the magnetic field magnet 223 may be, for example, a neodymium magnet.

In the embodiment, the present invention is applied to the brushless motor 210 of the inner rotor type in which the rotor 211 is arranged on the inner side of the stator 212. However, the present invention may be applied to a motor of an outer rotor type.

A motor according to a fourth embodiment is explained below with reference to FIGS. 42 to 53.

Figure 42:
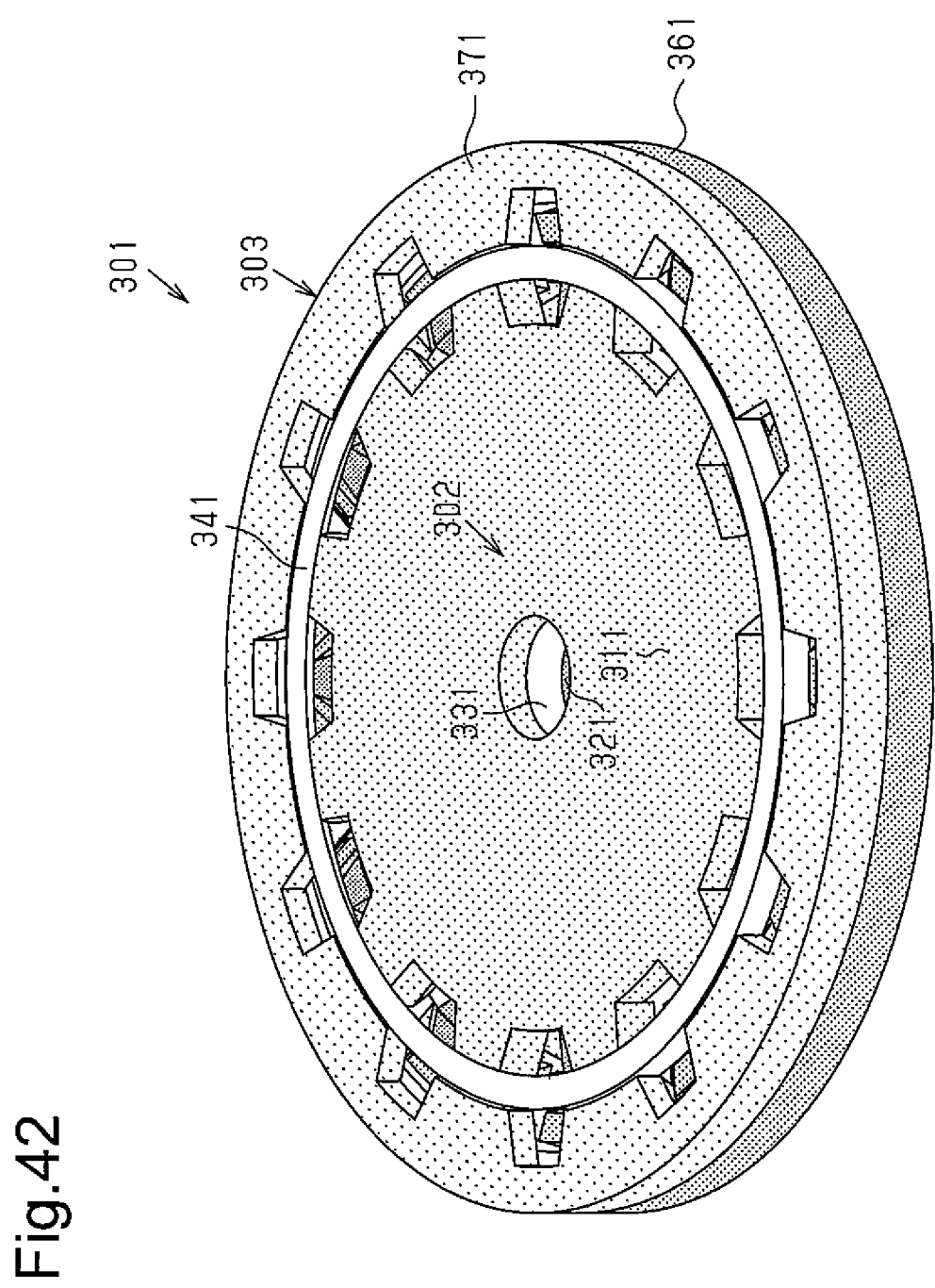
FIG. 42 is a perspective view of a motor according to a fourth embodiment of the present invention.
Figure 43:
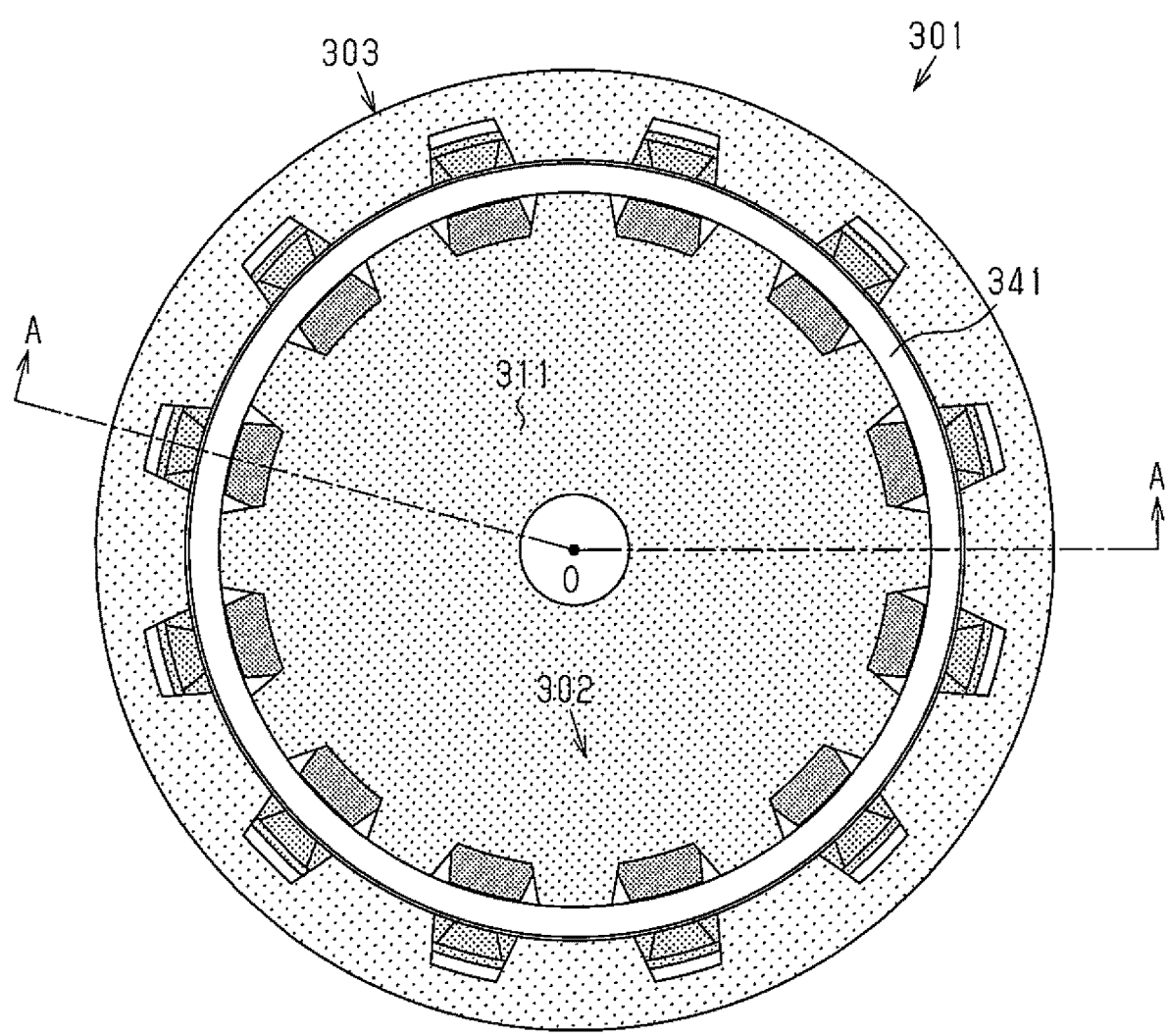
FIG. 43 is a front view of the motor according to the fourth embodiment viewed from the axial direction.

As shown in FIGS. 42 and 43, a brushless motor 301 includes a rotor 302 firmly fixed to a rotating shaft (not shown in the figure) and an annular stator 303 arranged on the outer side of the rotor 302 and firmly fixed to a not-shown motor housing. Note that the not-shown rotating shaft is rotatably supported by a bearing attached to the not-shown motor housing.

Rotor 302

Figure 45:
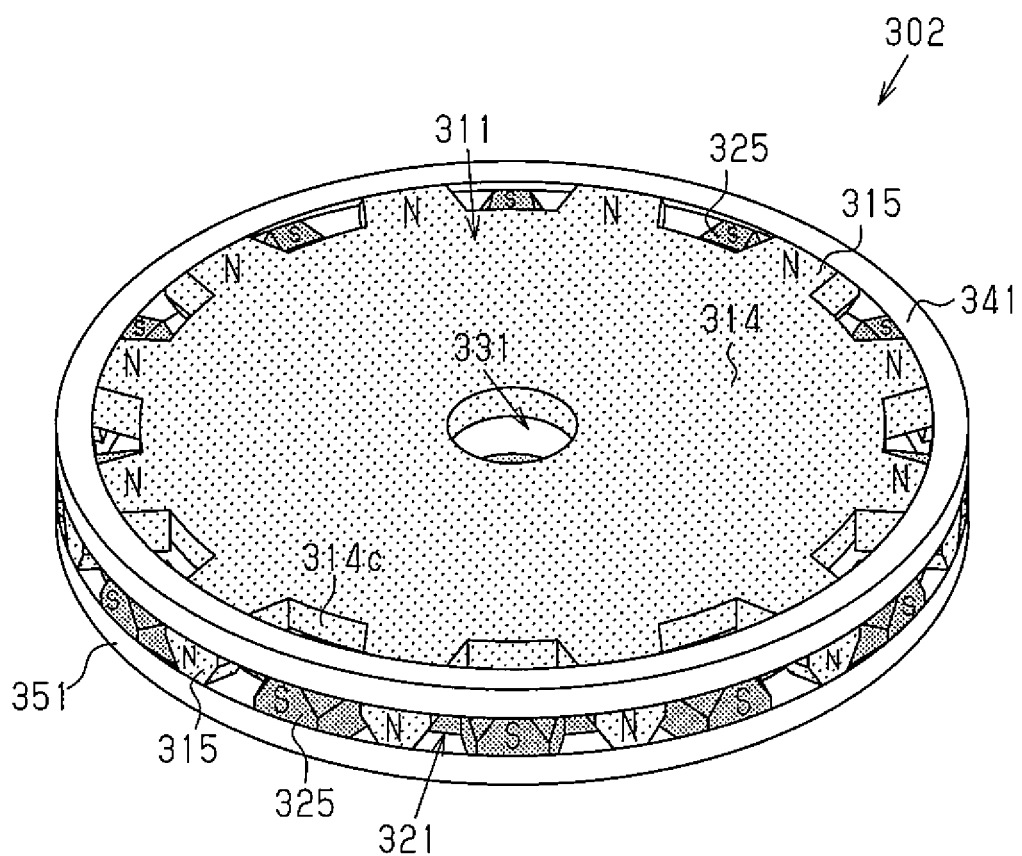
FIG. 45 is a perspective view or a rotor according to the fourth embodiment.
Figure 46:
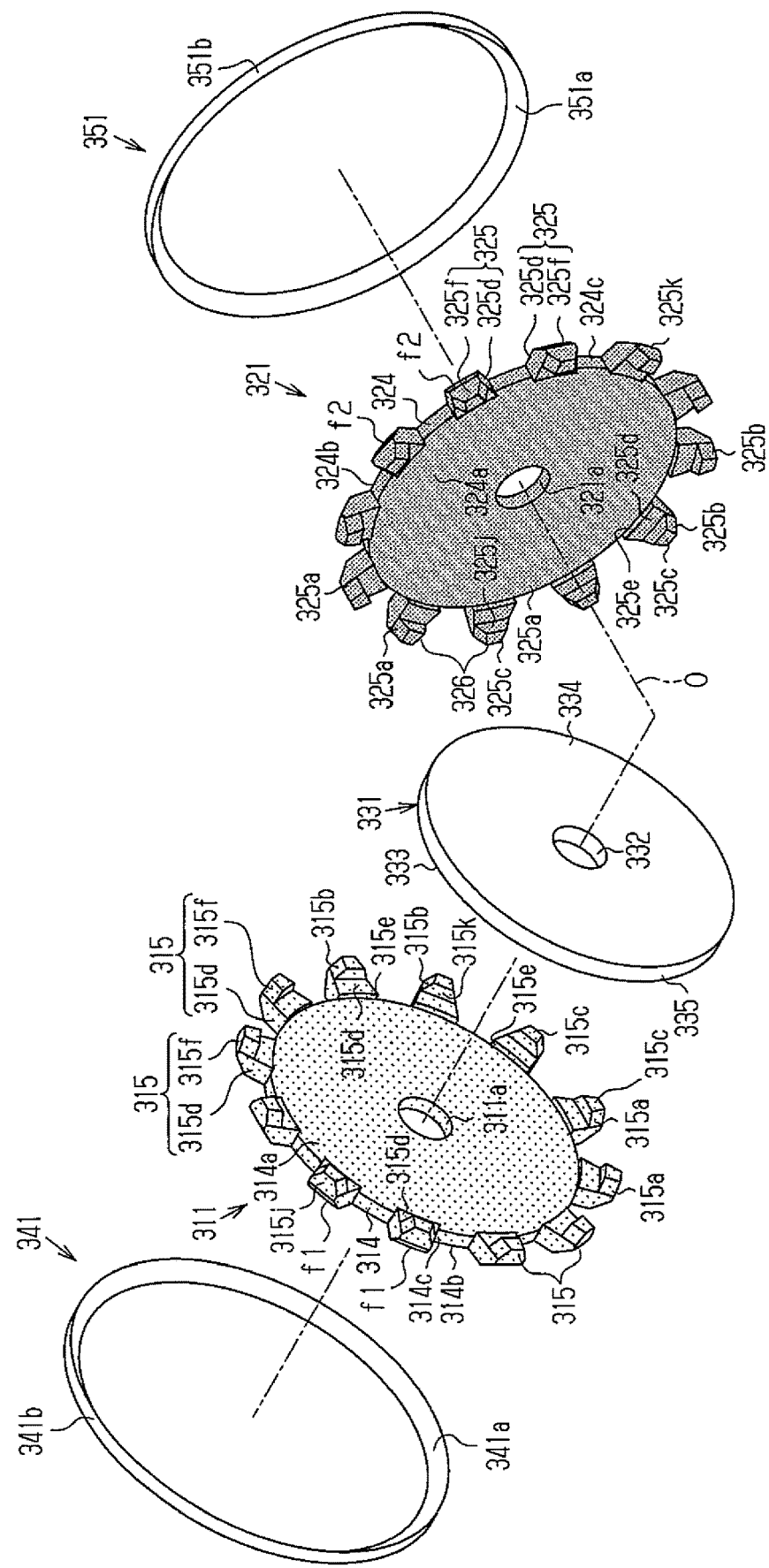
FIG. 46 is an exploded perspective view of the rotor according to the fourth embodiment.

As shown in FIGS. 45 and 46, the rotor 302 includes first and second rotor cores 311 and 321, magnetic field magnets 331, and first and second annular auxiliary magnets 341 and 351.

First Rotor Core 311

Figure 44:
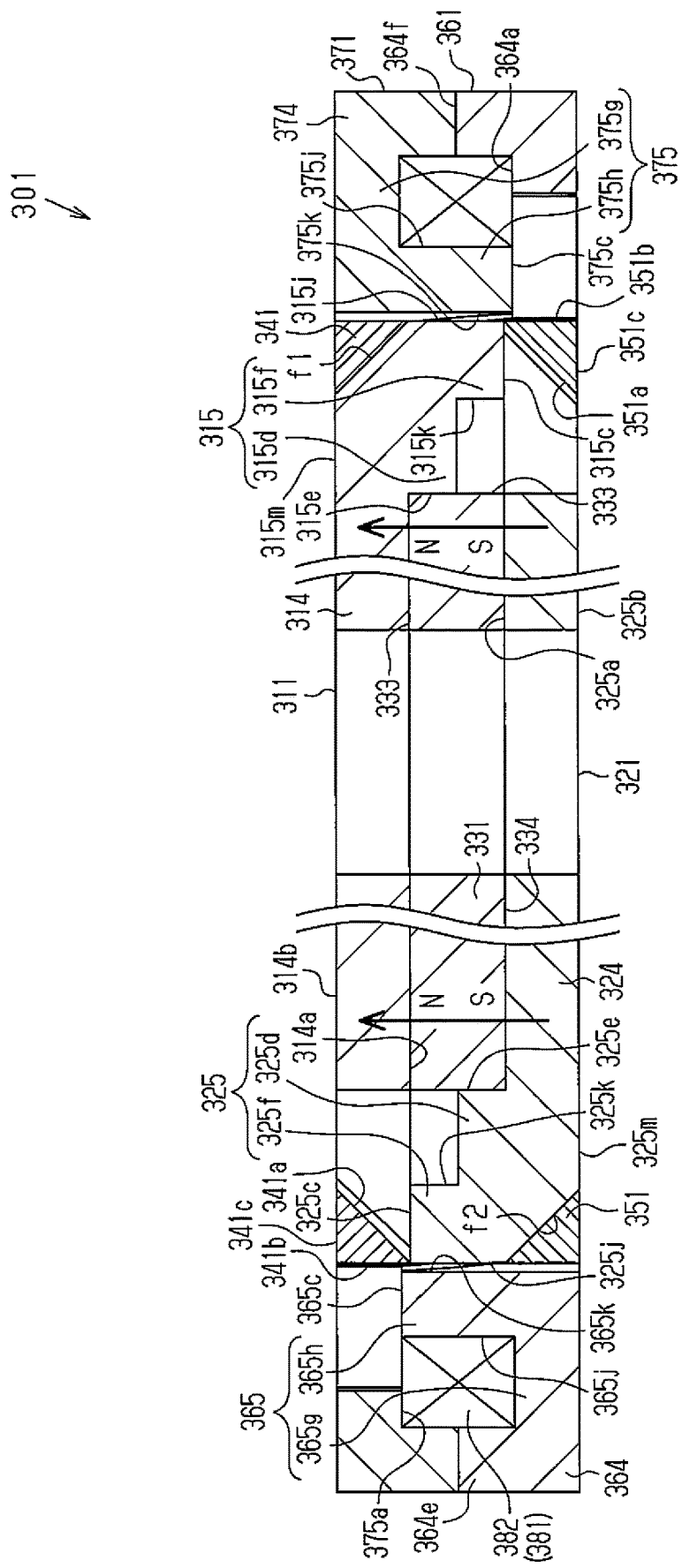
FIG. 44 is a combined sectional view taken along line A-O-A in FIG. 43.

As shown in FIGS. 44 and 46, the first rotor core 311 includes a first rotor core base 314 formed by an electromagnetic steel plate formed in a disk shape. In the center position of the first rotor core base 314, a through-hole 311a for inserting and firmly fixing the rotating shaft (not shown in the figure) is formed.

On an outer circumferential surface 314c of the first rotor core base 314, twelve first rotor side claw-like magnetic poles 315 formed in the same shape are projected to the radial outer side at equal intervals. The distal ends of the first rotor side claw-like magnetic poles 315 are bent and formed to extend to the second rotor core 321 side in the axial direction.

As shown in FIG. 44, in the first rotor side claw-like magnetic pole 315, a portion projecting to the radial outer side from the outer circumferential surface 314c of the first rotor core base 314 is formed larger in thickness (length in the axial direction) than the thickness (the length in the axial direction) of the first rotor core base 314 and is formed as a first step section 315d. The first step section 315d is formed to be thicker to the second rotor core 321 side. A horizontal surface (hereinafter referred to as first back surface 315m) on a counter second rotor core 321 side is flush with a counter opposed surface 314b of the first rotor core base 314.

A first step surface 315e formed on the radial inner side of the first step section 315d is, when viewed from the axial direction, an arcuate surface concentric with the outer circumferential surface 314c of the first rotor core base 314 centering on a center axis O of the not-shown rotating shaft.

A first magnetic pole section 315f is formed to extend to the second rotor core 321 side in the axial direction from the radial outer side end of the first step section 315d, whereby the first rotor side claw-like magnetic pole 315 is formed. Two circumferential end faces 315a and 315b of the first rotor side claw-like magnetic pole 315 including the first step section 315d and the first magnetic pole section 315f are flat surfaces and are formed to be closer to each other toward the distal ends.

That is, a shape of the first step section 315d when viewed from the axial direction is a trapezoidal shape smaller in width toward the radial outer side. A shape of the first magnetic pole section 315f when viewed from the radial direction is a trapezoidal shape smaller in width toward the distal end.

The first magnetic pole section 315f of the first rotor side claw-like magnetic pole 315 is formed in a fan shape in a cross section in a direction orthogonal to the axis direction. An outer side surface 315j and an inner side surface 315k in the radial direction of the first magnetic pole section 315f are, when viewed from the axial direction, arcuate surfaces concentric with the outer circumferential surface 314c of the first rotor core base 314 centering on the center axis O.

An angle in the circumferential direction of the first rotor side claw-like magnetic poles 315, that is, an angle formed by the circumferential end faces 315a and 315b with respect to the center axis O of the rotating shaft (not shown in the figure) is set smaller than an angle of a gap between the first rotor side claw-like magnetic poles 315 adjacent to each other.

Second Rotor Core 321

As shown in FIG. 46, the second rotor core 321 is formed of a material and in a shape same as the material and the shape of the first rotor core 311. In the center position of the second rotor core base 324 formed by an electromagnetic steel plate formed in a disk shape, a through-hole 321a for inserting and firmly fixing the rotating shaft (not shown in the figure) is formed.

On the outer circumferential surface of the second rotor core base 324, twelve second rotor side claw-like magnetic poles 325 formed in the same shape are projected to the radial outer side at equal intervals. The distal ends of the second rotor side claw-like magnetic poles 325 are bent and formed to extend to the first rotor core 311 side in the axial direction.

As shown in FIG. 44, in the second rotor side claw-like magnetic pole 325, a portion projecting to the radial outer side from an outer circumferential surface 324c of the second rotor core base 324 is formed larger in thickness (length in the axial direction) than the thickness (the length in the axial direction) of the second rotor core base 324 and is formed as a second step section 325d. The second step section 325d is formed to be thicker to the first rotor core 311 side. A horizontal surface (hereinafter referred to as second back surface 325m) on a counter first rotor core 311 side is flush with a counter opposed surface 324b of the second rotor core base 324.

A second step surface 325e formed on the radial inner side of the second step section 325d is, when viewed from the axial direction, an arcuate surface concentric with the outer circumferential surface 324c of the second rotor core base 324 centering on the center axis O.

A second magnetic pole section 325f is formed to extend to the first rotor core 311 side in the axial direction from the radial outer side end of the second step section 325d, whereby the second rotor side claw-like magnetic pole 325 is formed. Two circumferential end faces 325a and 325b of the second rotor side claw-like magnetic pole 325 including the second step section 325d and the second magnetic pole section 325f are flat surfaces and are formed to be closer to each other toward the distal ends.

That is, a shape of the second step section 325d when viewed from the axial direction is a trapezoidal shape smaller in width toward the radial outer side. A shape of the second magnetic pole section 325f when viewed from the radial direction is a trapezoidal shape smaller in width toward the distal end.

The second magnetic pole section 325f of the second rotor side claw-like magnetic pole 325 is formed in a fan shape in a cross-section in the direction orthogonal to the axis direction. An outer side surface 325j and an inner side surface 325k in the radial direction of the second magnetic pole section 325f are, when viewed from the axial direction, arcuate surfaces concentric with the outer circumferential surface 314c of the first rotor core base 314 centering on the center axis O.

An angle in the circumferential direction of the second rotor side claw-like magnetic poles 325, that is, an angle formed by the circumferential end faces 325a and 325b with respect to the center axis O of the rotating shaft (not shown in the figure) is set smaller than an angle of a gap between the second rotor side claw-like magnetic poles 325 adjacent to each other.

The second rotor core 321 is arranged and fixed with respect to the first rotor core 311 such that the second rotor side claw-like magnetic poles 325 of the second rotor core 321 are respectively located among the first rotor side claw-like magnetic poles 315 of the first rotor core 311 when viewed from the axial direction. In this case, the second rotor core 321 is assembled to the first rotor core 311 such that the magnetic field magnets 331 are arranged in the axial direction between the first rotor core 311 and the second rotor core 321.

Magnetic Field Magnet 331

As shown in FIG. 46, in this embodiment, the magnetic field magnet 331 is a disk-like permanent magnet formed by a ferrite magnet. A through-hole 332, through which the rotating shaft (not shown in the figure) is inserted, is formed in the center position of the magnetic field magnet 331. One side surface 333 of the magnetic field magnet 331 is in contact with an opposed surface 314a of the first rotor core base 314. The other side surface 334 of the magnetic field magnet 331 is in contact with an opposed surface 324a of the second rotor core base 324. The magnetic field magnet 331 is sandwiched and fixed between the first rotor core 311 and the second rotor core 321.

The outer diameter of the magnetic field magnet 331 is set to coincide with the outer diameter of the first and second rotor core bases 314 and 324 (the outer circumferential surfaces 314c and 324c).

Therefore, when the magnetic field magnet 331 is sandwiched by the first rotor core base 314 and the second rotor core base 324, as shown in FIG. 44, the first and second step sections 315d and 325d and the first and second step surfaces 315e and 325e of the first and second rotor side claw-like magnetic poles 315 and 325 are in contact with an outer circumferential surface 335 of the magnetic field magnet 331.

The thickness (the length in the axial direction) of the magnetic field magnet 331 is set to thickness decided in advance. In this embodiment, as shown in FIG. 44, the first and second rotor side claw-like magnetic poles 315 and 325 are set to length at which distal end faces 315c and 325c thereof are respectively flush with the opposed surfaces 314a and 324a of the first and second rotor core bases 314 and 324.

As shown in FIG. 44, the magnetic field magnet 331 is magnetized in the axial direction to set the first rotor core 311 side as an N pole and set the second rotor core 321 side as an S pole. Therefore, the first rotor side claw-like magnetic poles 315 of the first rotor core 311 are caused to function as N poles (first magnetic poles) by the magnetic field magnet 331. The second rotor side claw-like magnetic poles 325 of the second rotor core 321 are caused to function as S poles (second magnetic poles) by the magnetic field magnet 331.

The rotor 302 configured as explained above is a rotor of a so-called Lundell type structure including the magnetic field magnets 331. The rotor 302 is a rotor including twenty-four magnetic poles (twelve pole pairs) in which the first rotor side claw-like magnetic poles 315 functioning as the N poles and the second rotor side claw-like magnetic poles 325 functioning as the S poles are alternately arranged in the circumferential direction.

First Annular Auxiliary Magnet 341

As shown in FIGS. 45 and 46, the first annular auxiliary magnet 341 is firmly fixed on the counter second rotor core 321 side of the first rotor core 311.

More specifically, as shown in FIGS. 44 and 46, the first rotor side claw-like magnetic poles 315 of the first rotor core 311 respectively have edges where the horizontal first back surface 315m of the first step section 315d that is located on the opposite side of the second rotor core 321 crosses the outer side surface 315j of the first magnetic pole section 315f formed by the arcuate surfaces. The edge is shaped such that a portion having isosceles right triangular shape in cross-section is cut out from this edge to form first coupling surface f1. The length of two sides between which an oblique side locates in the isosceles right triangle is set to be the same as the thickness in the axial direction of the first rotor core base 314. Since the outer side surfaces 315j are the arcuate surfaces, the first coupling surfaces f1 formed in the first rotor side claw-like magnetic poles 315 are formed as conical surfaces centering on the center axis O.

The first annular auxiliary magnet 341 is bonded and fixed to the first coupling surfaces f1 of the first rotor side claw-like magnetic poles 315 by an adhesive.

As shown in FIGS. 44 and 46, the first annular auxiliary magnet 341 is a permanent magnet formed by a ferrite magnet formed in a ring shape. The first annular auxiliary magnet 341 is shaped to be isosceles right triangle in cross-section that is same as a portion having isosceles right triangular shape in cross-section that is cut out from the above-described edge. The oblique side of the isosceles right triangle in cross-section forms an inner side surface 341a of the first annular auxiliary magnet 341.

Therefore, the inner side surface 341a of the first annular auxiliary magnet 341 is formed as a conical surface centering on the center axis O. The inner side surface 341a of the first annular auxiliary magnet 341 is bonded and fixed to the first coupling surfaces f1 of the first rotor side claw-like magnetic poles 315 at a predetermined pitch by an adhesive.

When the first annular auxiliary magnet 341 is bonded and fixed to the first rotor side claw-like magnetic poles 315, a radial outer side surface 341b of the first annular auxiliary magnet 341 is flush with the outer side surface 315j of the first magnetic pole section 315f. An axial outer side surface 341c of the first annular auxiliary magnet 341 is flush with the horizontal first back surface 315m on the counter second rotor core 321 side of the first step section 315d.

In this case, the distal end face 325c of the second magnetic pole section 325f relatively arranged between the first rotor side claw-like magnetic poles 315 in the circumferential direction is in contact with an edge portion where the radial outer side surface 341b and the inner side surface 341a of the first annular auxiliary magnet 341 cross each other.

Figure 47:
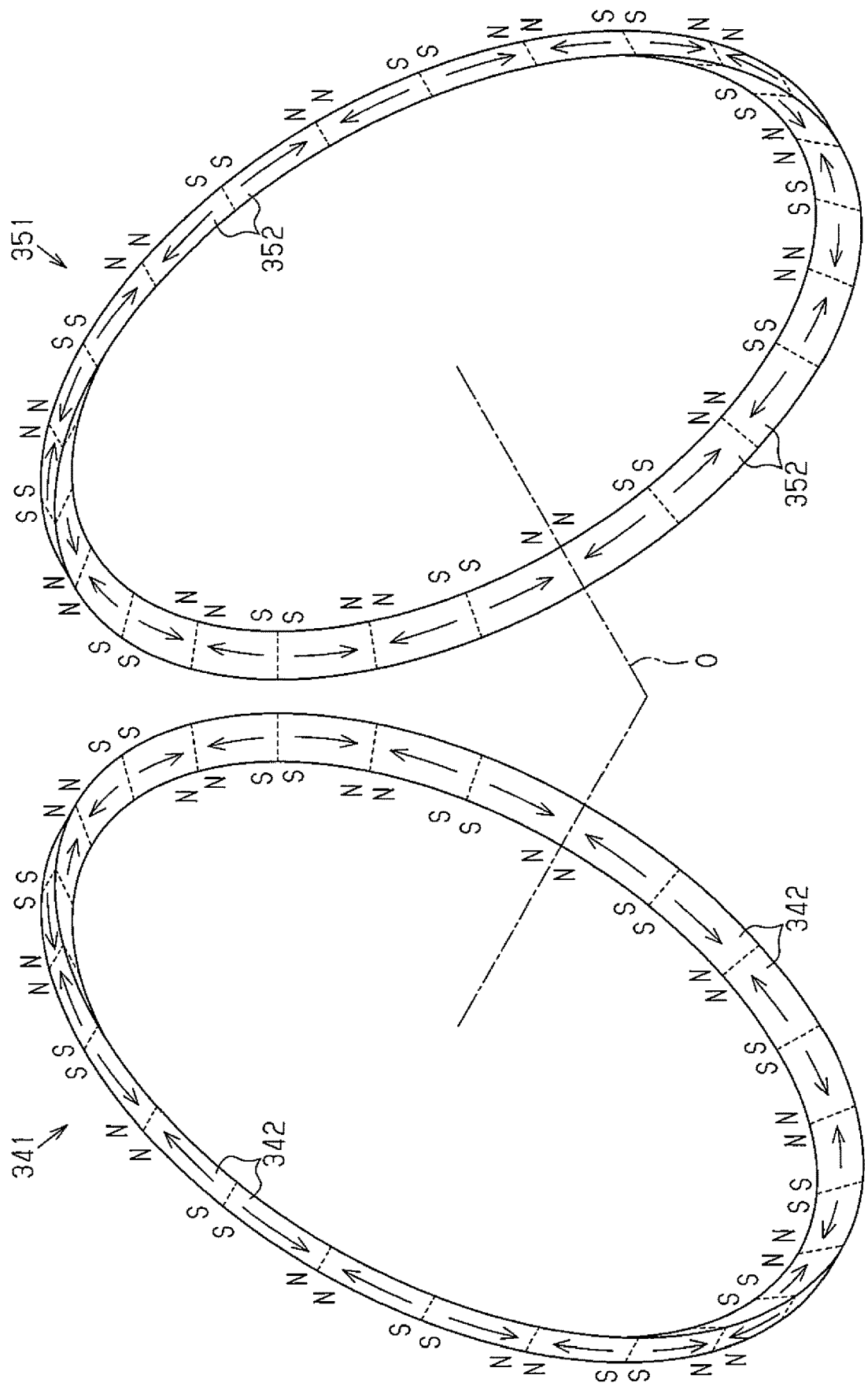
FIG. 47 is a perspective view of first and second annular auxiliary magnets in the fourth embodiment.

As shown in FIG. 47, in the first annular auxiliary magnet 341, twenty-four first magnet sections 342 equally divided by the number of the first rotor side claw-like magnetic poles 315 and the second rotor side claw-like magnetic poles 325 (twenty-four) in the circumferential direction are formed.

Figure 48:
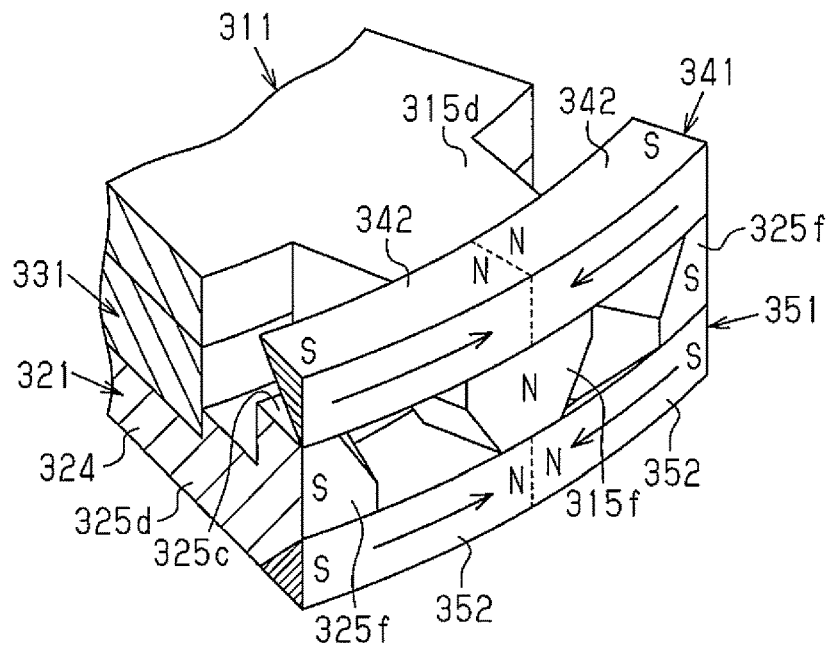
FIG. 48 is a main part enlarged sectional perspective view of the rotor according to the fourth embodiment.

As shown in FIG. 48, the first annular auxiliary magnet 341 is arranged with respect to the first rotor core 311 such that boundaries between the first magnet sections 342 respectively coincide with circumferential center positions of the first magnetic pole sections 315f of the first rotor side claw-like magnetic poles 315 or circumferential center positions of the second magnetic pole sections 325f of the second rotor side claw-like magnetic poles 325.

As shown in FIGS. 47 and 48, the first annular auxiliary magnet 341 arranged in this way is magnetized in the circumferential direction in the first magnet sections 342 and magnetized to set the first magnetic pole section 315f sides as N poles and set the second magnetic pole section 325f sides as S poles in the first magnet sections 342.

That is, the N poles of the first magnet sections 342 are respectively arranged at the proximal end portions of the first magnetic pole sections 315f of the first rotor side claw-like magnetic poles 315. The S poles of the first magnet sections 342 are respectively arranged at the distal end portions of the second magnetic pole sections 325f of the second rotor side claw-like magnetic poles 325.

Consequently, leakage fluxes (short-circuit fluxes) from the proximal end portions of the first magnetic pole sections 315f of the N poles to the distal end portions of the second magnetic pole sections 325f of the S poles decrease.

Second Annular Auxiliary Magnet 351

As shown in FIGS. 45 and 46, the second annular auxiliary magnet 351 is firmly fixed to a counter first rotor core 311 side of the second rotor core 321.

More specifically, as shown in FIGS. 44 and 46, the second rotor side claw-like magnetic poles 325 of the second rotor core 321 respectively have edges where the horizontal first back surfaces 325m of the second step sections 325d that is located on the opposite side of the first rotor core 311 crosses the outer side surfaces 325j of the second magnetic pole sections 325f formed by the arcuate surfaces. The edge is shaped such that a portion having isosceles right triangular shape in cross-section is cut out from this edge to form second coupling surfaces f2. The length of two sides between which an oblique side locates in the isosceles right triangle is set to be the same as the thickness in the axial direction of the second rotor core base 324. Since the outer side surfaces 325j are the arcuate surfaces, the second coupling surfaces f2 formed in the second rotor side claw-like magnetic poles 325 are formed as conical surfaces centering on the center axis O.

The second annular auxiliary magnet 351 is bonded and fixed to the second coupling surfaces f2 of the second rotor side claw-like magnetic poles 325 by an adhesive.

As shown in FIGS. 44 and 46, the second annular auxiliary magnet 351 is a permanent magnet formed by a ferrite magnet formed in an annular shape. The second annular auxiliary magnet 351 is shaped to be isosceles right triangle in cross-section that is same as a portion having isosceles right triangular shape in cross-section that is cut out from the above-described edge. The oblique side of the isosceles right triangle in cross-section forms an inner side surface 351a of the second annular auxiliary magnet 351.

Therefore, the inner side surface 351a of the second annular auxiliary magnet 351 is formed as a conical surface centering on the center axis O. The inner side surface 351a of the second annular auxiliary magnet 351 is bonded and fixed to the second coupling surfaces f2 of the second rotor side claw-like magnetic poles 325 at a predetermined pitch by an adhesive.

When the second annular auxiliary magnet 351 is bonded and fixed to the second rotor side claw-like magnetic poles 325, a radial outer side surface 351b of the second annular auxiliary magnet 351 is flush with the outer side surface 325j of the second magnetic pole section 325f. An axial outer side surface 351c of the second annular auxiliary magnet 351 is flush with the horizontal second back surface 325m on the counter first rotor core 311 side of the second step section 325d.

In this case, the distal end face 315c of the first magnetic pole section 315f relatively arranged between the second rotor side claw-like magnetic poles 325 in the circumferential direction is in contact with an edge portion where the radial outer side surface 351b and the inner side surface 351a of the second annular auxiliary magnet 351 cross each other.

As shown in FIG. 47, in the second annular auxiliary magnet 351, twenty-four second magnet sections 352 equally divided by the number of the first rotor side claw-like magnetic poles 315 and the second rotor side claw-like magnetic poles 325 (twenty-four) in the circumferential direction are formed.

As shown in FIG. 48, the second annular auxiliary magnet 351 is arranged with respect to the second rotor core 321 such that boundaries between the second magnet sections 352 respectively coincide with circumferential center positions of the second magnetic pole sections 325f of the second rotor side claw-like magnetic poles 325 or circumferential center positions of the first magnetic pole sections 315f of the first rotor side claw-like magnetic poles 315.

As shown in FIGS. 47 and 48, the second annular auxiliary magnet 351 arranged in this way is magnetized in the circumferential direction in the second magnet sections 352 and magnetized to set the first magnetic pole section 315f sides as N poles and set the second magnetic pole section 325f sides as S poles in the second magnet sections 352.

That is, the S poles of the second magnet sections 352 are respectively arranged at the proximal end portions of the second magnetic pole sections 325f of the second rotor side claw-like magnetic poles 325. The N poles of the second magnet sections 352 are respectively arranged at the distal end portions of the first magnetic pole sections 315f of the first rotor side claw-like magnetic poles 315.

Consequently, leakage fluxes (short-circuit fluxes) from the distal end portions of the first magnetic pole sections 315f of the N poles to the proximal end portions of the second magnetic pole sections 325f of the S poles decrease.

Stator 303

Figure 49:
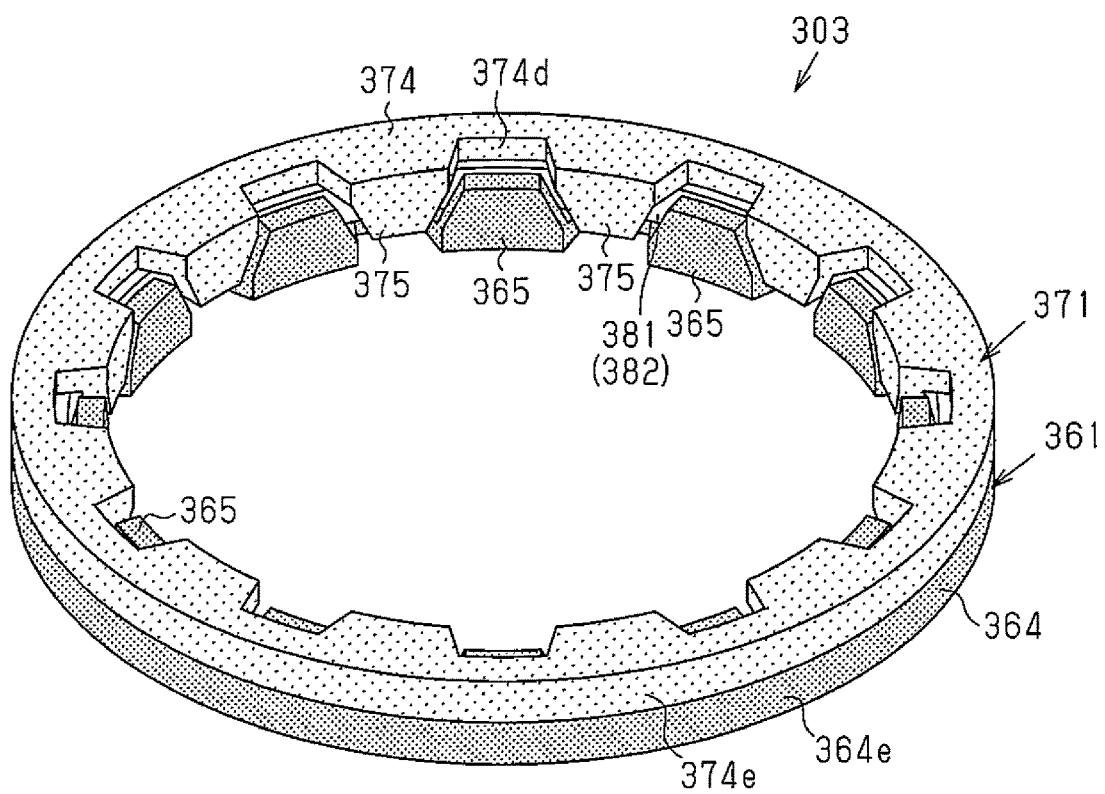
FIG. 49 is a perspective view of a stator in the fourth embodiment.
Figure 50:
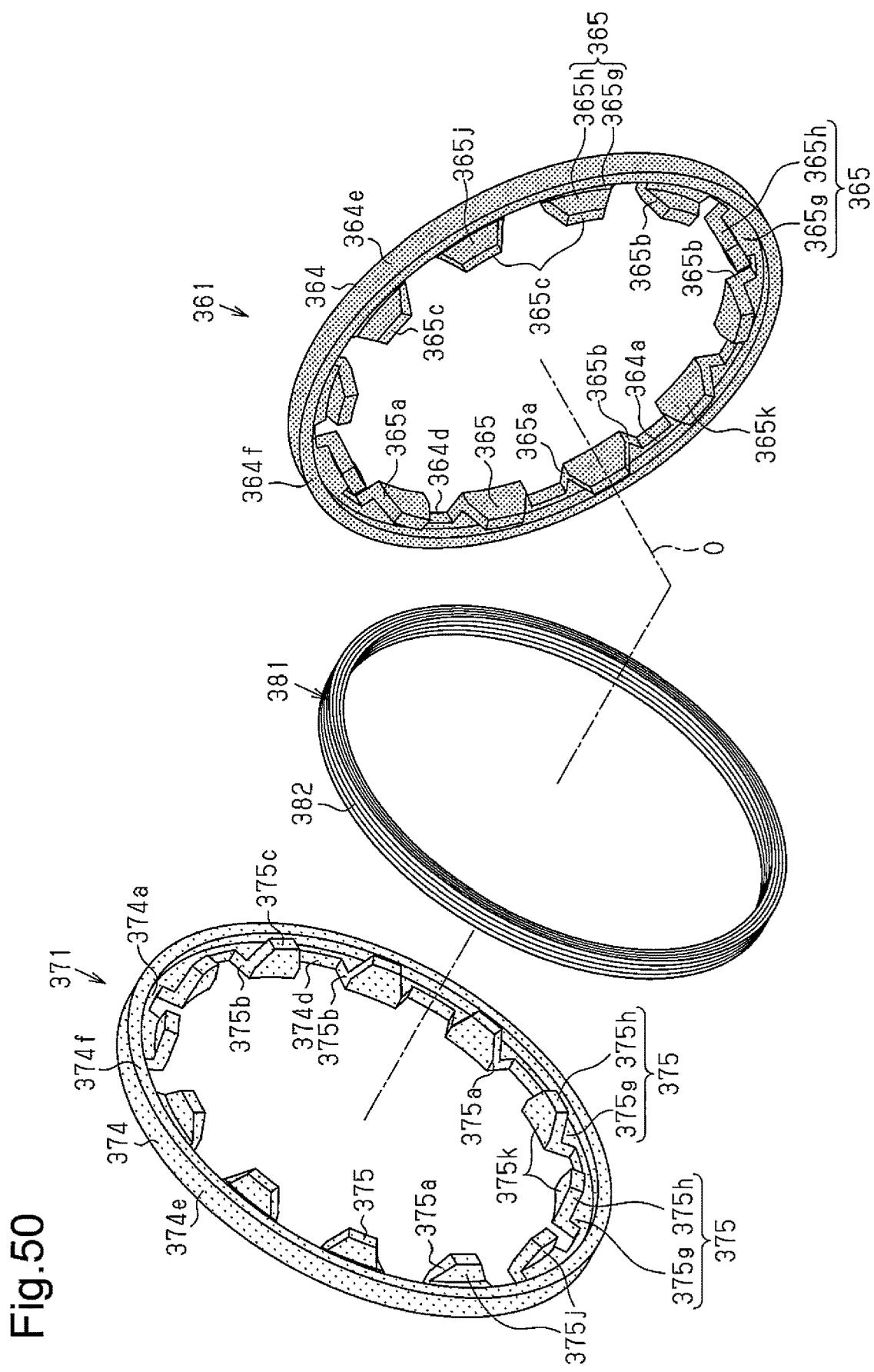
FIG. 50 is an exploded perspective view of the stator according to the fourth embodiment.

The stator 303 arranged on the radial outer side of the rotor 302 includes, as shown in FIGS. 49 and 50, first and second stator cores 361 and 371 and a coil section 381.

First Stator Core 361

As shown in FIG. 50, the first stator core 361 includes a ring plate-like first stator core base 364 formed by an electromagnetic steel plate. In the ring plate-like first stator core base 364, an outer circumferential section thereof is formed to be bent to the second stator core 371 side to form a first stator side cylindrical wall 364e. An annular distal end face 364f of the first stator side cylindrical wall 364e is opposed to the second stator core 371. The length in the axial direction of the first stator side cylindrical wall 364e is half length of the length in the axial direction of the rotors in the respective phases.

On an inner circumferential surface 364d of the first stator core base 364, twelve first stator side claw-like magnetic poles 365 are projected to the radial inner side at equal intervals. The distal ends of the first stator side claw-like magnetic poles 365 are formed to be bent to the second stator core 371 side in the axial direction.

In the first stator side claw-like magnetic pole 365, a portion projecting to the radial inner side from the inner circumferential surface 364d of the first stator core base 364 is referred to as first stator side base section 365g. A distal end portion bent in the axial direction is referred to as first stator side magnetic pole section 365h. The first stator side claw-like magnetic pole 365 before the first stator side magnetic pole section 365h is formed to be bent is formed in a trapezoidal shape tapered toward the distal end when viewed from the axial direction.

That is, a shape of the first stator side base section 365g when viewed from the axial direction is a trapezoidal shape smaller in width toward the radial inner side. A shape of the first stator side magnetic pole section 365h when viewed from the radial direction is a trapezoidal shape smaller in width toward the distal end. Both circumferential end faces 365a and 365b of the first stator side claw-like magnetic pole 365 including the first stator side base section 365g and the first stator side magnetic pole section 365h are flat surfaces and are closer to each other toward the distal end.

Consequently, a sectional area of a cross section cut in the axial direction of the first stator side base section 365g viewed from the radial direction is smaller toward the radial inner side. A sectional area of a cross section cut in the radial direction of the first stator side magnetic pole section 365h viewed from the axial direction is smaller toward the distal end side.

Note that the first stator side magnetic pole section 365h formed to be bent in the axial direction has a fan shape in cross-section in the direction orthogonal to the axial direction. An outer side surface 365j and an inner side surface 365k in the radial direction of the first stator side magnetic pole section 365h are, when viewed from the axial direction, an arcuate surface concentric with the inner circumferential surface 364d of the first stator core base 364 centering on the center axis O.

An angle in the circumferential direction of the first stator side base sections 365g of the first stator side claw-like magnetic poles 365, that is, an angle formed by the proximal end portions of the circumferential end faces 365a and 365b with respect to the center axis O of the rotating shaft (not shown in the figure) is set smaller than an angle of a gap between the proximal ends of the first stator side base sections 365g of the first stator side claw-like magnetic poles 365 adjacent to each other.

Second Stator Core 371

As shown in FIG. 50, the second stator core 371 includes a ring plate-like second stator core base 374 formed by an electromagnetic steel plate formed of a material and in a shape same as the material and the shape of the first stator core base 364. In the ring plate-like second stator core base 374, an outer circumferential section thereof is formed to be bent to the first stator core 361 side to form a second stator side cylindrical wall 374e. An annular distal end face 374f of the second stator side cylindrical wall 374e is opposed to the distal end face 364f of the first stator side cylindrical wall 364e. The length in the axial direction of the second stator side cylindrical wall 374e is half length of the length in the axial direction of the rotors in the respective phases.

On an inner circumferential surface 374d of the second stator core base 374, twelve second stator side claw-like magnetic poles 375 are projected to the radial inner side at equal intervals. The distal ends of the second stator side claw-like magnetic poles 375 are formed to be bent to the first stator core 361 side in the axial direction.

In the second stator side claw-like magnetic pole 375, a portion projecting to the radial inner side from the inner circumferential surface 374d of the second stator core base 374 is referred to as second stator side base section 375g. A distal end portion bent in the axial direction is referred to as second stator side magnetic pole section 375h. The second stator side claw-like magnetic pole 375 before the second stator side magnetic pole section 375h is formed to be bent is formed in a trapezoidal shape tapered toward the distal end when viewed from the axial direction.

That is, a shape of the second stator side base section 375g when viewed from the axial direction is a trapezoidal shape smaller in width toward the radial inner side. A shape of the second stator side magnetic pole section 375h when viewed from the radial direction is a trapezoidal shape smaller in width toward the distal end. Both circumferential end faces 375a and 375b of the second stator side claw-like magnetic pole 375 including the second stator side base section 375g and the second stator side magnetic pole section 375h are flat surfaces and are closer to each other toward the distal end.

Consequently, a sectional area of a cross section cut in the axial direction of the second stator side base section 375g viewed from the radial direction is smaller toward the radial inner side. A sectional area of a cross section cut in the radial direction of the second stator side magnetic pole section 375h viewed from the axial direction is smaller toward the distal end side.

Note that the second stator side magnetic pole section 375h formed to be bent in the axial direction has a fan shape in cross-section in the direction orthogonal to the axial direction. An outer side surface 375j and an inner side surface 375k in the radial direction of the second stator side magnetic pole section 375h are, when viewed from the axial direction, an arcuate surface concentric with the inner circumferential surface 374d of the second stator core base 374 centering on the center axis O.

An angle in the circumferential direction of the second stator side base sections 375g of the second stator side claw-like magnetic poles 375, that is, an angle formed by the proximal end portions of the circumferential end faces 375a and 375b with respect to the center axis O of the rotating shaft (not shown in the figure) is set smaller than an angle of a gap between the proximal ends of the second stator side base sections 375g of the second stator side claw-like magnetic poles 375 adjacent to each other.

That is, when the second stator core 371 is formed as explained above, the shape of the second stator core 371 is the same as the shape of the first stator core 361. The distal end face 364f of the first stator side cylindrical wall 364e and the distal end face 374f of the second stator side cylindrical wall 374e are set in contact with each other. The first and second stator cores 361 and 371 are arranged to be fixed such that the second stator side claw-like magnetic poles 375 are respectively located among the first stator side claw-like magnetic poles 365 when viewed from the axial direction.

In this case, as shown in FIG. 44, the first stator side claw-like magnetic pole 365 is set in a position where a distal end face 365c of the first stator side magnetic pole section 365h thereof is flush with an opposed surface 374a of the second stator core base 374. Similarly, the second stator side claw-like magnetic pole 375 is set in a position where a distal end face 375c of the second stator side magnetic pole section 375h thereof is flush with an opposed surface 364a of the first stator core base 364.

Incidentally, an annular space having a square shape in cross-section is formed, which is defined by the opposed surfaces 364a and 374a of the first and second stator core bases 364 and 374, the inner circumferential surfaces of the first and second stator side cylindrical walls 364e and 374e, and the outer side surfaces 365j and 375j of the first and second stator side magnetic pole sections 365h and 375h. As shown in FIG. 44, the coil section 381 (an annular winding wire 382) is arranged and fixed in the annular space having the square shape in cross-section.

Coil Section 381

As shown in FIG. 50, the coil section 381 includes the annular winding wire 382. The annular winding wire 382 is wound around in the annular space. The first and second stator side claw-like magnetic poles 365 and 375 are energized to be different magnetic poles each other at every moment by feeding a single-phase alternating current to the annular winding wire 382.

The stator 303 configured as explained above is a stator of a so-called Lundell type (a claw pole type) structure including twenty-four poles that energize, with the annular winding wire 382 between the first and second stator cores 361 and 371, the first and second stator side claw-like magnetic poles 365 and 375 to be different magnetic poles each other at every moment.

Action of the brushless motor 301 configured as explained above is explained.

When a single-phase alternating current is fed to the annular winding wire 382 of the stator 303, a rotation magnetic field is generated in the stator 303. The rotor 302 is driven to rotate.

In this case, the first annular auxiliary magnet 341 is firmly fixed to the counter second rotor core 321 side of the first rotor core 311. The first annular auxiliary magnet 341 is arranged with respect to the first rotor core 311 such that boundaries among the equally divided twenty-four first magnet sections 342 respectively coincide with the circumferential center positions of the first magnetic pole sections 315f and the circumferential center positions of the second magnetic pole sections 325f.

The first annular auxiliary magnet 341 is magnetized in the circumferential direction in the first magnet sections 342 and magnetized to set the first magnetic pole section 315f sides as N poles and set the second magnetic pole section 325f sides as S poles in the first magnet sections 342.

Therefore, the N poles of the first magnet sections 342 of the first annular auxiliary magnet 341 are respectively arranged at the proximal end portions of the first magnetic pole sections 315f that are the N poles in the magnetic field magnet 331. The S poles of the first magnet sections 342 of the first annular auxiliary magnet 341 are respectively arranged at the distal end portions of the second magnetic pole sections 325f that are the S poles in the magnetic field magnet 331.

As a result, leakage fluxes (short-circuit fluxes) from the proximal end portions of the first magnetic pole sections 315f of the N pole to the distal end portions of the second magnetic pole sections 325f of the S pole are reduced by the first magnet sections 342 of the first annular auxiliary magnet 341.

Similarly, the second annular auxiliary magnet 351 is firmly fixed to the counter first rotor core 311 side of the second rotor core 321. The second annular auxiliary magnet 351 is arranged with respect to the second rotor core 321 such that boundaries among the equally divided twenty-four second magnet sections 352 respectively coincide with the circumferential center positions of the second magnetic pole sections 325f and the circumferential center positions of the first magnetic pole sections 315f.

The second annular auxiliary magnet 351 is magnetized in the circumferential direction in the second magnet sections 352 and magnetized to set the second magnetic pole section 325f sides as S poles and set the first magnetic pole section 315f sides as N poles in the second magnet sections 352.

Therefore, the S poles of the second magnet sections 352 of the second annular auxiliary magnet 351 are respectively arranged at the proximal end portions of the second magnetic pole sections 325f that are the S poles in the magnetic field magnet 331. The N poles of the second magnet sections 352 of the second annular auxiliary magnet 351 are respectively arranged at the distal end portions of the first magnetic pole sections 315f that are the N poles in the magnetic field magnet 331.

As a result, leakage fluxes (short-circuit fluxes) from the distal end portions of the first magnetic pole sections 315f of the N poles to the proximal end portions of the second magnetic pole sections 325f of the S poles are reduced by the second magnet sections 352 of the second annular auxiliary magnet 351.

As explained above, the first and second annular auxiliary magnets 341 and 351 that reduce leakage fluxes (short-circuit fluxes) are respectively firmly fixed to the first and second rotor cores 311 and 321. Therefore, it is possible to realize an increase in an output of the brushless motor 301.

An output of the brushless motor 301 firmly fixed with the first and second annular auxiliary magnets 341 and 351 in the fourth embodiment and an output of the brushless motor 301 not provided with the first and second annular auxiliary magnets 341 and 351 were compared and verified. An induced voltage, which is an element of the output of the brushless motor 301, was acquired by an experiment and a result shown in FIG. 51 was obtained.

Figure 51:
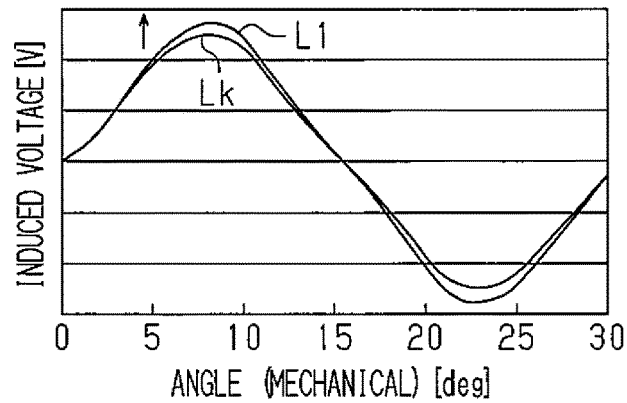
FIG. 51 is an induced voltage characteristic curve diagram for explaining an output characteristic of the motor according to the fourth embodiment.

An induced voltage characteristic line Lk in FIG. 51 is an induced voltage curve of the brushless motor not provided with the first and second annular auxiliary magnets 341 and 351. An induced voltage characteristic line L1 in FIG. 51 is an induced voltage curve of the brushless motor 301 provided with the first and second annular auxiliary magnets 341 and 351 in this embodiment.

As it is evident from the experiment result, it is seen that a maximum of an induced voltage is about 10% higher in the brushless motor 301 provided with the first and second annular auxiliary magnets 341 and 351 in this embodiment than in the brushless motor not provided with the first and second annular auxiliary magnets 341 and 351.

That is, it is seen that the first and second annular auxiliary magnets 341 and 351 contribute to an increase in the output of the brushless motor 301.

Advantages of the fourth embodiment are explained below.

(8) Leakage fluxes (short-circuit fluxes) from the proximal end portions of the first magnetic pole sections 315f of the N poles to the distal end portions of the second magnetic pole sections 325f of the S poles can be reduced by the first magnet sections 342 of the first annular auxiliary magnet 341. It is possible to attain an increase in the output of the brushless motor 301.

(9) According to this embodiment, leakage fluxes (short-circuit fluxes) from the distal end portions of the first magnetic pole sections 315f of the N poles to the proximal end portions of the second magnetic pole sections 325f of the S poles can be reduced by the second magnet sections 352 of the second annular auxiliary magnet 351. It is possible to attain an increase in the output of the brushless motor 301.

(10) According to this embodiment, in the first annular auxiliary magnet 341 firmly fixed to the first rotor core 311, the first magnet sections 342 opposed to the second rotor side claw-like magnetic poles 325 are set in contact with the distal end faces 325c of the second magnetic pole sections 325f of the second rotor side claw-like magnetic poles 325. Therefore, it is possible to further reduce the leakage fluxes (the short-circuit fluxes).

(11) In this embodiment, in the second annular auxiliary magnet 351 firmly fixed to the second rotor core 321, the second magnet sections 352 opposed to the first rotor side claw-like magnetic poles 315 are set in contact with the distal end faces 315c of the first magnetic pole sections 315f of the first rotor side claw-like magnetic poles 315. Therefore, it is possible to further reduce the leakage fluxes (the short-circuit fluxes).

(12) According to this embodiment, the first and second annular auxiliary magnets 341 and 351 are annular bodies. Therefore, the first and second annular auxiliary magnets 341 and 351 can be coupled and firmly fixed to the outer circumferential sections of the first and second rotor side claw-like magnetic poles 315 and 325 at a time. It is easy to assemble the first and second annular auxiliary magnets 341 and 351 to the first and second rotor cores 311 and 321. Moreover, it is unlikely that the first and second annular auxiliary magnets 341 and 351 project in the radial direction with a centrifugal force involved in the rotation of the rotor 302.

(13) According to this embodiment, the first rotor side claw-like magnetic poles 315 respectively have the edges where the horizontal first back surface 315m of the first step sections 315d crosses the outer side surface 315j of the first magnetic pole section 315f. The edge is shaped such that a portion having isosceles right triangular shape in cross-section is cut out from the edge to form the first coupling surface f1. The first annular auxiliary magnet 341 having isosceles right triangular shape in cross-section is firmly fixed to the first coupling surfaces f1. In this case, the radial outer side surface 341b of the first annular auxiliary magnet 341 is set flush with the outer side surfaces 315j of the first magnetic pole sections 315f. The axial outer side surface 341c of the first annular auxiliary magnet 341 is set flush with the first back surfaces 315m of the first step sections 315d.

Similarly, the second rotor side claw-like magnetic poles 325 respectively have the edges where the horizontal second back surface 325m of the second step section 325d crosses the outer side surface 325j of the second magnetic pole section 325f. The edge is shaped such that a portion having isosceles right triangular shape in cross-section is cut out form this edge to form the second coupling surfaces f2. The second annular auxiliary magnet 351 having isosceles right triangular shape in cross-section is firmly fixed to the second coupling surfaces f2. In this case, the radial outer side surface 351b of the second annular auxiliary magnet 351 is set flush with the outer side surfaces 325j of the second magnetic pole sections 325f. The axial outer side surface 351c of the second annular auxiliary magnet 351 is set flush with the second back surfaces 325m of the second step sections 325d.

Consequently, the overall shape of the rotor 302 is not increased in the axial direction and the radial direction by providing the first and second annular auxiliary magnets 341 and 351. That is, it is possible to attain a reduction in the size of the rotor 302.

Figure 52:
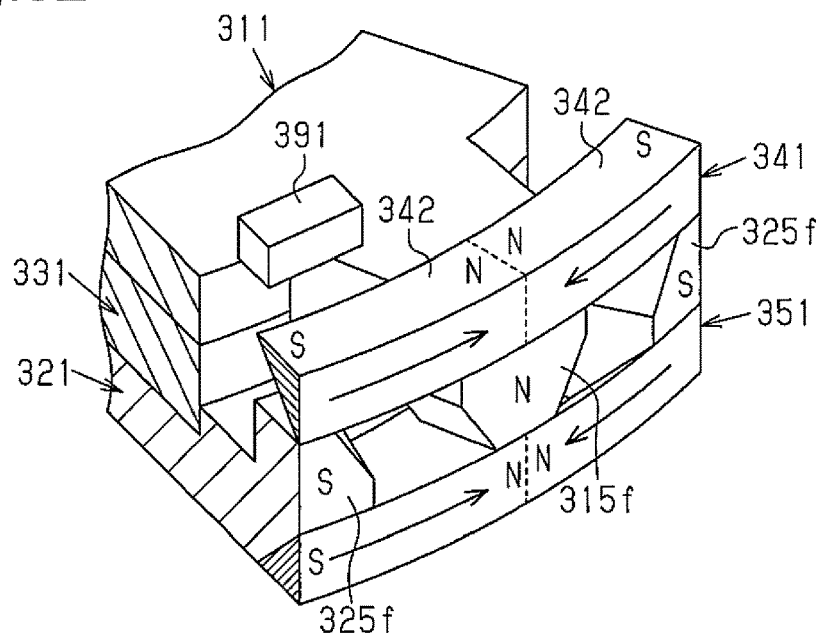
FIG. 52 is an explanatory diagram for explaining rotation detection of a motor in which the first annular auxiliary magnet in the fourth embodiment is used.

Note that, as shown in FIG. 52, in the fourth embodiment, a magnetic detector 391 including a Hall IC may be provided in a motor housing, not-shown, to be opposed to the first annular auxiliary magnet 341 at a fixed interval to detect a rotating position, the number of revolutions, and the like of the rotor 302 (the motor 301).

More specifically, the magnetic detector 391 is arranged in the motor housing such that, when the first annular auxiliary magnet 341 rotates together with the rotor 302, the first magnet sections 342 of the first annular auxiliary magnet 341 pass the front of the magnetic detector 391.

According to the rotation of the rotor 302, the magnetic detector 391 detects leakage fluxes of the first magnet sections 342, which pass the front of the magnetic detector 391, and outputs a signal of the detection to a not-shown control circuit. The not-shown control circuit calculates a rotation angle (a rotating position) of the rotor 302 and calculates the number of revolutions on the basis of the detection signal output from the magnetic detector 391.

Figure 53:
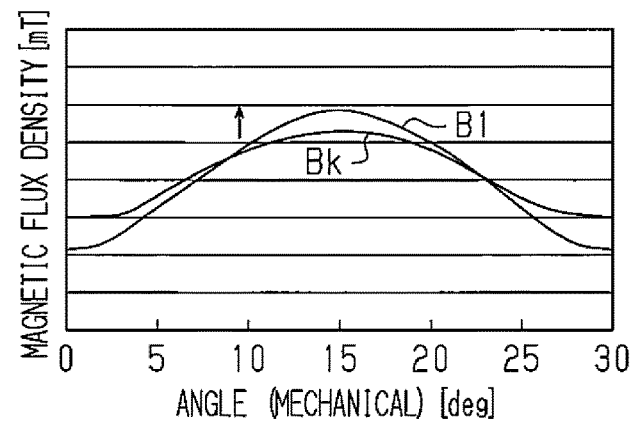
FIG. 53 is a detected waveform chart of a leakage flux detected by a magnetic detector.

FIG. 53 shows a detection waveform B1 of the magnetic detector 391 that detects a leakage flux of the first annular auxiliary magnet 341 provided in the brushless motor 301 in the fourth embodiment and a detection waveform Bk of the magnetic detector 391 that detects a leakage flux from the brushless motor 301 not provided with the first and second annular auxiliary magnets 341 and 351. As it is evident from FIG. 53, a width of change is larger in the detection waveform B1 of the magnetic detector 391 that detects a leakage flux of the first annular auxiliary magnet 341 in the fourth embodiment. Therefore, it is possible to perform highly accurate rotation detection. Further, since the first annular auxiliary magnet 341 is also used as a member to be detected for detection of a rotation angle and the number of revolutions, it is possible to attain a reduction in the number of components.

A motor according to a fifth embodiment is explained below with reference to FIGS. 54 to 57.

This embodiment is different in relative positions in the circumferential direction of the first and second annular auxiliary magnets 341 and 351 in the fourth embodiment with respect to the first and second rotor side claw-like magnetic poles 315 and 325 and magnetization directions of the first and second magnet sections 342 and 352. Therefore, for convenience of explanation, the differences are explained in detail.

Figure 54:
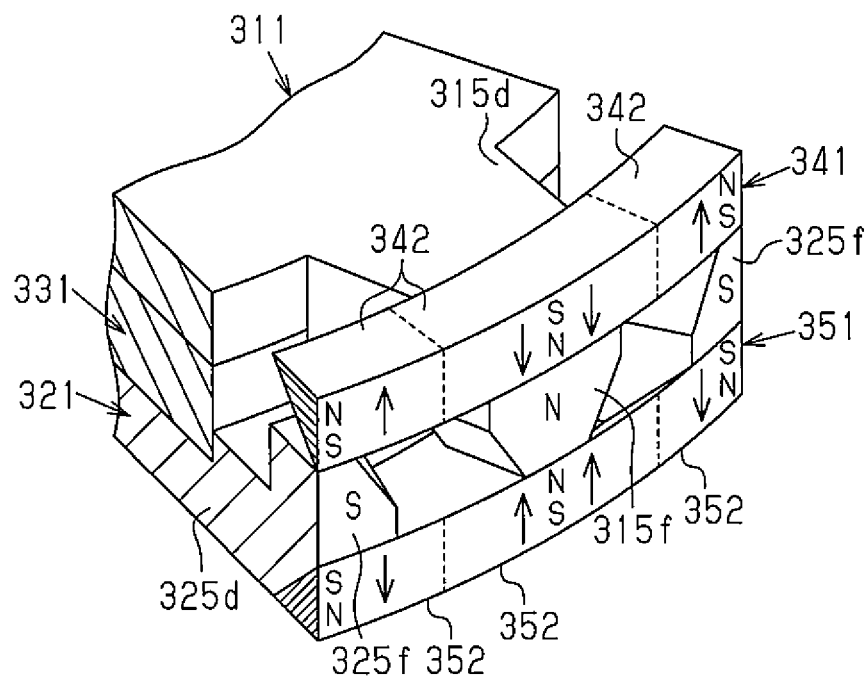
FIG. 54 is a main part enlarged sectional perspective view of a rotor according to a fifth embodiment of the present invention.

As shown in FIG. 54, the first annular auxiliary magnet 341, in which the twenty-four first magnet sections 342 are formed in the circumferential direction, is arranged with respect to the first rotor core 311 such that the boundaries between the first magnet sections 342 respectively coincide with circumferential intermediate positions of the first rotor side claw-like magnetic poles 315 and the second rotor side claw-like magnetic poles 325.

The first magnet sections 342 of the first annular auxiliary magnet 341 are magnetized in the axial direction unlike the fourth embodiment. More specifically, the first magnet sections 342 opposed to the first rotor side claw-like magnetic poles 315 are magnetized to set the first rotor core 311 sides as S poles and set the second rotor core 321 sides as N poles in the axial direction. The first magnet sections 342 opposed to the second rotor side claw-like magnetic poles 325 are magnetized to set the first rotor core 311 sides as N poles and set the second rotor core 321 sides as S poles in the axial direction.

Consequently, leakage fluxes from the proximal end portions of the first magnetic pole sections 315f to the distal end portions of the second magnetic pole sections 325f decrease.

On the other hand, as shown in FIG. 54, the second annular auxiliary magnet 351, in which the twenty-four second magnet sections 352 are formed in the circumferential direction, is arranged with respect to the first rotor core 311 such that the boundaries between the second magnet sections 352 respectively coincide with circumferential intermediate positions of the first rotor side claw-like magnetic poles 315 and the second rotor side claw-like magnetic poles 325.

The second magnet sections 352 of the second annular auxiliary magnet 351 are magnetized in the axial direction unlike the fourth embodiment. More specifically, the second magnet sections 352 opposed to the second rotor side claw-like magnetic poles 325 are magnetized to set the second rotor core 321 sides as N poles and set the first rotor core 311 sides as S poles in the axial direction. The second magnet sections 352 opposed to the first rotor side claw-like magnetic poles 315 are magnetized to set the second rotor core 321 sides as S poles and set the first rotor core 311 sides as N poles in the axial direction.

Consequently, leakage fluxes from the distal end portions of the first magnetic pole sections 315f to the proximal end portions of the second magnetic pole sections 325f decrease.

Action of the brushless motor 301 configured as explained above is explained.

The first magnet sections 342 of the first annular auxiliary magnet 341 are magnetized in the axial direction. The first magnet sections 342 opposed to the first rotor side claw-like magnetic poles 315 are magnetized to set the first rotor core 311 sides as S poles and set the second rotor core 321 sides as N poles in the axial direction. The first magnet sections 342 opposed to the second rotor side claw-like magnetic poles 325 are magnetized to set the first rotor core 311 sides as N poles and set the second rotor core 321 sides as S poles in the axial direction.

Therefore, leakage fluxes (short-circuit fluxes) from the proximal end portions of the first magnetic pole sections 315f of the N poles to the distal end portions of the second magnetic pole sections 325f of the S poles are reduced by the first magnet sections 342 of the first annular auxiliary magnet 341.

On the other hand, the second magnet sections 352 of the second annular auxiliary magnet 351 are magnetized in the axial direction. The second magnet sections 352 opposed to the second rotor side claw-like magnetic poles 325 are magnetized to set the second rotor core 321 sides as N poles and set the first rotor core 311 sides as S poles. The second magnet sections 352 opposed to the first rotor side claw-like magnetic poles 315 are magnetized to set the second rotor core 321 sides as S poles and set the first rotor core 311 sides as N poles.

Therefore, leakage fluxes (short-circuit fluxes) from the distal end portions of the first magnetic pole sections 315f of the N poles to the proximal end portions of the second magnetic pole sections 325f of the S poles are reduced by the second magnet sections 352 of the second annular auxiliary magnet 351.

As explained above, the first and second annular auxiliary magnets 341 and 351 that reduce leakage fluxes (short-circuit fluxes) are respectively firmly fixed to the first and second rotor cores 311 and 321. Therefore, it is possible to attain an increase in an output of the brushless motor 301.

An output of the brushless motor 301 firmly fixed with the first and second annular auxiliary magnets 341 and 351 in the fifth embodiment and an output of the brushless motor 301 not provided with the first and second annular auxiliary magnets 341 and 351 were compared and verified. As in the fourth embodiment, an induced voltage, which is an element of the output of the brushless motor 301, was acquired by an experiment and a result shown in FIG. 55 was obtained.

Figure 55:
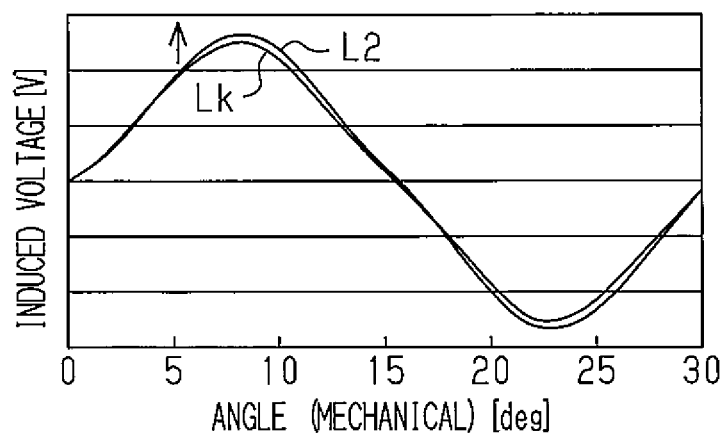
FIG. 55 is an induced voltage characteristic curve diagram for explaining an output characteristic of a motor according to the fifth embodiment.

An induced voltage characteristic line Lk in FIG. 55 is an induced voltage curve of the brushless motor not provided with the first and second annular auxiliary magnets 341 and 351. An induced voltage characteristic line L2 in FIG. 55 is an induced voltage curve of the brushless motor 301 provided with the first and second annular auxiliary magnets 341 and 351 in the fifth embodiment.

As it is evident from the experiment result, it is seen that a maximum of an induced voltage is about 7% higher in the brushless motor 301 provided with the first and second annular auxiliary magnets 341 and 351 in this embodiment than in the brushless motor not provided with the first and second annular auxiliary magnets 341 and 351.

That is, it is seen that the first and second annular auxiliary magnets 341 and 351 in this embodiment contribute to an increase in the output of the brushless motor 301.

The fifth embodiment has advantages explained below in addition to the advantages (12) and (13) explained in the fourth embodiment.

(14) According to this embodiment, leakage fluxes (short-circuit fluxes) from the proximal end portions of the first magnetic pole sections 315f of the N poles to the distal end portions of the second magnetic pole sections 325f of the S poles can be reduced by the first magnet sections 342 of the first annular auxiliary magnet 341. It is possible to attain an increase in the output of the brushless motor 301.

(15) According to this embodiment, leakage fluxes (short-circuit fluxes) from the distal end portions of the first magnetic pole sections 315f of the N poles to the proximal end portions of the second magnetic pole sections 325f of the S poles can be reduced by the second magnet sections 352 of the second annular auxiliary magnet 351. It is possible to attain an increase in the output of the brushless motor 301.

(16) According to this embodiment, in the first annular auxiliary magnet 341 firmly fixed to the first rotor core 311, the first magnet sections 342 opposed to the second rotor side claw-like magnetic poles 325 are set in contact with the distal end faces 325c of the second magnetic pole sections 325f of the second rotor side claw-like magnetic poles 325. Therefore, it is possible to further reduce the leakage fluxes (the short-circuit fluxes).

(17) In this embodiment, in the second annular auxiliary magnet 351 firmly fixed to the second rotor core 321, the second magnet sections 352 opposed to the first rotor side claw-like magnetic poles 315 are set in contact with the distal end faces 315c of the first magnetic pole sections 315f of the first rotor side claw-like magnetic poles 315. Therefore, it is possible to further reduce the leakage fluxes (the short-circuit fluxes).

Figure 56:
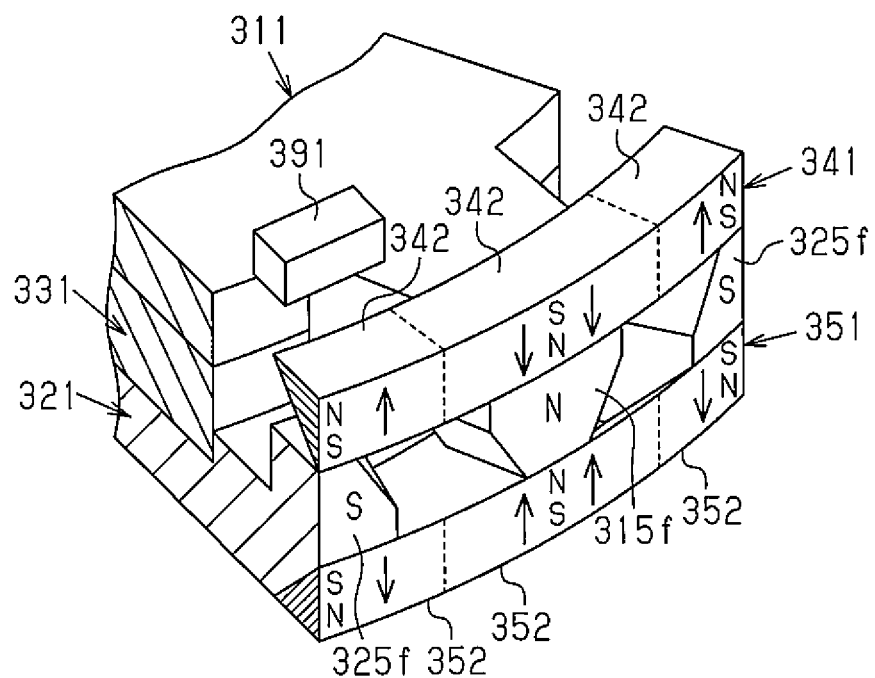
FIG. 56 is an explanatory diagram for explaining rotation detection of a motor in which a first annular auxiliary magnet in the fifth embodiment is used.

Note that, as shown in FIG. 56, in the fifth embodiment, the magnetic detector 391 including a Hall IC may be provided in a not-shown motor housing to be opposed to the first annular auxiliary magnet 341 at a fixed interval to perform rotation detection of a rotating position, the number of revolutions, and the like of the rotor 302 (the motor 301).

More specifically, the magnetic detector 391 is arranged in the motor housing such that, when the first annular auxiliary magnet 341 rotates together with the rotor 302, the first magnet sections 342 of the first annular auxiliary magnet 341 pass the front of the magnetic detector 391.

According to the rotation of the rotor 302, the magnetic detector 391 detects leakage fluxes of the first magnet sections 342 at the time when the first magnet section 342 is passing the front of the magnetic detector 391 and outputs a signal of the detection to a not-shown control circuit. The control circuit, not-shown, calculates a rotation angle (a rotating position) of the rotor 302 and calculates the number of revolutions on the basis of the detection signal output from the magnetic detector 391.

Figure 57:
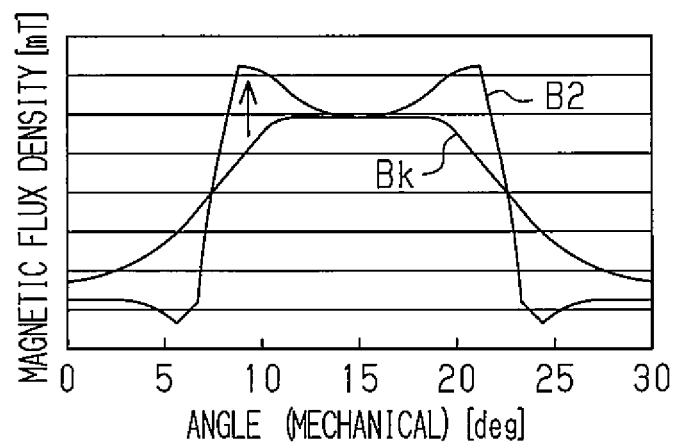
FIG. 57 is a detected waveform chart of a leakage flux detected by a magnetic detector.

FIG. 57 shows a detection waveform B2 of the magnetic detector 391 that detects a leakage flux of the first annular auxiliary magnet 341 provided in the brushless motor 301 in the fifth embodiment and a detection waveform Bk of the magnetic detector 391 that detects a leakage flux from the brushless motor 301 not provided with the first and second annular auxiliary magnets 341 and 351. As it is evident from FIG. 57, a waveform is more rectangular in the detection waveform B2 of the magnetic detector 391 that detects a leakage flux of the first annular auxiliary magnet 341 in the fifth embodiment. Therefore, it is possible to perform more highly accurate rotation detection. Further, since the first annular auxiliary magnet 341 is also used as a member to be detected for detection of a rotation angle and the number of revolutions, it is possible to attain a reduction in the number of components.

A motor according to a sixth embodiment is explained below with reference to FIGS. 58 and 59.

This embodiment is different in magnetization directions from the magnetization directions of the first and second magnet sections 342 and 352 of the first and second annular auxiliary magnets 341 and 351 explained in the fourth embodiment. Therefore, for convenience of explanation, the differences are explained in detail.

In the first annular auxiliary magnet 341, as in the fourth embodiment, the twenty-four first magnet sections 342 are formed in the circumferential direction. As in the fourth embodiment, the first annular auxiliary magnet 341 is arranged with respect to the first rotor core 311 such that boundaries between the first magnet sections 342 respectively coincide with circumferential center positions of the first magnetic pole sections 315f of the first rotor side claw-like magnetic poles 315 or circumferential center positions of the second magnetic pole sections 325f of the second rotor side claw-like magnetic poles 325.

Figure 58:
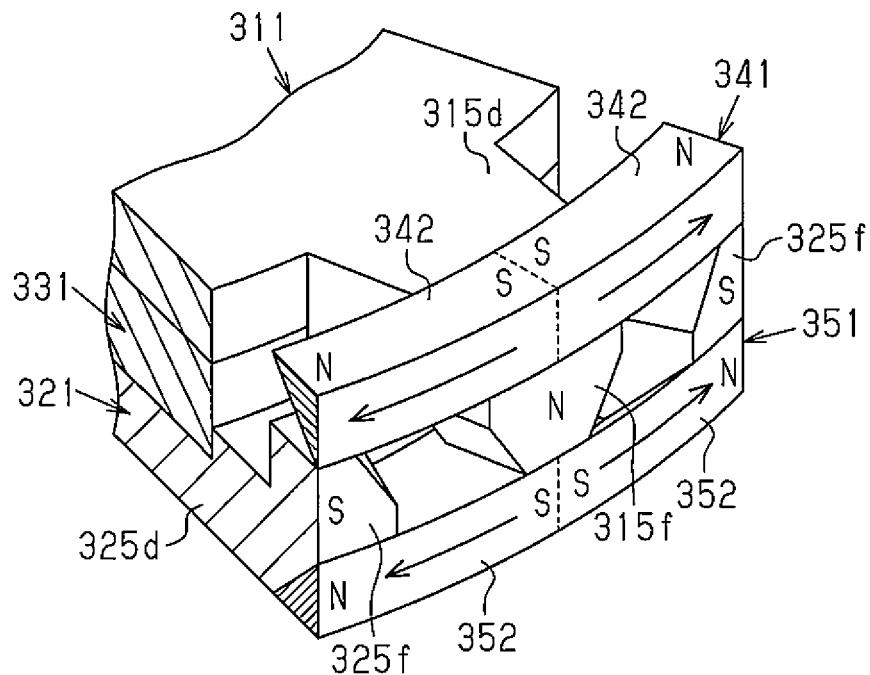
FIG. 58 is a main part enlarged sectional perspective view of a rotor according to a sixth embodiment of the present invention.

As shown in FIG. 58, the first magnet sections 342 are magnetized in the circumferential direction. More specifically, unlike the fourth embodiment, the first magnet sections 342 are magnetized to set the first magnetic pole section 315f sides as S poles and set the second magnetic pole section 325f sides as N poles in the circumferential direction.

That is, the S poles of the first magnet sections 342 are respectively arranged at the proximal end portions of the first magnetic pole sections 315f of the first rotor side claw-like magnetic poles 315. The N poles of the first magnet sections 342 are respectively arranged at the distal end portions of the second magnetic pole sections 325f of the second rotor side claw-like magnetic poles 325.

Consequently, conversely to the fourth embodiment, leakage fluxes (short-circuit fluxes) from the proximal end portions of the first magnetic pole sections 315f of the N poles to the distal end portions of the second magnetic pole sections 325f of the S poles are increased.

On the other hand, as shown in FIG. 58, the second magnet sections 352 are magnetized in the circumferential direction. More specifically, unlike the fourth embodiment, the second magnet sections 352 are magnetized to set the first magnetic pole section 315f sides as S poles and set the second magnetic pole section 325f sides as N poles in the circumferential direction.

That is, at the proximal end portions of the second magnetic pole sections 325f of the second rotor side claw-like magnetic poles 325, the N poles of the second magnet sections 352 are respectively arranged. At the distal end portions of the first magnetic pole sections 315f of the first rotor side claw-like magnetic poles 315, the S poles of the second magnet sections 352 are respectively arranged.

Consequently, conversely to the fourth embodiment, leakage fluxes (short-circuit fluxes) from the distal end portions of the first magnetic pole sections 315f of the N poles to the proximal end portions of the second magnetic pole sections 325f of the S poles are increased.

Action of the brushless motor 301 configured as explained above is explained.

In the first annular auxiliary magnet 341, the first magnet sections 342 are magnetized to set the first magnetic pole section 315f sides as S poles and set the second magnetic pole sections 325f sides as N poles. Consequently, the S poles of the first magnet sections 342 are respectively arranged at the proximal end portions of the first magnetic pole sections 315f that are the N poles in the magnetic field magnets 331. The N poles of the first magnet sections 342 are respectively arranged at the distal end portions of the second magnetic pole sections 325f that are the S poles in the magnetic field magnets 331.

As a result, leakage fluxes (short-circuit fluxes) from the proximal end portions of the first magnetic pole sections 315f of the N poles to the distal end portions of the second magnetic pole sections 325f of the S poles are increased by the first magnet sections 342 of the first annular auxiliary magnet 341.

On the other hand, in the second annular auxiliary magnet 351, the second magnet sections 352 are magnetized to set the second magnetic pole section 325f sides as N poles and set the first magnetic pole section 315f sides as S poles. Consequently, the N poles of the second magnet sections 352 are respectively arranged at the proximal end portions of the second magnetic pole sections 325f that are the S poles in the magnetic field magnets 331. The S poles of the second magnet sections 352 are respectively arranged at the distal end portions of the first magnetic pole sections 315f that are the N poles in the magnetic field magnets 331.

As a result, leakage fluxes (short-circuit fluxes) from the distal end portions of the first magnetic pole sections 315f of the N poles to the proximal end portions of the second magnetic pole sections 325f of the S poles are increased by the second magnet sections 352 of the second annular auxiliary magnet 351.

As explained above, the first and second annular auxiliary magnets 341 and 351 that increase leakage fluxes (short-circuit fluxes) are respectively firmly fixed to the first and second rotor cores 311 and 321. Therefore, it is possible to realize an increase in the number of revolutions of the brushless motor 301.

That is, by actively increasing leakage fluxes (short-circuit fluxes), the brushless motor 301 in the sixth embodiment can generate a so-called field weakening effect in the first and second rotor side claw-like magnetic poles 315 and 325 of the rotor 302 and increase the number of revolutions more than the brushless motor 301 in the fourth embodiment.

An output of the brushless motor 301 firmly fixed with the first and second annular auxiliary magnets 341 and 351 in the sixth embodiment and an output of the brushless motor 301 firmly fixed with the first and second annular auxiliary magnets 341 and 351 in the fourth embodiment were compared and verified. An induced voltage, which is an element of the output of the brushless motor 301, was acquired by an experiment and a result shown in FIG. 59 was obtained.

Figure 59:
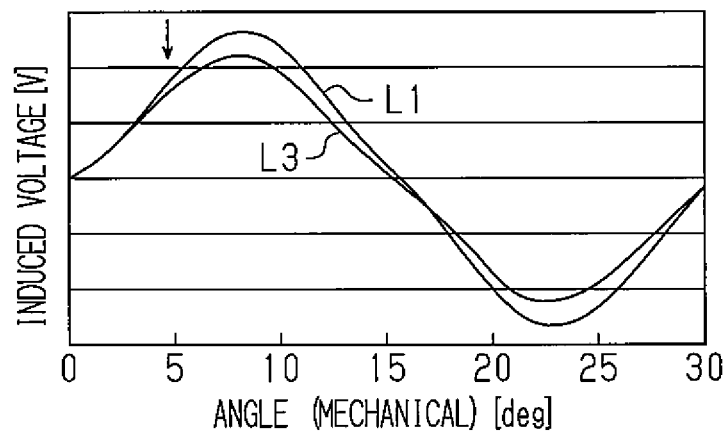
FIG. 59 is an induced voltage characteristic curved diagram for explaining an output characteristic of a motor according to the sixth embodiment.

An induced voltage characteristic line L1 in FIG. 59 is an induced voltage curve of the brushless motor provided with the first and second annular auxiliary magnets 341 and 351 in the fourth embodiment. An induced voltage characteristic line L3 in FIG. 59 is an induced voltage curve of the brushless motor 301 provided with the first and second annular auxiliary magnets 341 and 351 in the sixth embodiment.

As it is evident from the experiment result, it is seen that a maximum of an induced voltage can be reduced about 21% by the field weakening effect in the brushless motor 301 provided with the first and second annular auxiliary magnets 341 and 351 in this embodiment compared with in the brushless motor 301 provided with the first and second annular auxiliary magnets 341 and 351 in the fourth embodiment.

The sixth embodiment has advantages explained below in addition to the advantages (12) and (13) explained in the fourth embodiment.

(18) According to this embodiment, leakage fluxes (short-circuit fluxes) from the proximal end portions of the first magnetic pole sections 315f of the N poles to the distal end portions of the second magnetic pole sections 325f of the S poles can be increased by the first magnet sections 342 of the first annular auxiliary magnet 341. It is possible to drive the brushless motor 301 at a high number of revolutions.

(19) According to this embodiment, leakage fluxes (short-circuit fluxes) from the distal end portions of the first magnetic pole sections 315f of the N poles to the proximal end portions of the second magnetic pole sections 325f of the S poles can be increased by the second magnet sections 352 of the second annular auxiliary magnet 351. It is possible to drive the brushless motor 301 at a high number of revolutions.

(20) According to this embodiment, in the first annular auxiliary magnet 341 firmly fixed to the first rotor core 311, the first magnet sections 342 opposed to the second rotor side claw-like magnetic poles 325 are set in contact with the distal end faces 325c of the second magnetic pole sections 325f of the second rotor side claw-like magnetic poles 325. Therefore, it is possible to further increase the leakage fluxes (the short-circuit fluxes).

(21) In this embodiment, in the second annular auxiliary magnet 351 firmly fixed to the second rotor core 321, the second magnet sections 352 opposed to the first rotor side claw-like magnetic poles 315 are set in contact with the distal end faces 315c of the first magnetic pole sections 315f of the first rotor side claw-like magnetic poles 315. Therefore, it is possible to further increase the leakage fluxes (the short-circuit fluxes).

A motor according to a seventh embodiment is explained with reference to FIGS. 60 to 63.

This embodiment is different in magnetization directions from the magnetization directions of the first and second magnet sections 342 and 352 of the first and second annular auxiliary magnets 341 and 351 explained in the fifth embodiment. Therefore, for convenience of explanation, the differences are explained in detail.

Figure 60:
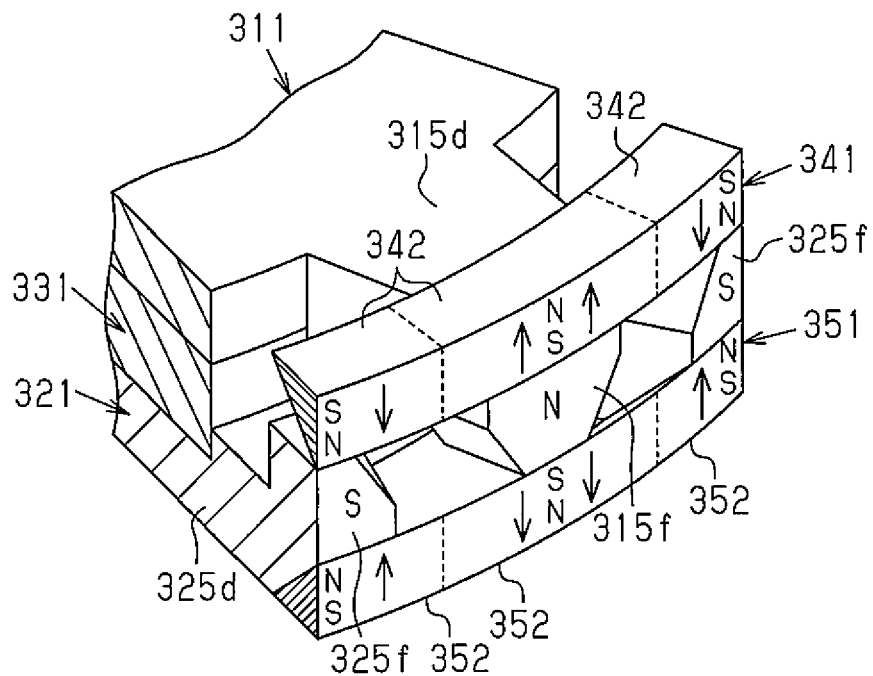
FIG. 60 is a main part enlarged sectional perspective view of a rotor according to a seventh embodiment of the present invention.

As shown in FIG. 60, in the first annular auxiliary magnet 341, as in the fifth embodiment, the first magnet sections 342 are magnetized in the axial direction. Unlike the fifth embodiment, the first magnet sections 342 opposed to the first rotor side claw-like magnetic poles 315 are magnetized to set the first rotor core 311 sides as N poles and set the second rotor core 321 sides as S poles in the axial direction. The first magnet sections 342 opposed to the second rotor side claw-like magnetic poles 325 are magnetized to set the first rotor core 311 sides as S poles and set the second rotor core 321 sides as N poles in the axial direction.

Therefore, leakage fluxes (short-circuit fluxes) from the proximal end portions of the first magnetic pole sections 315f of the N poles to the distal end portions of the second magnetic pole sections 325f of the S poles are increased by the first magnet sections 342 of the first annular auxiliary magnet 341.

On the other hand, as shown in FIG. 60, in the second annular auxiliary magnet 351, as in the fifth embodiment, the second magnet sections 352 are magnetized in the axial direction. Unlike the fifth embodiment, the second magnet sections 352 opposed to the second rotor side claw-like magnetic poles 325 are magnetized to set the second rotor core 321 sides as S poles and set the first rotor core 311 sides as N poles in the axial direction. The second magnet sections 352 opposed to the first rotor side claw-like magnetic poles 315 are magnetized to set the second rotor core 321 sides as N poles and set the first rotor core 311 sides as S poles in the axial direction.

Therefore, leakage fluxes (short-circuit fluxes) from the distal end portions of the first magnetic pole sections 315f of the N poles to the proximal end portions of the second magnetic pole sections 325f of the S poles are increased by the second magnet sections 352 of the second annular auxiliary magnet 351.

Action of the brushless motor 301 configured as explained above is explained.

In the first annular auxiliary magnet 341, the first magnet sections 342 opposed to the first rotor side claw-like magnetic poles 315 are magnetized to set the first rotor core 311 sides as N poles and set the second rotor core 321 sides as S poles in the axial direction. The first magnet sections 342 opposed to the second rotor side claw-like magnetic poles 325 are magnetized to set the first rotor core 311 side as S poles and set the second rotor core 321 sides as N poles in the axial direction.

Therefore, leakage fluxes (short-circuit fluxes) from the proximal end portions of the first magnetic pole sections 315f of the N poles to the distal end portions of the second magnetic pole sections 325f of the S poles are increased by the first magnet sections 342 of the first annular auxiliary magnet 341.

On the other hand, in the second annular auxiliary magnet 351, the second magnet sections 352 opposed to the second rotor side claw-like magnetic poles 325 are magnetized to set the second rotor core 321 sides as S poles and set the first rotor core 311 sides as N poles in the axial direction. The second magnet sections 352 opposed to the first rotor side claw-like magnetic poles 315 are magnetized to set the second rotor core 321 side as N poles and set the first rotor core 311 sides as S poles in the axial direction.

Therefore, leakage fluxes (short-circuit fluxes) from the distal end portions of the first magnetic pole sections 315f of the N poles to the proximal end portions of the second magnetic pole sections 325f of the S poles are increased by the second magnet sections 352 of the second annular auxiliary magnet 351.

As explained above, the first and second annular auxiliary magnets 341 and 351 that actively increase leakage fluxes (short-circuit fluxes) are respectively firmly fixed to the first and second rotor cores 311 and 321. Therefore, it is possible to increase the number of revolutions of the brushless motor 301.

That is, by actively increasing leakage fluxes (short-circuit fluxes), the brushless motor 301 in the seventh embodiment can generate a so-called field weakening effect in the first and second rotor side claw-like magnetic poles 315 and 325 of the rotor 302 and increase the number of revolutions more than the brushless motor 301 in the sixth embodiment.

An output of the brushless motor 301 firmly fixed with the first and second annular auxiliary magnets 341 and 351 in the seventh embodiment and an output of the brushless motor 301 firmly fixed with the first and second annular auxiliary magnets 341 and 351 in the fifth embodiment were compared and verified. An induced voltage, which is an element of the output of the brushless motor 301, was acquired by an experiment and a result shown in FIG. 61 was obtained.

Figure 61:
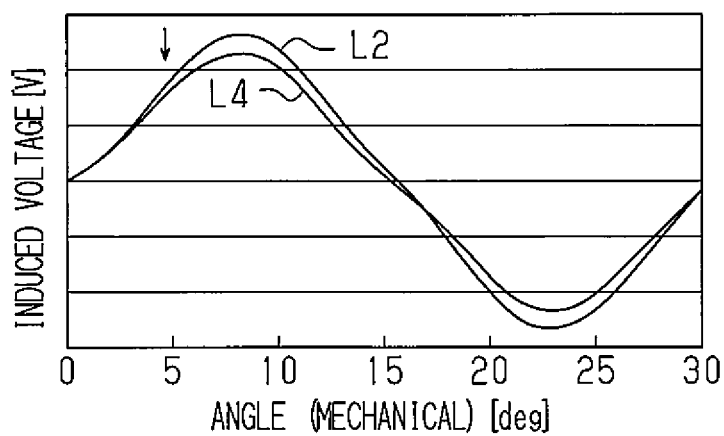
FIG. 61 is an induced voltage characteristic curve diagram for explaining an output characteristic of a motor according to the seventh embodiment.

An induced voltage characteristic line L2 in FIG. 61 is an induced voltage curve of the brushless motor provided with the first and second annular auxiliary magnets 341 and 351 in the fifth embodiment. An induced voltage characteristic line L4 in FIG. 61 is an induced voltage curve of the brushless motor 301 provided with the first and second annular auxiliary magnets 341 and 351 in the seventh embodiment.

As it is evident from the experiment result, it is seen that a maximum of an induced voltage can be reduced about 13% by the field weakening effect in the brushless motor 301 provided with the first and second annular auxiliary magnets 341 and 351 in this embodiment compared with in the brushless motor 301 provided with the first and second annular auxiliary magnets 341 and 351 in the fifth embodiment.

The seventh embodiment has advantages explained below in addition to the advantages (12) and (13) explained in the fourth embodiment.

(22) According to this embodiment, leakage fluxes (short-circuit fluxes) from the proximal end portions of the first magnetic pole sections 315f of the N poles to the distal end portions of the second magnetic pole sections 325f of the S poles can be increased by the first magnet sections 342 of the first annular auxiliary magnet 341. It is possible to drive the brushless motor 301 at a high number of revolutions.

(23) According to this embodiment, leakage fluxes (short-circuit fluxes) from the distal end portions of the first magnetic pole sections 315f of the N poles to the proximal end portions of the second magnetic pole sections 325f of the S poles can be increased by the second magnet sections 352 of the second annular auxiliary magnet 351. It is possible to drive the brushless motor 301 at a high number of revolutions.

(24) According to this embodiment, in the first annular auxiliary magnet 341 firmly fixed to the first rotor core 311, the first magnet sections 342 opposed to the second rotor side claw-like magnetic poles 325 are set in contact with the distal end faces 325c of the second magnetic pole sections 325*f* of the second rotor side claw-like magnetic poles 325. Therefore, it is possible to further increase the leakage fluxes (the short-circuit fluxes).

(25) According to this embodiment, in the second annular auxiliary magnet 351 firmly fixed to the second rotor core 321, the second magnet sections 352 opposed to the first rotor side claw-like magnetic poles 315 are set in contact with the distal end faces 315*c* of the first magnetic pole sections 315*f* of the first rotor side claw-like magnetic poles 315. Therefore, it is possible to further increase the leakage fluxes (the short-circuit fluxes).

Figure 62:
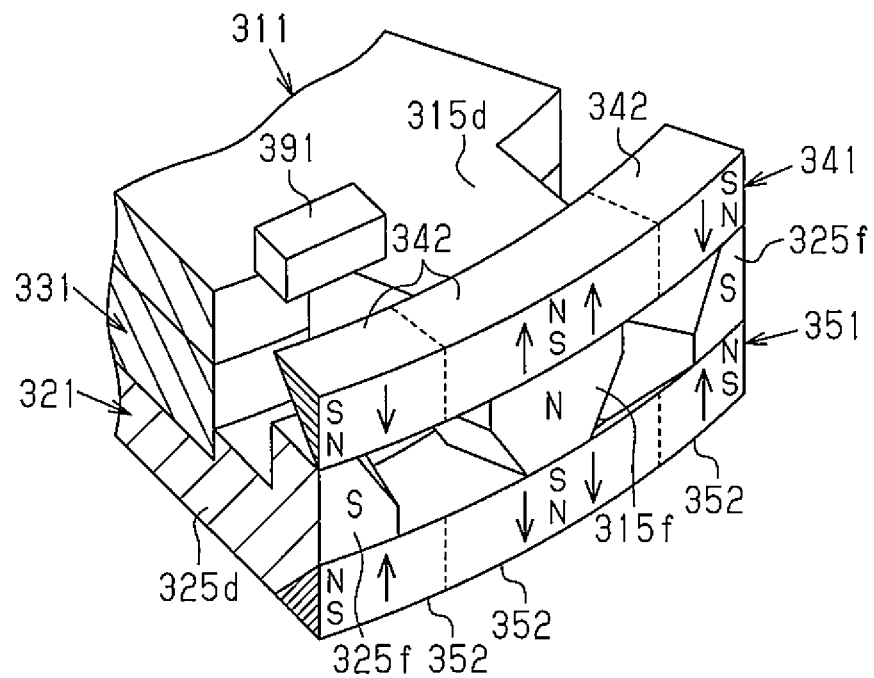
FIG. 62 is an explanatory diagram for explaining rotation detection of a motor in which a first annular auxiliary magnet in the seventh embodiment is used.

Note that, as shown in FIG. 62, in the seventh embodiment, the magnetic detector 391 including a Hall IC may be provided in a not-shown motor housing to be opposed to the first annular auxiliary magnet 341 at a fixed interval to perform rotation detection of a rotating position, the number of revolutions, and the like of the rotor 302 (the motor 301).

More specifically, the magnetic detector 391 is arranged in the motor housing such that, when the first annular auxiliary magnet 341 rotates together with the rotor 302, the first magnet sections 342 of the first annular auxiliary magnet 341 pass the front of the magnetic detector 391.

According to the rotation of the rotor 302, the magnetic detector 391 detects leakage fluxes of the first magnet sections 342 at the time when the first magnet sections 342 are passing the front of the magnetic detector 391 and outputs a signal of the detection to a not-shown control circuit. The not-shown control circuit calculates a rotation angle (a rotating position) of the rotor 302 and calculates the number of revolutions on the basis of the detection signal output from the magnetic detector 391.

Figure 63:
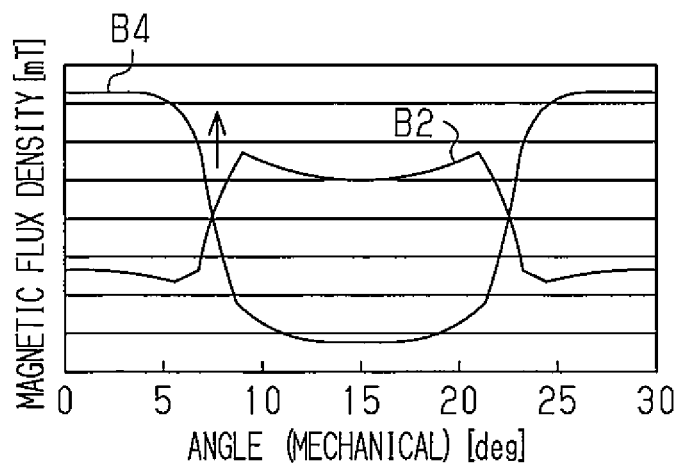
FIG. 63 is a detected waveform chart of a leakage flux detected by a magnetic detector.

FIG. 63 shows a detection waveform B4 of the magnetic detector 391 that detects a leakage flux of the first annular auxiliary magnet 341 provided in the brushless motor 301 in the seventh embodiment and a detection waveform B2 of the magnetic detector 391 that detects a leakage flux of the first annular auxiliary magnet 341. As it is evident from FIG. 63, the detection waveform B4 of the magnetic detector 391 that detects a leakage flux of the first annular auxiliary magnet 341 in the seventh embodiment is a rectangular waveform having a larger width of change. Therefore, it is possible to perform highly accurate rotation detection. Further, since the first annular auxiliary magnet 341 is also used as a member to be detected for detection of a rotation angle and the number of revolutions, it is possible to attain a reduction in the number of components.

The fourth to seventh embodiments may be changed as explained below.

The first and second annular auxiliary magnets 341 and 351 in the fourth to seventh embodiments have the isosceles right triangular shape in cross-section. However, the first and second annular auxiliary magnets 341 and 351 may have right triangular shape or square shape in cross-section.

In the fourth to seventh embodiments, the brushless motor 301 includes the rotor 302 arranged on the inner side of the stator 303 of the Lundell type in which the first stator side claw-like magnetic poles 365 and the second stator side claw-like magnetic pole 375 are alternately arranged in the circumferential direction.

The brushless motor 301 may be applied to a motor in which the rotor 302 in the embodiments is arranged on the inner side of a stator that is not the Lundell type.

Figure 64:
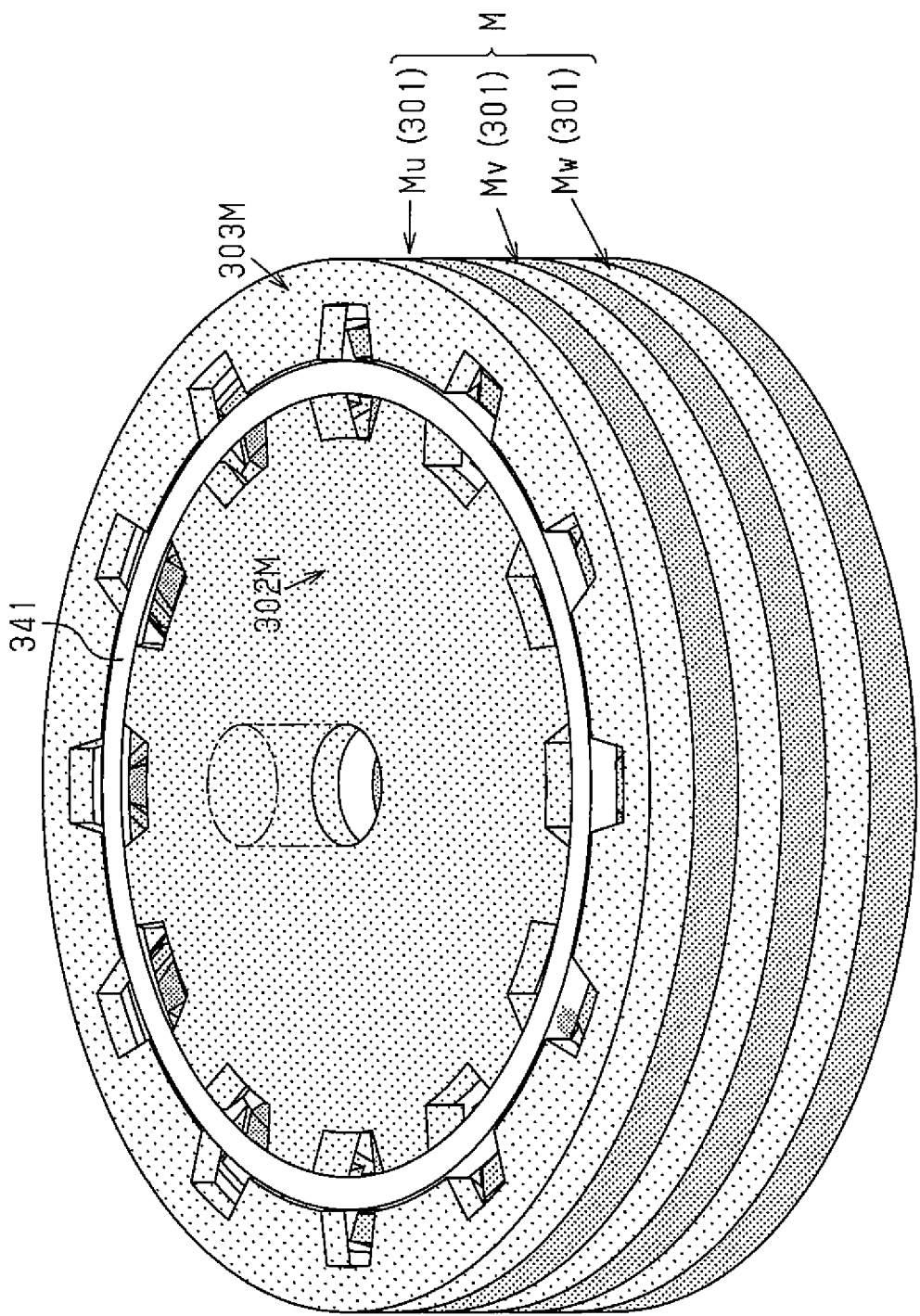
FIG. 64 is a perspective view of a three-phase brushless motor for explaining another example of the fourth to seventh embodiments.

The single-phase brushless motor 301 in the fourth to seventh embodiments may be applied to a three-phase brushless motor M in which three brushless motors 301 are stacked in the axial direction. That is, as shown in FIG. 64, the three-phase brushless motor M is a brushless motor in which the three brushless motors 301, that is, the U-phase motor section Mu, the V-phase motor section Mv, and the W-phase motor section Mw are stacked in order.

Figure 65:
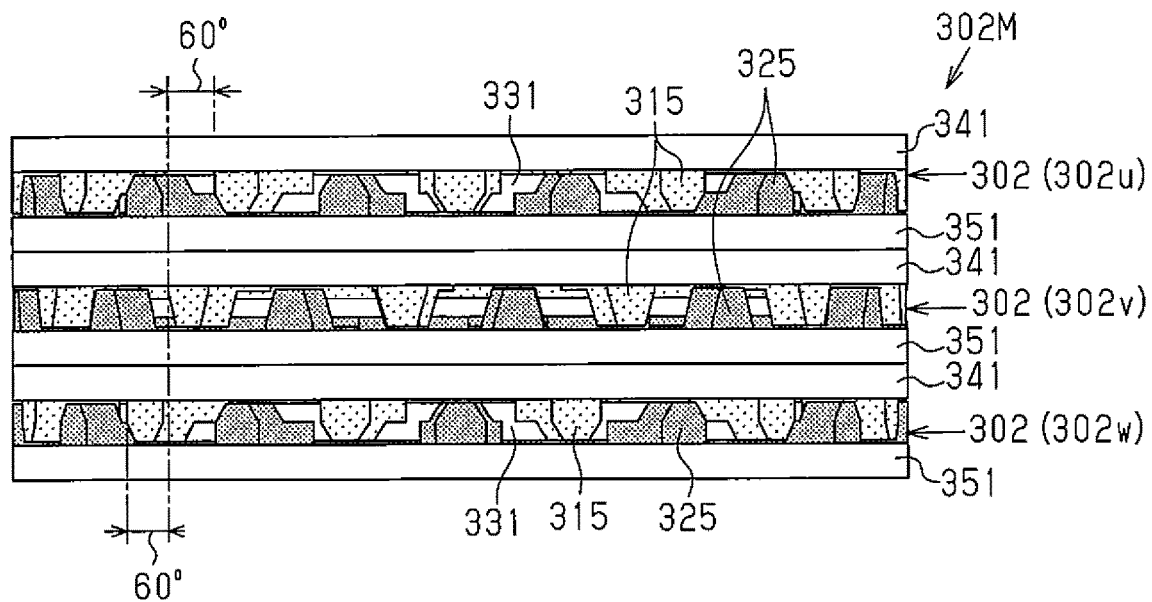
FIG. 65 is a front view of a three-phase rotor viewed from the radial direction.

As shown in FIG. 65, in a three-phase rotor 302M of the three-phase brushless motor M, three single-phase rotors 302, that is, a U-phase rotor 302*u*, a V-phase rotor 302*v*, and a W-phase rotor 302*w* are stacked in order from the top.

Figure 66:
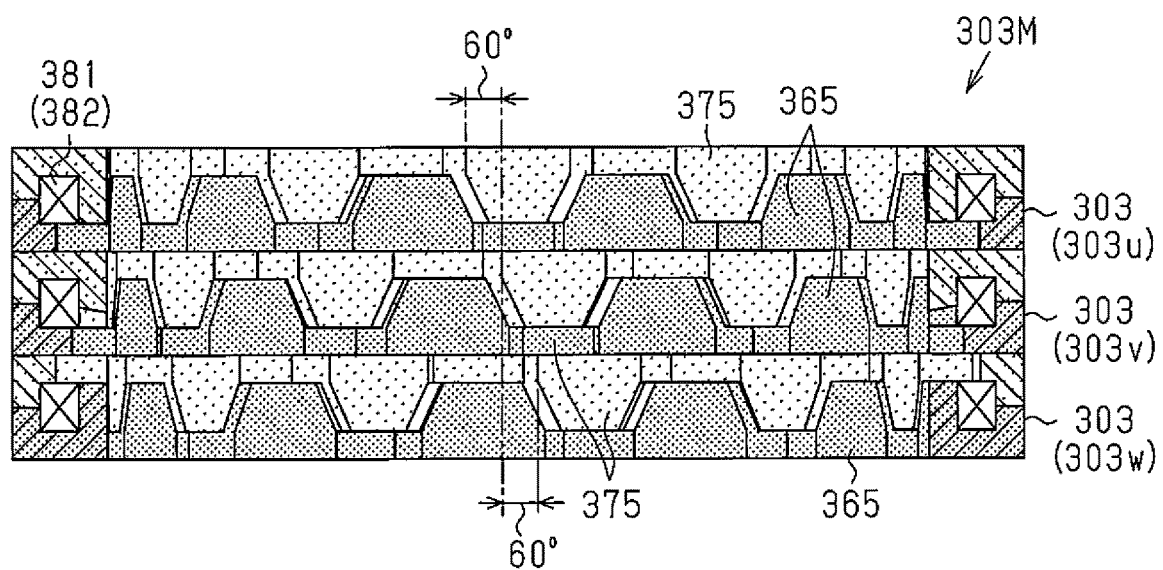
FIG. 66 is a sectional view of a three-phase stator.

On the other hand, as shown in FIG. 66, in a three-phase stator 303M of the three-phase brushless motor M, three single-phase stators 303, that is, a U-phase stator 303*u*, a V-phase stator 303*v*, and a W-phase stator 303*w* are stacked in order from the top. A U-phase current of three-phase currents is fed to the U-phase stator 303*u*. A V-phase current of the three-phase currents is fed to the V-phase stator 303*v*. A W-phase current of the three-phase currents is fed to the W-phase stator 303*w*.

Note that, in the three-phase rotor 302M, the U-phase rotor 302*u*, the V-phase rotor 302*v*, and the W-phase rotor 302*w* may be stacked and arranged to be shifted 5 degrees in the mechanical angle (60 degrees in the electrical angle) from one another.

More specifically, as shown in FIG. 65, the V-phase rotor 302*v* is firmly fixed to the rotating shaft to be shifted 5 degrees in the mechanical angle (60 degrees in the electrical angle) with respect to the U-phase rotor 302*u* in the counterclockwise direction centering on the center axis O of the rotating shaft when viewed from the U-phase rotor 302*u*. The W-phase rotor 302*w* is firmly fixed to the rotating shaft to be shifted 5 degrees in the mechanical angle (60 degrees in the electrical angle) with respect to the V-phase rotor 302*v* in the counterclockwise direction centering on the center axis O of the rotating shaft when viewed from the V-phase rotor 302*v*.

Similarly, in the three-phase stator 303M, the U-phase stator 303*u*, the V-phase stator 303*v*, and the W-phase stator 303*w* may be stacked and arranged to be shifted 5 degrees in the mechanical angle (60 degrees in the electrical angle) from one another.

More specifically, as shown in FIG. 66, the V-phase stator 303*v* is firmly fixed to the motor housing to be shifted 5 degrees in the mechanical angle (60 degrees in the electrical angle) with respect to the U-phase stator 303*u* in the clockwise direction centering on the center axis O when viewed from the U-phase stator 303*u*. The W-phase stator 303*w* is firmly fixed to the motor housing to be shifted 5 degrees in the mechanical angle (60 degrees in the electrical angle) with respect to the V-phase stator 303*v* in the clockwise direction when viewed from the V-phase stator 303*v*.

Note that, similarly, the brushless motor 301 may be applied to a three-phase motor in which the rotor 302M for three phases configured by applying the rotor 302 in the fourth to seventh embodiments is arranged on the inner side of a stator for three phases that is not the Lundell type.

In the fourth to seventh embodiments, the number of the first and second rotor side claw-like magnetic poles 315 and 325 of the first and second rotor cores 311 and 321 is twelve. However, the number may be changed as appropriate. Similarly, the number of the first and second stator side claw-like magnetic poles 365 and 375 of the first and second stator cores 361 and 371 is twelve. However, it goes without saying that the number may be changed as appropriate.

In the fourth to seventh embodiments, the magnetic field magnets 331 and the first and second annular auxiliary magnets 341 and 351 are formed by the ferrite magnet. However, the magnetic field magnets 331 and the first and second annular auxiliary magnets 341 and 351 may be formed by other permanent magnets such as a neodymium magnet. Naturally, these kinds of permanent magnets may be combined as appropriate.

In the fourth to seventh embodiments, the first annular auxiliary magnet 341 is set in contact with the distal end faces 325c of the second magnetic pole sections 325f. The second annular auxiliary magnet 351 is set in contact with the distal end faces 315c of the first magnetic pole sections 315f. However, the first and second annular auxiliary magnets 341 and 351 may be arranged to be opposed to the distal end faces 325c and 315c in the vicinities thereof.

In the fourth to seventh embodiments, in detecting the rotation of the motor 301, the magnetic detector 391 detects the first magnet sections 342 of the first annular auxiliary magnet 341. However, the magnetic detector 391 may detect the second magnet sections 352 of the second annular auxiliary magnet 351.

In the sixth embodiment, rotation detection of the motor 301 by the magnetic detector 391 is not explained. However, it goes without saying that the rotation detection of the motor 301 can be performed in the same manner as in the fourth embodiment.

Technical ideas that can be grasped from the fourth to seventh embodiments and other examples are additionally explained below.

(E) The first magnet sections of the first annular auxiliary magnet are magnetized in the circumferential direction. The second magnet sections of the second annular auxiliary magnet are magnetized in the circumferential direction.

(F) The first annular auxiliary magnet is fixed to the first rotor core such that boundaries that divide the first magnet sections respectively coincide with circumferential center positions of the first claw-like magnetic poles or circumferential center positions of the second claw-like magnetic poles. The second annular auxiliary magnet is fixed to the second rotor core such that boundaries that divide the second magnet sections respectively coincide with the circumferential center positions of the first claw-like magnetic poles or the circumferential center positions of the second claw-like magnetic poles.

(G) The first magnet sections of the first annular auxiliary magnet are magnetized to set boundary sides coinciding with the circumferential center positions of the first claw-like magnetic poles as first magnetic poles and set boundary sides coinciding with the circumferential center positions of the second claw-like magnetic poles as second magnetic poles. The second magnet sections of the second annular auxiliary magnet are magnetized to set boundary sides coinciding with the circumferential center positions of the first claw-like magnetic poles as first magnetic poles and set boundary sides coinciding with the circumferential center positions of the second claw-like magnetic poles as second magnetic poles.

(H) The first magnet sections of the first annular auxiliary magnet are magnetized to set boundary sides coinciding with the circumferential center positions of the second claw-like magnetic poles as first magnetic poles and set boundary sides coinciding with the circumferential center positions of the first claw-like magnetic poles as second magnetic poles. The second magnet sections of the second annular auxiliary magnet are magnetized to set boundary sides coinciding with the circumferential center positions of the second claw-like magnetic poles as first magnetic poles and set boundary sides coinciding with the circumferential center positions of the first claw-like magnetic poles as second magnetic poles.

(I) The first magnet sections of the first annular auxiliary magnet are magnetized in the axial direction. The second magnet sections of the second annular auxiliary magnet are magnetized in the axial direction.

(J) The first annular auxiliary magnet is fixed to the first rotor core such that boundaries that divide the first magnet sections respectively coincide with circumferential intermediate positions of the first claw-like magnetic poles and the second claw-like magnetic poles. The second annular auxiliary magnet is fixed to the second rotor core such that boundaries that divide the second magnet sections respectively coincide with the circumferential intermediate positions of the first claw-like magnetic poles and the second claw-like magnetic poles.

(K) In the rotor, the first magnet sections of the first annular auxiliary magnet opposed to the first claw-like magnetic poles are magnetized to set the second rotor core sides as first magnetic poles and set first rotor core sides as second magnetic poles in the axial direction. The first magnet sections opposed to the second claw-like magnetic poles are magnetized to set the second rotor core sides as second magnetic poles and set the first rotor core sides as first magnetic poles in the axial direction. The second magnet sections of the second annular auxiliary magnet opposed to the second claw-like magnetic poles are magnetized to set the second rotor core sides as first magnetic poles and set first rotor core sides as second magnetic poles in the axial direction. The second magnet sections opposed to the first claw-like magnetic poles are magnetized to set the second rotor core sides as second magnetic poles and set the first rotor core sides as first magnetic poles in the axial direction.

(L) In the rotor, the first magnet sections of the first annular auxiliary magnet opposed to the first claw-like magnetic poles are magnetized to set the second rotor core sides as second magnetic poles and set first rotor core sides as first magnetic poles in the axial direction. The first magnet sections opposed to the second claw-like magnetic poles are magnetized to set the second rotor core sides as first magnetic poles and set the first rotor core sides as second magnetic poles in the axial direction. The second magnet sections of the second annular auxiliary magnet opposed to the second claw-like magnetic poles are magnetized to set the second rotor core sides as second magnetic poles and set first rotor core sides as first magnetic poles in the axial direction. The second magnet sections opposed to the first claw-like magnetic poles are magnetized to set the second rotor core sides as first magnetic poles and set the first rotor core sides as second magnetic poles in the axial direction.

(M) A trio of the rotors in the fourth to seventh embodiments are laminated in the axial direction to form a U-phase rotor, a V-phase rotor, and a W-phase rotor.

(N) A motor including the rotor in the fourth to seventh embodiments.

A rotation detecting method for a motor including the rotor in the fourth to seventh embodiment or the three-phase rotor is provided.

The rotation detecting method includes arranging the magnetic detector in a position adjacent to at least one annular auxiliary magnet of the first annular auxiliary magnet and the second annular auxiliary magnet. The rotation detecting method includes detecting, with the magnetic detector, passage of the magnet sections of the annular auxiliary magnet that rotates according to rotation of the rotor or the three-phase rotor and detecting rotation of the motor.

What is claimed is:

1. A motor comprising single motor sections in three stages arranged in order of a first stage, a second stage, and a third stage in an axial direction,
- each of the single motor sections includes:
- a rotor section including:
  - a first rotor core including a plurality of claw-like magnetic poles in a circumferential direction;
  - a second rotor core including a plurality of claw-like magnetic poles in the circumferential direction; and
  - a permanent magnet arranged between the first and second rotor cores and magnetized in the axial direction; and
- a stator section including:
  - a first stator core including a plurality of claw-like magnetic poles in the circumferential direction;
  - a second stator core including a plurality of claw-like magnetic poles in the circumferential direction; and
  - a winding wire arranged between the first and second stator cores and wound around in the circumferential direction, wherein
- in at least one of the rotor section and the stator section in the single motor section of the second stage, the plurality of claw-like magnetic poles are provided at unequal intervals in the circumferential direction,
- the permanent magnet in the second stage has a magnetized direction that differs in the axial direction from a magnetized direction of each of the permanent magnets in the first and third stages,
- a configuration in which the claw-like magnetic poles are arranged at equal intervals in the circumferential direction in the stator section in each of the first to third stages and a phase is shifted by a same angle between the stator sections in the first stage and the second stage and between the stator sections in the second stage and the third stage is referred to as a reference configuration, and
- the claw-like magnetic poles of the stator section in the second stage are arranged at unequal intervals to increase an overlapping width in the circumferential direction between the claw-like magnetic poles of the stator section in the first stage and the claw-like magnetic poles of the stator section in the second stage with respect to the reference configuration and to increase an overlapping width in the circumferential direction between the claw-like magnetic poles of the stator section in the second stage and the claw-like magnetic poles of the stator section in the third stage with respect to the reference configuration.

2. A motor comprising single motor sections in three stages arranged in order of a first stage, a second stage, and a third stage in an axial direction,
- each of the single motor sections includes:
- a rotor section including:
  - a first rotor core including a plurality of claw-like magnetic poles in a circumferential direction;
  - a second rotor core including a plurality of claw-like magnetic poles in the circumferential direction; and
  - a permanent magnet arranged between the first and second rotor cores and magnetized in the axial direction; and
- a stator section including:
  - a first stator core including a plurality of claw-like magnetic poles in the circumferential direction;
  - a second stator core including a plurality of claw-like magnetic poles in the circumferential direction; and
  - a winding wire arranged between the first and second stator cores and wound around in the circumferential direction, wherein
- in at least one of the rotor section and the stator section in the single motor section of the second stage, the plurality of claw-like magnetic poles are provided at unequal intervals in the circumferential direction,
- the permanent magnet in the second stage has a magnetized direction that differs in the axial direction from a magnetized direction of each of the permanent magnets in the first and third stages,
- a configuration in which the claw-like magnetic poles are arranged at equal intervals in the circumferential direction in the rotor section in each of the first to third stages and a phase is shifted by a same angle between the rotor sections in the first stage and the second stage and between the rotor sections in the second stage and the third stage is referred to as a reference configuration, and
- the claw-like magnetic poles of the rotor section in the second stage are arranged at unequal intervals to reduce an overlapping width in the circumferential direction between the claw-like magnetic poles of the rotor section in the first stage and the claw-like magnetic poles of the rotor section in the second stage and to reduce an overlapping width in the circumferential direction between the claw-like magnetic poles of the rotor section in the second stage and the claw-like magnetic poles of the rotor section in the third stage.

3. A motor comprising single motor sections in three stages arranged in order of a first stage, a second stage, and a third stage in an axial direction,
- each of the single motor sections includes:
- a rotor section including:
  - a first rotor core including a plurality of claw-like magnetic poles in a circumferential direction;
  - a second rotor core including a plurality of claw-like magnetic poles in the circumferential direction; and
  - a permanent magnet arranged between the first and second rotor cores and magnetized in the axial direction; and
- a stator section including:
  - a first stator core including a plurality of claw-like magnetic poles in the circumferential direction;
  - a second stator core including a plurality of claw-like magnetic poles in the circumferential direction; and
  - a winding wire arranged between the first and second stator cores and wound around in the circumferential direction, wherein
- in at least one of the rotor section and the stator section in the single motor section of the second stage, the plurality of claw-like magnetic poles are provided at unequal intervals in the circumferential direction,
- the permanent magnet in the second stage has a magnetized direction that differs in the axial direction from a magnetized direction of each of the permanent magnets in the first and third stages,
- the claw-like magnetic poles of the rotor section in the single motor section in each of the stages include first rotor side claw-like magnetic poles provided at equal intervals in the circumferential direction in the first rotor core and second rotor side claw-like magnetic poles provided at equal intervals in the circumferential direction in the second rotor core,
- in the single motor sections in the first stage and the third stage, the first and second rotor cores are assembled to alternately arrange the first rotor side claw-like magnetic poles and the second rotor side claw-like magnetic poles at equal intervals in the circumferential direction, and in the single motor section in the second stage, the first and second rotor cores are assembled to alternately arrange the first rotor side claw-like magnetic poles and the second rotor side claw-like magnetic poles at unequal intervals in the circumferential.

4. The motor according to claim 1, wherein the claw-like magnetic poles of the stator section in the single motor section in each of the stages include first stator side claw-like magnetic poles provided at equal intervals in the circumferential direction in the first stator core and second stator side claw-like magnetic poles provided at equal intervals in the circumferential direction in the second stator core, in the single motor sections in the first stage and the third stage, the first and second rotor cores are assembled to alternately arrange the first stator side claw-like magnetic poles and the second stator side claw-like magnetic poles at equal intervals in the circumferential direction, and in the single motor section in the second stage, the first and second stator cores are assembled to alternately arrange the first stator side claw-like magnetic poles and the second stator side claw-like magnetic poles at unequal intervals in the circumferential direction.

5. The motor according to claim 2, wherein the claw-like magnetic poles of the stator section in the single motor section in each of the stages include first stator side claw-like magnetic poles provided at equal intervals in the circumferential direction in the first stator core and second stator side claw-like magnetic poles provided at equal intervals in the circumferential direction in the second stator core, in the single motor sections in the first stage and the third stage, the first and second rotor cores are assembled to alternately arrange the first stator side claw-like magnetic poles and the second stator side claw-like magnetic poles at equal intervals in the circumferential direction, and in the single motor section in the second stage, the first and second stator cores are assembled to alternately arrange the first stator side claw-like magnetic poles and the second stator side claw-like magnetic poles at unequal intervals in the circumferential direction.

6. The motor according to claim 3, wherein the claw-like magnetic poles of the stator section in the single motor section in each of the stages include first stator side claw-like magnetic poles provided at equal intervals in the circumferential direction in the first stator core and second stator side claw-like magnetic poles provided at equal intervals in the circumferential direction in the second stator core, in the single motor sections in the first stage and the third stage, the first and second rotor cores are assembled to alternately arrange the first stator side claw-like magnetic poles and the second stator side claw-like magnetic poles at equal intervals in the circumferential direction, and in the single motor section in the second stage, the first and second stator cores are assembled to alternately arrange the first stator side claw-like magnetic poles and the second stator side claw-like magnetic poles at unequal intervals in the circumferential direction.

* * * * *